(12) United States Patent
Boudreau et al.

(10) Patent No.: US 10,079,912 B2
(45) Date of Patent: Sep. 18, 2018

(54) WIRELESS COMMUNICATION SYSTEM INSTALLATION

(75) Inventors: Jesse Boudreau, Ottawa (CA); David Yach, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 1364 days.

(21) Appl. No.: 12/171,858

(22) Filed: Jul. 11, 2008

(65) Prior Publication Data
US 2009/0031296 A1    Jan. 29, 2009

Related U.S. Application Data

(60) Provisional application No. 60/952,551, filed on Jul. 28, 2007, provisional application No. 60/952,544, filed on Jul. 27, 2007.

(51) Int. Cl.
| | |
|---|---|
| *G06F 9/445* | (2018.01) |
| *H04L 29/08* | (2006.01) |
| *G06F 8/61* | (2018.01) |
| *H04W 4/00* | (2018.01) |

(52) U.S. Cl.
CPC .......... *H04L 67/34* (2013.01); *G06F 8/61* (2013.01); *H04L 67/04* (2013.01); *H04W 4/00* (2013.01)

(58) Field of Classification Search
CPC ........................................ G06F 8/60; G06F 8/61
USPC ................ 455/418–420; 709/220, 219; 717/174–178
See application file for complete search history.

(56) References Cited

U.S. PATENT DOCUMENTS

| | | |
|---|---|---|
| 5,999,611 A | 12/1999 | Tatchell et al. |
| 6,047,377 A | 4/2000 | Gong |
| 6,081,827 A | 6/2000 | Reber |
| 6,160,877 A | 12/2000 | Tatchell et al. |
| 6,223,291 B1 | 4/2001 | Puhl et al. |
| 6,259,405 B1 | 7/2001 | Stewart et al. |
| 6,301,484 B1 | 10/2001 | Rogers et al. |
| 6,393,484 B1 | 5/2002 | Massarani |
| 6,397,246 B1 | 5/2002 | Wolfe |
| 6,430,170 B1 | 8/2002 | Saints et al. |
| 6,542,491 B1 | 4/2003 | Tari et al. |
| 6,581,025 B2 | 6/2003 | Lehman |

(Continued)

FOREIGN PATENT DOCUMENTS

| | | |
|---|---|---|
| EP | 0973299 A2 | 1/2000 |
| EP | 1014629 | 6/2000 |

(Continued)

OTHER PUBLICATIONS

"GloMop: Global Mobile Computing by Proxy", *White Paper*, Glo-Mop Group, (Sep. 13, 1995), 12 pgs.

(Continued)

*Primary Examiner* — Steven S Kim
(74) *Attorney, Agent, or Firm* — Donna Flores; Fleit Gibbons Gutman Bongini & Bianco P.L.

(57) ABSTRACT

Apparatus and methods for wireless systems provide a mechanism to enhance the communication capabilities of wireless users. In an embodiment, data is stored on a wireless mobile device, where the data is correlated to information to install a wireless server on an electronic system. At least a portion of the data from the wireless mobile device may be downloaded to initiate installation of the wireless server on the electronic system.

24 Claims, 35 Drawing Sheets

(56) References Cited

U.S. PATENT DOCUMENTS

| | | |
|---|---|---|
| 6,591,095 B1 | 7/2003 | Palaniswamy |
| 6,615,038 B1 | 9/2003 | Moles et al. |
| 6,628,928 B1 | 9/2003 | Crosby et al. |
| 6,675,165 B1 | 1/2004 | Rothschild |
| 6,684,397 B1 | 1/2004 | Byer et al. |
| 6,721,578 B2* | 4/2004 | Minear et al. ............... 455/566 |
| 6,728,531 B1 | 4/2004 | Lee et al. |
| 6,781,236 B2 | 8/2004 | Shimooka et al. |
| 6,804,523 B2 | 10/2004 | Shiraga |
| 6,944,760 B2 | 9/2005 | Wils |
| 6,968,389 B1 | 11/2005 | Menditto et al. |
| 6,970,859 B1 | 11/2005 | Brechner et al. |
| 6,981,020 B2 | 12/2005 | Miloslaysky et al. |
| 6,993,326 B2 | 1/2006 | Link, II et al. |
| 7,006,820 B1 | 2/2006 | Parker et al. |
| 7,043,263 B2 | 5/2006 | Kaplan et al. |
| 7,069,319 B2 | 6/2006 | Zellner et al. |
| 7,103,367 B2 | 9/2006 | Adams |
| 7,107,045 B1 | 9/2006 | Knoop |
| 7,127,241 B2 | 10/2006 | Castrogiovanni et al. |
| 7,171,199 B1 | 1/2007 | Rahman |
| 7,227,930 B1 | 6/2007 | Othmer et al. |
| 7,233,975 B1 | 6/2007 | Gerraty et al. |
| 7,236,769 B2 | 6/2007 | Irlam et al. |
| 7,340,043 B2 | 3/2008 | Crockett |
| 7,349,710 B2 | 3/2008 | Kaplan et al. |
| 7,376,901 B2 | 5/2008 | Shen |
| 7,415,439 B2 | 8/2008 | Kontio et al. |
| 7,430,472 B2 | 9/2008 | Zhao et al. |
| 7,447,497 B2 | 11/2008 | Okita |
| 7,480,264 B1 | 1/2009 | Duo |
| 7,489,938 B2 | 2/2009 | Flynn et al. |
| 7,512,711 B1 | 3/2009 | Abjanic |
| 7,516,478 B2 | 4/2009 | Limont et al. |
| 7,526,278 B2 | 4/2009 | Link, II et al. |
| 7,636,574 B2 | 12/2009 | Poosala |
| 7,639,654 B2* | 12/2009 | Riazi et al. ............... 370/338 |
| 7,640,039 B2 | 12/2009 | Kamada |
| 7,640,293 B2 | 12/2009 | Wilson et al. |
| 7,647,409 B2 | 1/2010 | Banerjee et al. |
| 7,649,895 B2 | 1/2010 | Kadar |
| 7,657,271 B2 | 2/2010 | Kim |
| 7,657,273 B2 | 2/2010 | Haartsen |
| 7,676,516 B2 | 3/2010 | Boukobza |
| 7,702,915 B2 | 4/2010 | Mccann et al. |
| 7,773,981 B2 | 8/2010 | Okita |
| 7,783,593 B2 | 8/2010 | Espino |
| 7,856,248 B1 | 12/2010 | Fujisaki |
| 7,895,256 B2 | 2/2011 | Zombek |
| 7,917,641 B2* | 3/2011 | Crampton ............... 709/229 |
| 7,945,642 B1* | 5/2011 | Hung et al. ............... 709/219 |
| 7,970,430 B2 | 6/2011 | Backof |
| 7,986,635 B2 | 7/2011 | Kawamura |
| 7,991,764 B2 | 8/2011 | Rathod |
| 8,005,922 B2 | 8/2011 | Boudreau |
| 8,028,272 B2 | 9/2011 | Eldridge et al. |
| 8,041,825 B2 | 10/2011 | Gibbs et al. |
| 8,065,361 B2 | 11/2011 | Runstedler |
| 8,086,677 B2 | 12/2011 | Murphy |
| 8,120,802 B2 | 2/2012 | Chrisop |
| 8,352,550 B2 | 1/2013 | Boudreau et al. |
| 8,516,095 B2 | 8/2013 | Eisener et al. |
| 8,965,992 B2* | 2/2015 | Boudreau ............... H04L 63/104 709/207 |
| 2002/0013155 A1 | 1/2002 | Jamthe et al. |
| 2002/0013850 A1 | 1/2002 | Mitchell |
| 2002/0026398 A1 | 2/2002 | Sheth |
| 2003/0008662 A1 | 1/2003 | Stern et al. |
| 2003/0021275 A1 | 1/2003 | Shabeer |
| 2003/0041125 A1 | 2/2003 | Salomon |
| 2003/0051172 A1* | 3/2003 | Lordemann ......... H04L 63/0428 726/5 |
| 2003/0078036 A1* | 4/2003 | Chang et al. ............... 455/419 |
| 2003/0081621 A1 | 5/2003 | Godfrey |
| 2003/0095523 A1 | 5/2003 | Korus et al. |
| 2003/0119386 A1* | 6/2003 | Laux et al. ............... 439/894 |
| 2003/0142653 A1 | 7/2003 | Jiang et al. |
| 2003/0212800 A1* | 11/2003 | Jones ............... H04L 63/104 709/228 |
| 2003/0236823 A1 | 12/2003 | Patzer et al. |
| 2003/0236914 A1 | 12/2003 | Liu |
| 2004/0024795 A1 | 2/2004 | Hugh et al. |
| 2004/0042432 A1 | 3/2004 | Riazi et al. |
| 2004/0053602 A1 | 3/2004 | Wurzburg |
| 2004/0180673 A1 | 9/2004 | Adams et al. |
| 2004/0198456 A1 | 10/2004 | Kelkar |
| 2004/0202117 A1 | 10/2004 | Wilson et al. |
| 2004/0209650 A1 | 10/2004 | Pearce |
| 2004/0225525 A1 | 11/2004 | Weitzman |
| 2004/0242224 A1 | 12/2004 | Janik et al. |
| 2004/0249846 A1 | 12/2004 | Randall et al. |
| 2004/0249961 A1 | 12/2004 | Katsube et al. |
| 2004/0259533 A1 | 12/2004 | Nixon et al. |
| 2004/0260745 A1 | 12/2004 | Gage |
| 2004/0267873 A1 | 12/2004 | Shen et al. |
| 2005/0010475 A1 | 1/2005 | Perkowski et al. |
| 2005/0018695 A1 | 1/2005 | Ramaswamy et al. |
| 2005/0102328 A1 | 5/2005 | Ring et al. |
| 2005/0117606 A1 | 6/2005 | Kim |
| 2005/0138019 A1 | 6/2005 | Betts et al. |
| 2005/0141447 A1 | 6/2005 | Carlton et al. |
| 2005/0186954 A1 | 8/2005 | Kenney |
| 2005/0233693 A1 | 10/2005 | Karaoguz et al. |
| 2005/0239034 A1 | 10/2005 | McKeagney |
| 2006/0021059 A1 | 1/2006 | Brown et al. |
| 2006/0031237 A1 | 2/2006 | Deanna et al. |
| 2006/0053196 A1 | 3/2006 | Spataro et al. |
| 2006/0053380 A1 | 3/2006 | Spataro |
| 2006/0059539 A1 | 3/2006 | Shashikumar et al. |
| 2006/0067274 A1 | 3/2006 | Gillespie et al. |
| 2006/0135200 A1 | 6/2006 | Yun |
| 2006/0155851 A1* | 7/2006 | Ma ............... H04L 29/06027 709/226 |
| 2006/0167940 A1 | 7/2006 | Colton et al. |
| 2006/0167985 A1 | 7/2006 | Albanese et al. |
| 2006/0174026 A1* | 8/2006 | Robinson et al. ............ 709/231 |
| 2006/0199610 A1 | 9/2006 | Dale |
| 2006/0209759 A1 | 9/2006 | Vesterinen |
| 2006/0277408 A1 | 12/2006 | Bhat et al. |
| 2007/0006289 A1 | 1/2007 | Limont et al. |
| 2007/0023292 A1 | 2/2007 | Kim |
| 2007/0027920 A1 | 2/2007 | Alvarado et al. |
| 2007/0073874 A1 | 3/2007 | Moghaddam et al. |
| 2007/0087682 A1 | 4/2007 | DaCosta |
| 2007/0180119 A1 | 8/2007 | Khivesara et al. |
| 2007/0232268 A1 | 10/2007 | Park et al. |
| 2007/0299918 A1 | 12/2007 | Roberts |
| 2008/0036591 A1 | 2/2008 | Ray |
| 2008/0046583 A1 | 2/2008 | Rao |
| 2008/0071767 A1 | 3/2008 | Grieselhuber et al. |
| 2008/0095373 A1 | 4/2008 | Nagata |
| 2008/0096537 A1* | 4/2008 | Milojkovic et al. .......... 455/418 |
| 2008/0098062 A1 | 4/2008 | Balia |
| 2008/0126803 A1* | 5/2008 | Ginter et al. ............... 713/168 |
| 2008/0134018 A1* | 6/2008 | Kembel et al. ............... 715/234 |
| 2008/0189373 A1 | 8/2008 | Ikonen et al. |
| 2008/0208956 A1 | 8/2008 | Spiridellis et al. |
| 2008/0216148 A1 | 9/2008 | Bienek et al. |
| 2008/0222711 A1 | 9/2008 | Michaelis |
| 2008/0256204 A1 | 10/2008 | Kamat et al. |
| 2008/0261569 A1 | 10/2008 | Britt et al. |
| 2009/0024605 A1 | 1/2009 | Yang |
| 2009/0028049 A1 | 1/2009 | Boudreau et al. |
| 2009/0030968 A1 | 1/2009 | Boudreau et al. |
| 2009/0030974 A1 | 1/2009 | Boudreau et al. |
| 2009/0030995 A1 | 1/2009 | Boudreau |
| 2009/0031250 A1 | 1/2009 | Boudreau |
| 2009/0031296 A1 | 1/2009 | Boudreau |
| 2009/0034463 A1 | 2/2009 | Rao |
| 2009/0036111 A1* | 2/2009 | Danford et al. ............... 455/419 |
| 2009/0068994 A1 | 3/2009 | Murphy |
| 2009/0070429 A1 | 3/2009 | Murphy |
| 2009/0125521 A1 | 5/2009 | Petty |
| 2009/0138547 A1 | 5/2009 | Boudreau |

(56) References Cited

U.S. PATENT DOCUMENTS

| | | |
|---|---|---|
| 2009/0292799 A1 | 11/2009 | Eisener et al. |
| 2010/0030734 A1 | 2/2010 | Chunilal |
| 2010/0211635 A1 | 8/2010 | Deanna et al. |
| 2010/0223321 A1 | 9/2010 | Runstedler et al. |
| 2010/0223359 A1 | 9/2010 | Runstedler et al. |
| 2010/0281391 A1 | 11/2010 | Major |
| 2010/0306258 A1 | 12/2010 | Espino |
| 2011/0283200 A1 | 11/2011 | Koren |
| 2011/0320461 A1 | 12/2011 | Grieselhuber et al. |
| 2012/0066299 A1 | 3/2012 | Runstedler |
| 2012/0096101 A1 | 4/2012 | Murphy |
| 2012/0096365 A1 | 4/2012 | Wilkinson et al. |

FOREIGN PATENT DOCUMENTS

| | | |
|---|---|---|
| EP | 1158438 A2 | 11/2001 |
| EP | 1383347 | 1/2004 |
| EP | 1531641 | 5/2005 |
| EP | 1684535 A1 | 7/2006 |
| EP | 1750422 | 2/2007 |
| WO | WO-02044958 A1 | 6/2002 |
| WO | WO-02087188 A1 | 10/2002 |
| WO | WO-2003048964 A1 | 6/2003 |
| WO | WO-07130214 A2 | 11/2007 |

OTHER PUBLICATIONS

"GloMop: Global Mobile Computing by Proxy, GloMop Technology Overview", fox@cs.berkeley.edu—Armando's home page; file:/C:\unzipped\pythia_demo_pages\pythia\index.html, White Paper. Dated Jul. 6, 2005, (Downloaded Jul. 6, 2005), 11 pgs.
Bartlett, Joel F., "Experience with a Wireless World Wide Web Client", *WRL Technical Note TN-46*, White Paper, This is a preprint of a paper that will be presented at IEEE Spring COMPCON95, San Francisco, California, Mar. 5-9, 1995, (Mar. 1995), 17 pgs.
Courtois, Todd, et al., "Portal: a PDA to World Wide Web Interface", *PDA Developers* vol. 3.1, (Jan./Feb. 1995), 18-20.
Greenberg, S., et al., "POAs and Shared Public Oisplays:Making PersonalInformatin Public, and Public Information Personal", *Personal Technologies*, XP002519997 Personal Technologies, (Mar. 1999 (Mar. 1999),), 11 pgs.
Joshi, Anupam, "Mowser: Mobile Platforms and Web Browsers", *Bulletin of the IEEE Technical Committee on Operating Systems and Application Environments 8*, No. 1, (1996), 6 pgs.
Watson, T., "Application design for wireless computing", *Workshop on Mobile Computing and Applications, 1994. Proceedings. Workshop on Mobile Computing Systems and Applications; Citation*: Dec. 8-9, 1994, Santa Cruz, CA, (1994), 91-94.
Office Action dated Nov. 19, 2014, in connection with related Canadian patent application No. 2,638,333, 5 pgs.
Greenberg, S., et al., "PDAs and Shared Public Displays: Making Personal Information Public, and Public Information Personal", Personal Technologies, XP002519997, Mar. 1999 (Mar. 1999), 11 pgs.
Office Action dated Jan. 21, 2014, for corresponding Canadian Patent Application No. 2,638,323, 2 pgs.
Office Action dated Jan. 13, 2014, for corresponding Chinese Patent Application No. 200810134385.5, 10 pgs.
U.S. Appl. No. 12/171,940, Notice of Allowance dated Sep. 20, 2010, 4 pgs.
U.S. Appl. No. 12/171,940, Non-Final Office Action dated Mar. 5, 2010, 8 pgs.
U.S. Appl. No. 12/171,940, Notice of Allowance dated Apr. 18, 2011, 5 pgs.
U.S. Appl. No. 12/171,940, Response filed Jul. 6, 2010 to Non-Final Office Action dated Mar. 5, 2010, 20 pgs.
U.S. Appl. No. 12/171,950, Final Office Action dated Jul. 15, 2010, 6 pgs.
U.S. Appl. No. 12/171,950, Non-Final Office Action dated Mar. 9, 2010, 7 pgs.
U.S. Appl. No. 12/171,950, Response filed May 28, 2010 to Non-Final Office Action dated Mar. 9, 2010, 19 pgs.
U.S. Appl. No. 12/171,950, Response filed Sep. 15, 2010 to Final Office Action dated Jul. 15, 2010, 23 pgs.
U.S. Appl. No. 12/172,006, Examiner Interview Summary dated Apr. 27, 2011, 2 pgs.
U.S. Appl. No. 12/172,006, Final Office Action dated Apr. 27, 2011, 15 pgs.
U.S. Appl. No. 12/172,006, Response filed Feb. 14, 2011 to Non-Final Office Action dated Oct. 14, 2010, 10 pgs.
U.S. Appl. No. 12/172,015, Advisory Action dated Jan. 27, 2011, 3 pgs.
U.S. Appl. No. 12/172,015, Final Office Action dated Nov. 18, 2010, 6 pgs.
U.S. Appl. No. 12/172,015, Non-Final Office Action dated Nov. 18, 2010, 6 pgs.
U.S. Appl. No. 12/172,015, Response filed Jan. 18, 2011 to Final Office Action dated Nov. 18, 2010, 15 pgs.
U.S. Appl. No. 12/172,015, Response filed Apr. 6, 2010 to Restriction Requirement dated Mar. 10, 2010, 12 pgs.
U.S. Appl. No. 12/172,015, Response filed Sep. 28, 2010 to Non-Final Office Action dated Jun. 28, 2010, 29 pgs.
U.S. Appl. No. 12/172,015, Restriction Requirement dated Mar. 10, 2007, 7 pgs.
U.S. Appl. No. 12/172,026; Final Office Action dated Aug. 17, 2010, 8 pgs.
U.S. Appl. No. 12/172,026, Non-Final Office Action dated Mar. 11, 2010, 11 pgs.
U.S. Appl. No. 12/172,026, Response filed Jun. 10, 2010 to Non-final Office Action dated Mar. 11, 2010, 20 pgs.
U.S. Appl. No. 12/172,026, Response filed Nov. 12, 2010 to to Final Office Action dated Aug. 17, 2010, 15 pgs.
U.S. Appl. No. 12/394,994, Final Office Action dated Apr. 13, 2011, 7 pgs.
U.S. Appl. No. 12/394,994, Non-Final Office Action dated Oct. 18, 2010, 13 pgs.
U.S. Appl. No. 12/394,994, Response filed Jan. 18, 2011 to Non-Final Office Action dated Oct. 18, 2010, 15 pgs.
U.S. Appl. No. 12/395,083, Final Office Action dated Mar. 22, 2011, 13 pgs.
U.S. Appl. No. 12/395,083, Non-Final Office Action dated Oct. 8, 2010, 12 pgs.
U.S. Appl. No. 12/395,083, Response filed Jan. 5, 2011 to Non-Final Office Action dated Oct. 8, 2010, 20 pgs.
European Application Serial No. 08160292.2, Office Action dated Feb. 5, 2010, 6 pgs.
"Chinese Application Serial No. 200810134376.6, Office Action dated Apr. 12, 2012", w/English Translation, 9 pgs.
"European Application Serial No. 08160285.6, Extended European Search Report dated Mar. 24, 2009", 7 pgs.
"European Application Serial No. 08160293.0 , Extended European Search Report dated Mar. 31, 2009", 7 pgs.
U.S. Appl. No. 12/171,858, Non-Final Office Action dated 100-14-11, 19 pgs.
U.S. Appl. No. 12/171,858, Response filed Jan. 13, 2012 to Non-Final Office Action dated Oct. 14, 2011, 14 pgs.
U.S. Appl. No. 12/171,925, Non-Final Office Action dated Jul. 25, 2011, 23 pgs.
U.S. Appl. No. 12/171,925, Response filed Jan. 25, 2012 to Non-Final Office action dated Jul. 25, 2011, 20 pgs.
U.S. Appl. No. 12/171,975, Response filed Sep. 12, 2011 to Final Office Action dated May 12, 2011, 13 pgs.
U.S. Appl. No. 12/172,006, Notice of Allowance dated Aug. 26, 2011. 5 pgs.
U.S. Appl. No. 12/172,006, Response filed Jul. 27, 2011 to Final Office Action dated Apr. 27, 2011, 7 pgs.
U.S. Appl. No. 12/172,037, Non-Final Office Action dated Sep. 1, 2011, 11 pgs.
U.S. Appl. No. 12/172,051, Non-Final Office Action dated Sep. 1, 2011, 11 pgs.
U.S. Appl. No. 12/172,051, Response filed Jan. 31, 2012 to Non-Final Office Action dated Apr. 13, 2011, 14 pgs.

(56) References Cited

OTHER PUBLICATIONS

U.S. Appl. No. 12/394,994, Notice of Allowance dated Jul. 1, 2011, 8 pgs.
U.S. Appl. No. 12/394,994, Response filed Jun. 13, 2011 to Final Office Action dated Apr. 13, 2011, 14 pgs.
U.S. Appl. No. 12/395,083, Advisory Action dated Jul. 6, 2011, 3 pgs.
U.S. Appl. No. 12/395,083, Response filed Jun. 22, 2011 to Final Office Action dated Mar. 22, 2011, 14 pgs.
Office Action issued for Chinese Patent Application No. 201610084740.7 dated May 3, 2018, 2018.
Examination Report dated Sep. 28, 2017, received for European Application No. 08160280.7.

* cited by examiner

| USER MAP | | |
|---|---|---|
| USER IDENTIFIER | CONTENT RETAINER IDENTIFIER | PERMISSION(S) |
| 1 | 1 | ALL |
| 2 | 1 | ALL |
| 3 | 1 | READ |
| 4 | 2 | ALL |
| 2 | 3 | ALL |
| 1 | 5 | ALL |
| 2 | 5 | READ, WRITE |
| 4 | 5 | ALL |

| MEMO ||
|---|---|
| ENTRY IDENTIFIER | 2 |
| ENTRY DATE | 6/1/2007 |
| SUBJECT | REMINDER |
| MEMO TITLE | GROCERY STORE |
| MEMO BODY | GROCERY LIST |
| CONTENT RETAINER IDENTIFIER | 1 |
| OWNER IDENTIFIER | 2 |
| SHARED | SHARED |
| COMPLETE | NO |

| ADDRESS BOOK ENTRY | |
|---|---|
| ENTRY IDENTIFIER | 1 |
| LAST MODIFIED DATE | 6/22/20022 |
| FULL NAME | BRIAN THOMAS |
| MAILING ADDRESS | 1234 ROCKSTAR WAY, CANYON COUNTRY, CA 221387 |
| E-MAIL ADDRESS | bt@rim.com |
| PHONE NUMBER | 818-555-1212 |
| FAX NUMBER | 818-555-1213 |
| NOTES | NONE |
| CONTENT RETAINER IDENTIFIER | 2 |
| OWNER IDENTIFIER | 3 |
| SHARED | SHARED |

| RECURRENCE TABLE | |
|---|---|
| RECURRENCE IDENTIFIER | 3 |
| RECURRENCE INTERVAL | WEEKLY |
| RECURRENCE FREQUENCY | 52 |
| RECURRENCE UNTIL | 12/31/2007 |
| RECURRENCE MONTH | N/A |
| RECURRENCE WEEK START | 01/01/07 |
| RECURRENCE DAY OF WEEK | MONDAY |
| RECURRENCE DAY OF MONTH | N/A |

| SYNCHRONIZATION TABLE | |
|---|---|
| TABLE IDENTIFIER | 1 |
| SYNC IDENTIFIER | 1 |
| USER IDENTIFIER | 3 |
| REFERENCE IDENTIFIER | - |
| DELIVERY STATUS | 8 |
| CONTENT TYPE | 1 |
| REVISION | 3 |
| SEQUENCE | 1 |
| STATUS | FINISHED |

WIRELESS COMMUNICATION SYSTEM INSTALLATION

RELATED APPLICATION(S)

This application claims the benefit of priority under 35 U.S.C. 119(e) to U.S. Provisional Patent Application Ser. No. 60/952,544, filed Jul. 27, 2007 and to U.S. Provisional Patent Application Ser. No. 60/952,551, filed Jul. 28, 2007, which are incorporated herein by reference.

BACKGROUND

Access to information is an important factor in the functioning of modern society. Improvements to the flow of information enhance one's ability to interact with others and respond to changing needs.

BRIEF DESCRIPTION OF THE DRAWINGS

Embodiments of the invention are illustrated by way of example and not limitation in the figures of the accompanying drawings in which:

FIG. 17 illustrates features of an embodiment of a user map.

FIG. 21 illustrates features of an embodiment of memo data.

FIG. 22 illustrates features of an embodiment of an address book entry.

FIG. 23 illustrates features of an embodiment of a recurrence table.

FIG. 24 illustrates features of an embodiment of a synchronization table.

DETAILED DESCRIPTION

The following detailed description refers to the accompanying drawings that show, by way of illustration, details and embodiments in which the invention may be practiced. These embodiments are described in sufficient detail to enable those skilled in the art to practice embodiments of the present invention. Other embodiments may be utilized and structural, logical, and electrical changes may be made without departing from the inventive subject matter. The various embodiments disclosed herein are not necessarily mutually exclusive, as some embodiments can be combined with one or more other embodiments to form new embodiments. The following detailed description is, therefore, not to be taken in a limiting sense.

Figure 1:
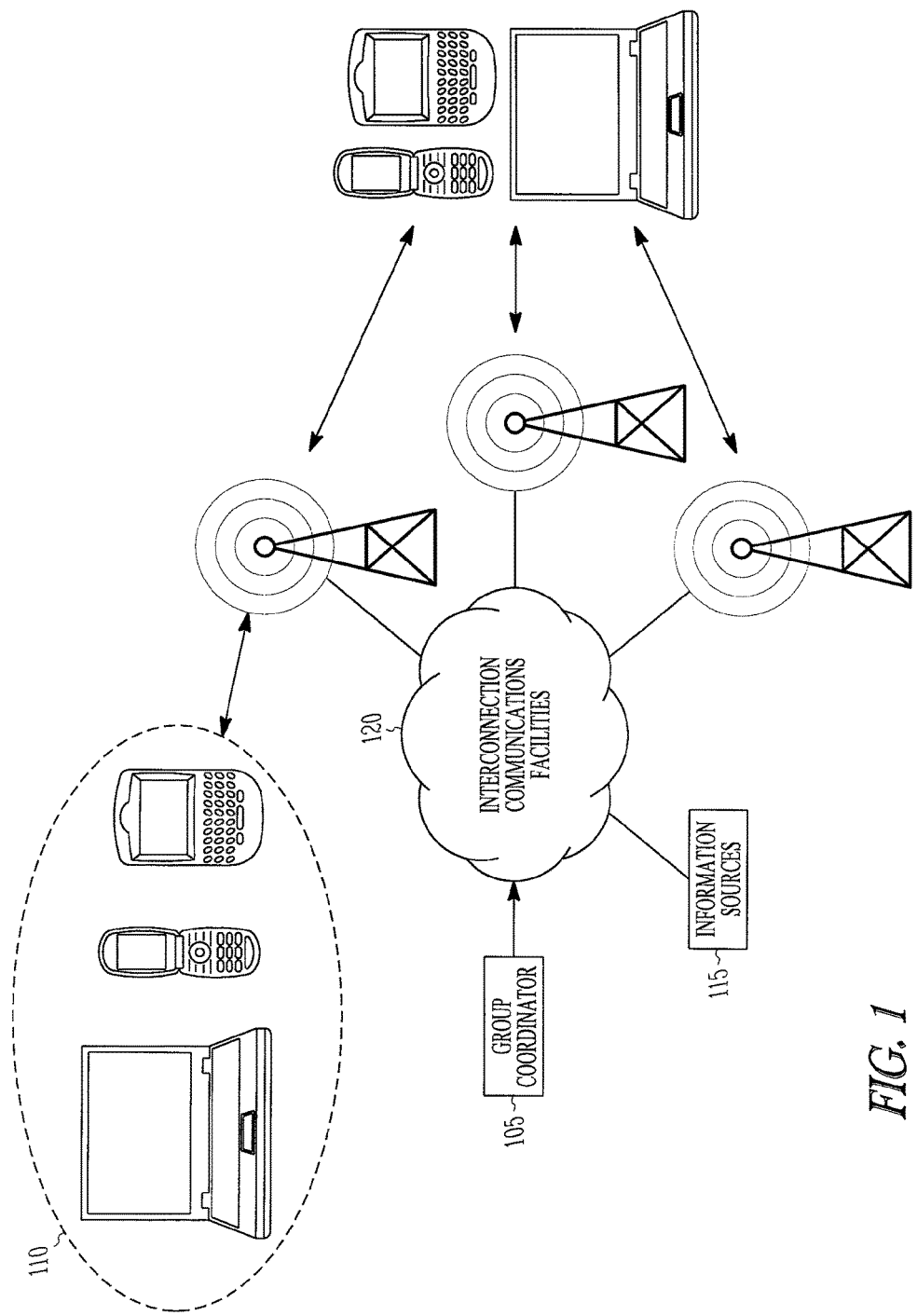
FIG. 1 illustrates features of an embodiment of an architecture for operation of wireless entities to transfer informational content using wireless infrastructure.

FIG. 1 illustrates an embodiment of an architecture for operation of wireless entities to transfer informational content using wireless infrastructure. The example architecture includes a group coordinator 105 that provides a variety of services to a group 110 of mobile wireless devices. The mobile wireless devices may include, but are not limited to, mobile telephones, portable computers, personal digital assistants (PDAs), and other devices that may be conveniently carried by a user and provide wireless communication. Mobile telephones include wireless communication devices that have generally been referred to as cell phones. Mobile telephones may include a wide range of communication devices from portable phones with limited functionality beyond voice communication to portable phones capable of providing the functionality of a personal computer. A personal computer (PC) herein refers to computing devices having an operating system (OS) such that use of the personal computer may be conducted by individuals having little or no knowledge of the basics of the underlying hardware and software that operate the PC and whose operation may be conducted without individuals typically authoring computer programs to operate the computer. Portable computers may include portable personal computers (PC)s. An example of a portable PC is a laptop computer or notebook computer that typically has a display screen, keyboard, underlying hardware and software, and a display pointing device that are all integrated in a housing that can easily be carried by an individual. Some PDAs may be viewed as a type of portable computer.

Group coordinator 105 includes instrumentality to manage the operation of group 110 of mobile wireless devices under a common criterion or a common set of criteria. Group coordinator 105 controls dissemination of information among group 110. In some instances, the information may be shared between one or more of the mobile wireless devices in group 110. In some instances, the information may be shared to less than all the mobile wireless devices in group 110. A privacy status may be used to maintain and regulate the privacy of the information relative to both members of group 110 and entities external to group 110. The instrumentality can be realized in hardware implementations, software implementations, and combinations of hardware and software implementations. Some portions of the instrumentalities may be described in terms of algorithms and symbolic representations of operations on data bits within a machine memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. The instrumentality may operate to process, compute, calculate, determine, display, and/or conduct other activities correlated to processes of a machine such as a computer system, or similar electronic computing device, that manipulates and transforms data represented as physical (electronic) quantities within the computer system's registers and memories into other data similarly represented as physical quantities within the computer system memories or registers or other such information storage, transmission or display devices. The instrumentality may provide personalized capabilities, provide a pathway to other content, or combinations thereof. The instrumentality may use distributed applications, different numbers and types of software based components that couple two or more applications to enable data transfer between the applications, hardware to provide services from a number of different sources, and may be realized on a variety of platforms such as servers and content management systems. The instrumentality may include or provide access to subroutine code, code libraries, application program interfaces such as interpreters utilizing Java EE™, Simple DirectMedia Layer™ (SDL) and DirectX™, combinations thereof, or other such electronic based functionalities.

Group Coordinator 105 may access information sources 115 using interconnection communication facilities 120. Information sources 115 may include a wide variety of sources that provide informational content in various formats. Information sources 115 may include informational content in an open format without restrictions on what entities may access the informational content. Information sources 115 may include informational content in an open format requiring registration by the entities to the informational content without further restrictions. Information sources 115 may include informational content accessible based on a subscription to the informational content. Information sources 115 may include informational content accessible under a privacy condition administered by the corresponding information sources 115.

Informational content may include, but is not limited to, photographs, documents, music, video, audio transmissions, e-mail, messages, telephonic communications, personalized data, computational data, operational data, and combinations thereof. Personalized data may include, but is not limited to, an individual's personal calendar entries, notes, contacts (names, addresses, phone numbers, e-mail address, etc.), memos, and other data personal to an individual. The informational content may be provided in a variety of electronic formats. Such electronic formats may include file formats having extensions that include, but are not limited to, doc, dot, wpd, txt, xis, pdf, ppt, jpg, jpeg, png, bmp, gif, html, htm, zip, tif, tiff, wmf, mp3, and wav.

Interconnection communications facilities 120 may include one or more communication networks that allow transfer of data among group coordinator 105, group 110 of mobile wireless devices, information sources 115, and other communication entities accessible in conjunction with interconnection communications facilities 120. Interconnection communications facilities 120 may be configured as a local area network, a wide area network, or combinations thereof. In addition, interconnection communications facilities 120 may be configured to include a private network. Interconnection communications facilities 120 may be realized using one or more transmission media. Such transmission media may include one or more of fiber optics, wired pairs, cable, or wireless media. In an embodiment, group coordinator 105 and members of the group 110 of wireless devices may communicate directly without using interconnection communication facilities 120. Interconnection communications facilities 120 allow communication between group coordinator 105 and members of group 110 in a wireless infrastructure that includes mobile wireless devices that do not share a common criterion or a common set of criteria with the group coordinator 105 and members of group 110, but use the same wireless infrastructure or at least portions of the same wireless infrastructure.

In an embodiment, group coordinator 105 and group 110 of mobile wireless devices have an intrinsic relationship such that group coordinator 105 operates in large part based on the intrinsic relationship with group 110. The intrinsic relationship may be used to define a share group. A share group is two or more entities that share information in which the entities have a trusted relationship. The trusted relationship may be directed to and held by one of the entities of the group. Group coordinator 105 may be realized as software for integration into a machine that provides simplified operation of the machine around the core of group 110.

Group 110 may be defined by a set of people having a common relationship implementable in group coordinator 105. The set of people may range from one to thousands. For group 110 of mobile wireless devices, the intrinsic relationship may be generated by a common use of group coordinator 105 in which group coordinator 105 shares information among the members of group based on a unique identifier of a user group 110 being a user of group coordinator 105. The relationship may be initiated by installing unique identifiers of each member in a storage medium of group coordinator 105 to create a share group.

In an embodiment, communications between a mobile wireless device of group 110 and group coordinator 105 may be conducted over a secure communication channel. The secure communication channel may be correlated to the unique identification that establishes the group relationship of the wireless mobile device to the share group of group coordinator 105. In some embodiments, group coordinator 105 may be realized as group software installable on an existing machine having a controller, such as one or more processors, and machine-readable medium to store the instructions of the group software. In some embodiments, group coordinator 105 may be realized as a system having hardware and software to execute the functions for the share group defined by group coordinator 105 and group 110 of mobile wireless devices. In various embodiments, a simplified user interface (UI) may be provided to execute and operate the group software of group coordinator 105.

Figure 2A:
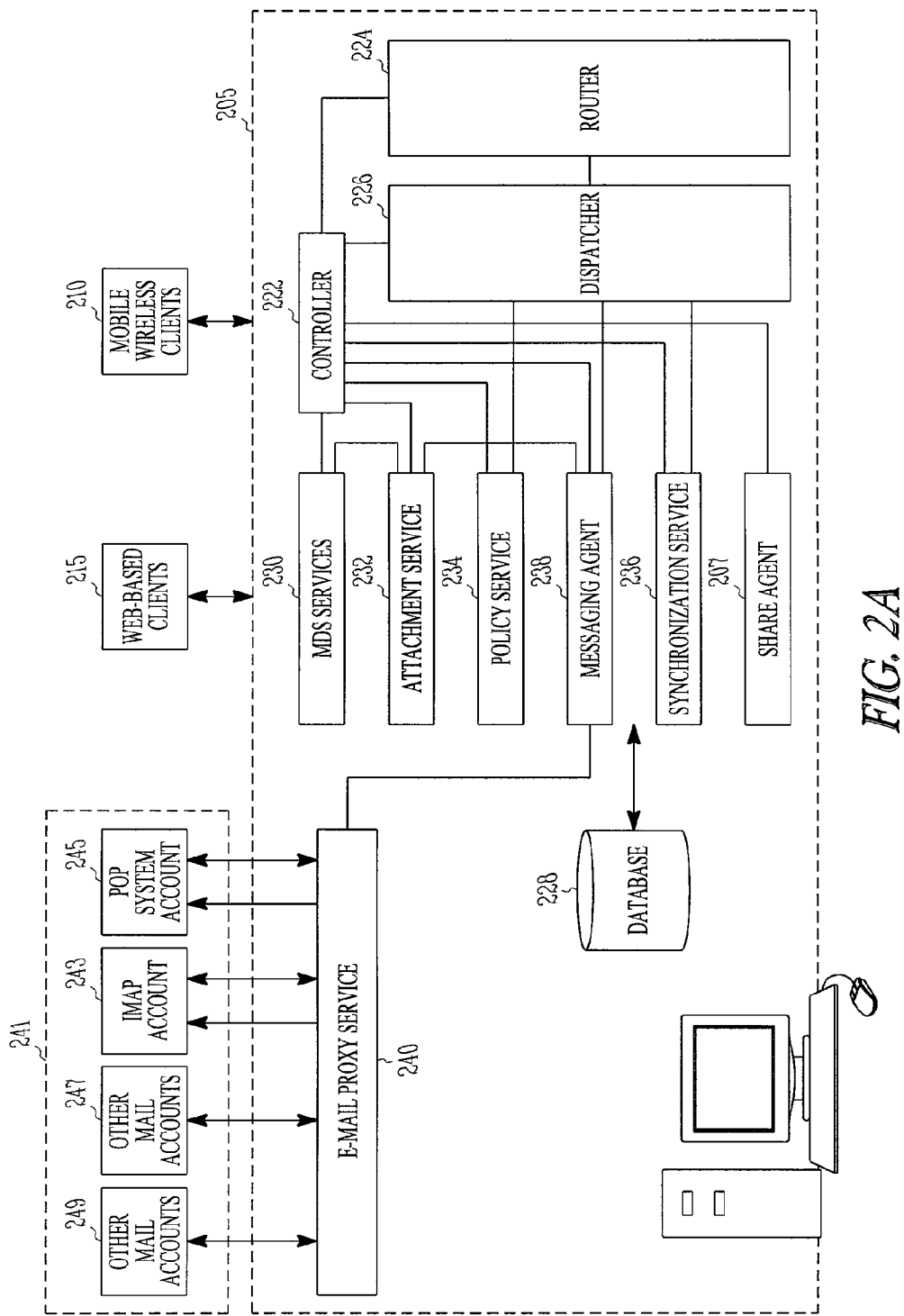
FIG. 2A illustrates features of an embodiment of an architecture for a wireless system including a wireless server.

FIG. 2A illustrates features of an embodiment of an architecture for a wireless system including a wireless server 205. A wireless server is a server configuration that communicates with an entity over a channel established by the entities in a wireless network. Multiple wireless servers may be located at various nodes in a wireless network. Multiple wireless servers may be located at a single node in a communications network. A wireless server may be used to implement services from a network provider. A network provider provides a user with access to a communication network and typically provides access to information services associated with the provided access to a communication network. Wireless server 205 may be associated with multiple network providers dependent upon the network provider services to which the registered users of wireless server 205 have entered agreements. Wireless server 205 may be in a client-server relationships with a variety of systems and devices, including mobile wireless clients 210 and web-based clients 215. Wireless server 205 can be arranged as a group coordinator with respect to mobile wireless clients 210. In an embodiment, wireless server 205 serves as a staging area for the dissemination of informational content to one or more mobile wireless clients of a share group of wireless server 205. Wireless server 205 may communicate with the mobile wireless clients over a wireless channel that is secured. The secure channel may be provided using encrypted data for security. In an embodiment, the data may be encrypted using the advanced encryption standard (AES).

In various embodiments, wireless server 205 may be configured as a set of inter-operative instructions that when processed using a controller, such as a processor, cause performance of functions correlated to interaction within one or more of the wireless clients 210 and/or one or more of the web-based clients 215. Wireless server 205 may have one or more functional sections such as a controller 222, a router 224, a dispatcher 226, a database 228, a mobile data system (MDS) 230, an attachment service 232, a policy service 234, a synchronization service 236, a messaging agent 238, and an e-mail proxy service 240. E-mail proxy service 240 provides a mechanism for wireless server 205 to access a group 241 of mail accounts external to wireless server 205. Group 241 includes two or more mail accounts such as an internet message access protocol (IMAP) mail account 243, a post office protocol (POP) system account 245, a google mail account 247, or other mail accounts 249.

In an embodiment, wireless server 205 includes a share agent 207 configured to control dissemination of information from wireless server 205 to mobile wireless clients 210 or other entities on a shared basis responsive to a determination of a privacy state of the information. Share agent 207 may control one or more of database 228, mobile data system 230, attachment service 232, policy service 234, synchronization service 236, messaging agent 238, and e-mail proxy service 240. Share agent 207 may be distributed among mobile data system 230, attachment service 232, policy service 234, synchronization service 236, messaging agent 238, and e-mail proxy service 240 or structured within one of these wireless server instrumentalities.

Wireless server 205 and mobile wireless clients 210 may operate as a share group having secured communication and secured sharing by means of wireless server 205. Wireless server 205 includes a list of identifiers that uniquely identifies each of the mobile wireless clients 210 as belonging to a user that is also a user of wireless server 205. Establishing the unique identifiers in wireless server 205 and each corresponding mobile wireless clients 210 may define the trust relationship for the share group. The identities of each of the mobile wireless clients may be correlated to its secure remote password (SRP) key. The SRP key may be used for authentication when connecting to a wireless network. The SRP key provides a unique identifier for wireless server 205 and may also indicate usage of a secure channel. The SRP keys may be used for registering the wireless server 205 and determining that wireless server 205 has a unique relationship with a wireless client to communicate with a network infrastructure. SRP key also allows an identification of a wireless client with wireless server 205 over a direct plug-in channel or an unsecured Wi-Fi channel. A SRP key can be implemented in any acceptable manner depending on the security needs of the situation. The implementation may range from simple combinations, such as the current date and time, to the use of complex cryptographic algorithms. Simple implementations may be used in environments that are very benign with respect to security. When security concerns are high, complex cryptographic algorithms may be used. Various combinations of security measures may be implemented with the SRP key.

The share group may have several levels for a privacy state. The privacy state may include, but is not limited to, a status as being owned by one user associated with one of mobile wireless clients 210, a status as being shared among two or more of mobile wireless clients 210 but less than all the mobile wireless clients 210, a status as being shared among all of mobile wireless clients 210, and a status as being shared or accessible by entities outside the group of mobile wireless clients 210 in addition to being shared among all of mobile wireless clients 210. A status as being shared or accessible by entities outside the group of mobile wireless clients 210 may include specified entities permitted accessibility.

The share agent of wireless server 205 may be operable to make informational content available to mobile wireless clients 210. Such informational content may include one or more of audio, video, text, or combinations thereof. An agent is a software entity, which is a set of instructions executable by a machine, capable of acting with a certain degree of autonomy in order to accomplish tasks on behalf of its user machine. An agent is typically defined in terms of its behavior and may execute its function based on the criteria contained within its instruction set. Agent code typically runs continuously to perform one or more activities based on its instructions without being executed directly on demand. Capabilities associated with agents include, but are not limited to, task selection, prioritization, goal-directed behaviour, decision-making without human intervention, engagement of other components through a form of communication and coordination. Agents typically analyze the context of activity in which they operate and react to it appropriately. The share agent can activate and execute its functionality based on an occurrence of an event or a setting in wireless server 205. For example, reception of a specified type of data in wireless server 205 may initiate activity of the share agent to disseminate the data based on stored criteria. Another example includes the selection of a feature by a user of wireless server 205 that results in a change in setting that is one of the events to initiate activity by the share agent.

Wireless server 205 may be realized in various configurations. Wireless server 205 may be configured in a hardware configuration including machine readable medium having machine-executable instructions to execute functions to communicatively operate wireless server 205 with mobile wireless clients 210. Such a hardware configuration may include an integrated structure arranged in a manner similar to a desktop computer. Other hardware configurations may be used for wireless server 205. Wireless server 205 may be configured as group software that may be installed on machine. In an embodiment, wireless server 205 is configured on a personal computer to wirelessly provide private information, information generated on the personal computer, and shared information to one or more of mobile wireless clients 210. A system incorporating wireless server 205 may operate as a group-oriented system having limited administration associated with the operation of wireless server 205. The system may include a user interface to administer wireless server 205 based on a set of administration parameters, where the set is managed by instruction-generated wizards and lists. A wizard is set of executed instructions that query a user for input to direct the user through steps to complete a task.

The various features of wireless server 205, some of which are illustrated in FIG. 2, may be realized in hardware, software, and/or combinations thereof. The features may be configured to run as agents for wireless server 205. In various embodiments, several features may be incorporated in a single agent to operate these features.

Controller 222 may be used to manage database 228, router 224, and dispatcher 226 and to regulate operation of MDS services 230, attachment services 232, policy service 234, messaging agent 238, synchronization service 236. Router 224 is used to route communications to an entity. Router 224 is operable to control communication to a mobile wireless client selected from the mobile wireless clients 210. Such communication may be provided in a format selected from an e-mail message, an instant messaging communication, a page message, a text communication, a telephonic call, or other format. Dispatcher 226 may be used to control the implementations of services on wireless server 205. Based on an acquired license to use wireless server 205 or particular services in wireless server 205, dispatcher 226 may synchronize access to the services based on a time period for the license and the time at which the license was acquired.

Information maintained, processed, and transferred may be stored in database 228. Database 228 may be configured as a distributed database within wireless server 205. Database 228 may be queried and operated using structured query language (SQL). Other query and store mechanisms may be implemented. Database 228 may include information stored in memory external to wireless server 205 that is accessible when applying SQL. Database 228 may include information associated with users of mobile wireless clients 205 including a user identification for each mobile wireless client. Each user identification may be correlated to a wireless service account of the user. Database 228 may be structured such that tables include a correspondence between informational content and folders associated with the content, a privacy status for the informational content, and a correspondence between the privacy status and authorized users of the content. The informational content may include, but is not limited to, calendar data, an address book, a message board, a task monitor, photograph data, music data, video data, text data, user settings, preferences, usage data, or combinations thereof.

MDS 230 may operate with share agent 207 to control dissemination of information from database 228 on a shared basis responsive to a determination of a privacy state of the information. The information may include content of one or more of an interactive calendar, an address book, a message board, a task monitor, or other informational content. MDS 230 may include a resource agent configured to make informational content that is collected from sources external to the system available to mobile wireless clients 210. In an embodiment, MDS 230 may operate with a video agent configured to access a video programming source external to wireless server 205 and to make available video content from the video programming source to each of mobile wireless clients 210 that are authorized to access the video content. The video content may be routed through wireless server 205. Wireless server 205 may include a folder associated with the storage of the video content in memory accessible by wireless server 205. Alternatively, wireless server 205 may set up a path for direct transfer of the video content from the video programming source to each authorized mobile wireless clients 210. Wireless server 205 may include an interface to access the video programming source via a wired network, a fiber network, and a wireless network.

MDS 230 may coordinate retrieval and display of information content with attachment service 232. Attachment service 232 may manage a browser internal to wireless server 205 to browser media files stored on the wireless server. The browser may be controlled through a user interface incorporated in wireless service 205 or under direction of a browser in one of the mobile wireless clients 210. The browser can be used to select a media file by a user of the wireless server 205 or one of the mobile wireless clients 210. A transfer agent may used to send a selected media file to the mobile wireless client corresponding to the browse activity. The transfer may be performed in responsive to reception of a selection indicator from the associated mobile wireless client. When conducting the browsing activity on behave of a mobile wireless client, wireless server 205 may provide to the associated mobile wireless client a representation of each of the media files accessed in the browse activity to provide a basis for the selection of one or more of the media files. The representation of each of the media files may be implemented as a thumbnail of each of the media files.

Policy service 234 may be configured as a flow control agent responsive to a communication policy to limit the flow of information with each of mobile wireless clients 210. Such an agent may be referred to as a server policy agent, SPA. The communication policy includes a set of rules to regulate use of voice communication services on the plurality of mobile wireless clients. The communication policies may also include operational instructions to regulate use of a network external to the system. For example, the communication policy may regulate the flow of information from each of mobile wireless clients 210 to entities on the Internet. Such communication policies may be arranged as a set of policies, where a policy in the set may be applied to one or more of the mobile wireless clients 210. The policies may regulate flow of e-mail messages, instant messaging communications, page messages, text communications, and/or telephonic calls.

Synchronization service 236 includes a sync engine to automatically copy information to each of mobile wireless clients 210 authorized to access the information. In an embodiment, the information can be automatically transferred upon the allocation of the information to a shared folder controlled by database 228. The shared folder may be categorization by its type of content and by the identification of entities that are allowed to access the content. The authorized entities may be one or more of mobile wireless clients 210 and may optionally include other authorized entities. In an embodiment, wireless server 205 is operable to automatically provide data, via synchronization service 236, to a wireless server external to the system upon the data being transferred to shared folder, where the identified shared folder is correlated to a user identification associated with at least one of mobile wireless clients 210. The data may include, but is not limited to personal calendar data, photograph data, music data, video data, text data, or combinations thereof.

Messaging agent 238 includes an e-mail agent to support e-mail services for mobile wireless clients 210 correlated to the user identifications. The e-mail services include coordinating the sending and receiving of e-mail from each e-mail domain corresponding to the user identifications. With wireless server 205 configuration in a group-oriented arrangement, all emails associated with mobile wireless clients 210 may be controlled using messaging agent 238. Operation of messaging agent 238 may be coordinated with e-mail proxy service 240 to collect e-mails from group 241 of mail domains external to the wireless server 205, where each collected e-mail has an addressee corresponding to a user identification that is one of the group users of wireless server 205. E-mails may be collected using protocols under which the host e-mail domains operate. Such protocols may be standard protocols or proprietary protocols. Proprietary protocols may be used by private e-mail domains. Messaging agent 238 and/or e-mail proxy 240 may be configured to route an e-mail message corresponding to one or more of mobile wireless clients without processing through e-mail domains identified in the e-mail message. After routing the e-mail to the corresponding mobile wireless clients, the e-mail message may be processed through the identified one or more e-mail domains. The processing may be logged such that activity from the e-mail domain regarding the pre-processed e-mail message can be ignored.

In an embodiment, wireless server 205 may coordinate back-up procedures with one or more of mobile wireless clients 210. Wireless server 205 can store configuration data within memory internal to wireless server 205, where the configuration data provides information to configure and/or operate wireless server 205. To provide a back-up to restore configuration of wireless server 205, wireless server 205 can automatically provide the configuration data to one or more of mobile wireless clients 210. With the configuration data stored on more than one of mobile wireless clients 210, a reconfiguration policy may be used to restore the configuration to wireless server 210. The reconfiguration policy may address various features for supplying wireless server 210 with its configuration data, which may include a sequencing procedure to provide the configuration data and/or a hierarchy identifying which of mobile wireless clients 210 controls the re-supplying of configuration data. The mobile wireless client 210 operating as a back-up for wireless server 205 may be a hand-held mobile wireless client or a client arranged as a wireless portable computer. The back-up procedure may be correlated to the user identification of the mobile wireless client that specifies that the mobile wireless client belongs to the share group of wireless server 205. In an embodiment, an external server may be used to store the configuration data, where the external server is correlated to one or more of the share group of wireless server 205. For a system in which wireless server is incorporated as a segment of the system, configuration data for the system, in addition to configuration data of wireless server 205, may be automatically stored in the share group of wireless server 205 or an external system correlated to at least one client in the share group of wireless server 205.

In an embodiment, a machine-readable medium stores instructions, which, when performed by a machine, cause the machine to operate as a wireless server. As a wireless server, the instructions cause the machine to communicate with a plurality of mobile wireless clients, to manage information in a database for the wireless server including storing information associated with users of the mobile wireless clients, and to control dissemination of information from the database on a shared basis responsive to a determination of a privacy state of the information. The information associated with the users may include a unique user identification for each mobile wireless client. With the unique identification established only in the wireless server and each corresponding mobile wireless client, the wireless server and the mobile wireless clients define a trusted share group. In an embodiment, the managed information may include content of one or more of an interactive calendar, an address book, a message board, a task monitor, photograph data, music data, video data, text data, or combinations thereof.

In an embodiment, the instructions to operate as a wireless server may include one or more instructions to control communication to a mobile wireless client of a share group. The control of communication can include controlling the format of the communication, allowing communications in a format selected from an e-mail message, an instant messaging communication, a page message, a text communication, or a telephonic call. In an embodiment, the instructions to operate as a wireless server may include one or more instructions to control policies governing the flow of information from the members of the share group.

In an embodiment, instructions for operating as a wireless server include instructions to collect, in the wireless server, e-mails from one or more mail domains external to the wireless server, and to support e-mail services of the mobile wireless clients correlated to user identifications each collected e-mail corresponding to a user identification. The instructions may include one or more instructions to route an e-mail message between the one or more mobile wireless clients without processing through e-mail domains identified in the e-mail message.

In an embodiment, instructions for operating as a wireless server may include one or more instructions to make informational content, collected from sources external to the system, available to the mobile wireless clients. To make information available to the mobile wireless, one or more instructions provide for the information to be automatically copied from the wireless server to each mobile wireless client authorized to access the information. The type of information accessible by a mobile wireless client may be provided by one or more instructions to send, to the mobile wireless client, a representation of each media file stored on the wireless server for which the mobile wireless client is authorized to access. The representation may be made by use of thumbnails of each media file. In an embodiment, instructions to operate the wireless server may include one or more instructions to access a video programming source external to the system and to make available video content from the video programming source to each mobile wireless client authorized to access the video content. The video content may be routed through the machine on which the wireless server instructions reside. In an embodiment, instructions to operate the wireless server may include one or more instructions to automatically provide data in an identified shared folder associated with the wireless server to an external server. The identified shared folder may be correlated to a user identification associated with at least one of the mobile wireless clients.

In an embodiment, the instructions to operate as a wireless server may include one or more instructions to store configuration data specifying a configuration of the wireless server and to automatically provide the configuration data to an external wireless device based on occurrence of a specified event. The external wireless device correlated to a user identification associated with at least one of the mobile wireless clients. One or more instructions may provide for the retrieval of the configuration data from the appropriate mobile wireless client. In addition, various functions for a wireless server as described herein with respect to FIGS. 1 and 2 may be implemented as instructions on a machine readable medium. The various instructions may include establishing secure communications and secure sharing in which the wireless server uses a secure form of identification for each mobile wireless client.

Figure 2B:
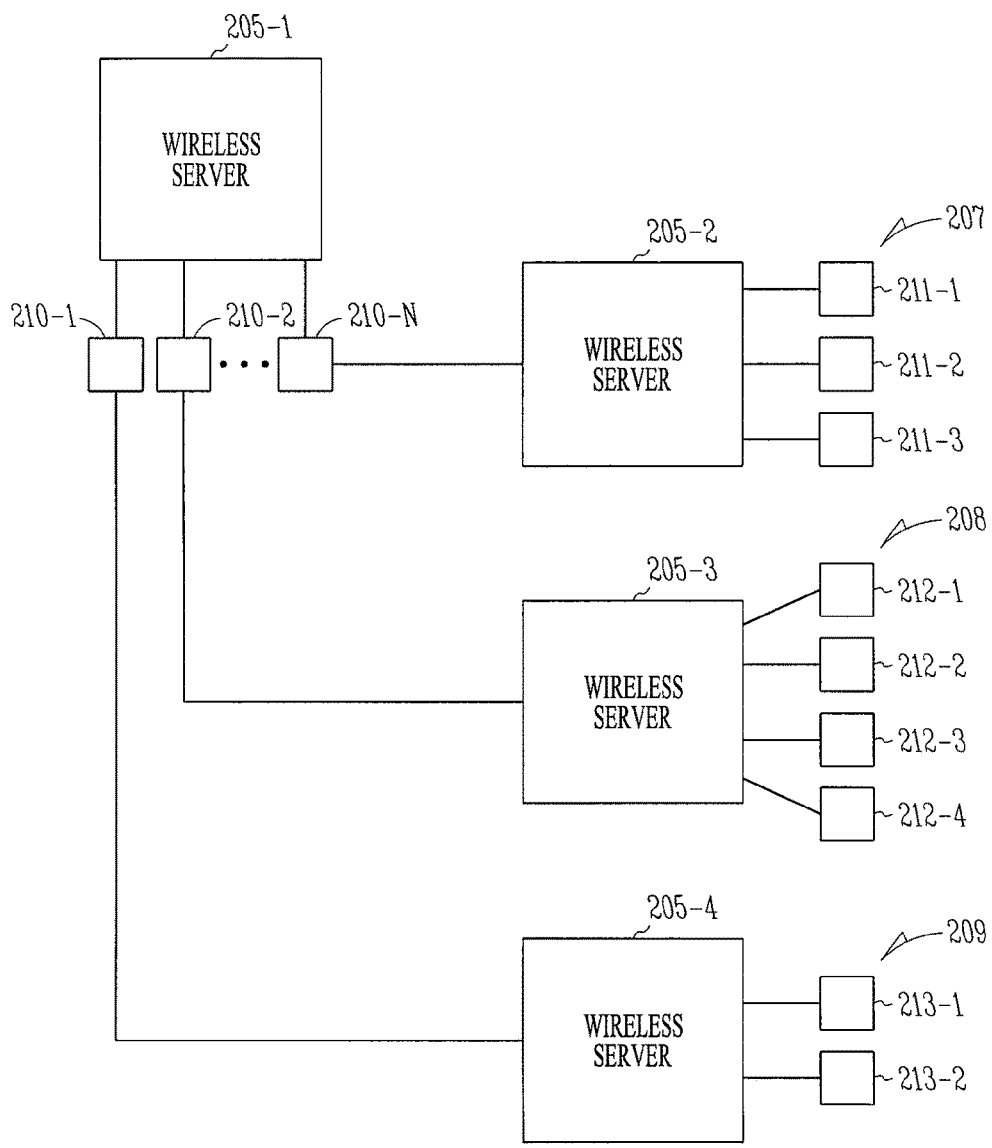
FIG. 2B depicts an embodiment of a wireless architecture in which a relationship between mobile wireless clients and multiple wireless servers is illustrated.

FIG. 2B depicts an embodiment of a wireless architecture in which a relationship between mobile wireless clients and multiple wireless servers is illustrated. Wireless server 205-1 provides wireless services, similar to those services discussed with respect to wireless server 205 of FIG. 2A, to the group of mobile wireless clients 210-1, 210-2 . . . 210-N as a primary wireless server for the group. Members of the group may individually belong to another group associated with another wireless server, in which such a wireless server is secondary wireless server. For example, wireless servers 205-2, 205-3, and 205-4 are configured to groups 207, 208, and 209, respectively. Group 207 includes mobile wireless clients 211-1, 211-2, and 211-3. Group 208 includes mobile wireless clients 212-1, 212-2, 212-3, and 212-4. Group 209 includes mobile wireless clients 213-1 and 213-2. Mobile wireless client 210-N may also belong to group 207 in which case wireless server 205-2 is a secondary wireless server for mobile wireless client 210-N. Mobile wireless client 210-2 may also belong to group 208 in which case wireless server 205-3 is a secondary wireless server for mobile wireless client 210-2. Mobile wireless client 210-1 may also belong to group 209 in which case wireless server 205-4 is a secondary wireless server for mobile wireless client 210-1. In an embodiment, a mobile wireless client is assigned to a primary wireless server as a group member and is assigned, as a group member, to multiple secondary wireless servers.

In an embodiment, the functioning of a mobile wireless client with a primary wireless server and with one or more secondary wireless servers can be controlled by the policies of the wireless servers, where the policies of the primary wireless server dominate the policies of the secondary wireless servers. The assignment of a primary wireless server may include a negotiation in which the user of the mobile wireless client agrees to make a specific wireless server its primary wireless server in return for assignment to the group of the specific wireless server. Such negotiation may result in termination of some service features provided by the wireless servers upon the identification of these wireless servers as being secondary. Due to conflicts between wireless servers, a mobile wireless client may be limited in the number of secondary wireless server groups to which it belongs.

Figure 3:
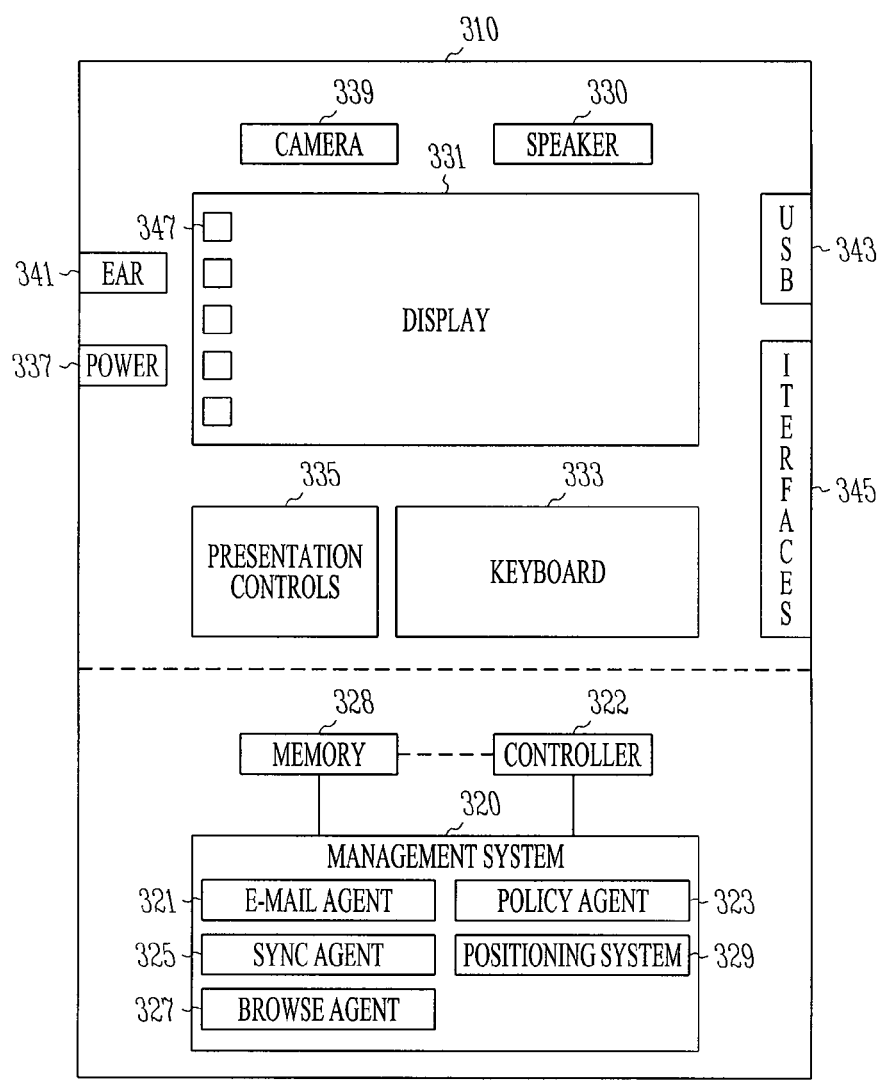
FIG. 3 illustrates features of an embodiment of a mobile wireless client associated with multiple wireless servers in a share group arrangement.

FIG. 3 illustrates features of an embodiment of a mobile wireless device 310, also called herein a user equipment or UE, operable with more than one server or registrable with more than one network provider, or a combination of servers and providers. A UE that can be registered with more than one server or network provider can be called a multiple-mode wireless device, a multiple-mode wireless client, and/or a multiple-mode UE. Alternatively, a UE that has the ability to be registered with, and may be simultaneously connected to, multiple servers, server networks, and/or providers may also be called a multi-register or multi-connect UE.

Mobile wireless device 310 may be used as a client in architectures as depicted in FIGS. 1 and 2. Mobile wireless device 310 includes a controller 322, a memory 328 communicatively coupled to controller 322, and a management system 320 operable with controller 322. Memory 328 may include a secure digital (SD) card. Memory 328 may be directly coupled to controller 322 and coupled by an internal communication bus. Controller 322 may be realized as one or more processors. Management system 320 is configured to manage mobile wireless device 310 operable as a multiple-mode wireless client with respect to each of a plurality of wireless servers. Mobile wireless device 310 is configured to share information among the wireless servers, where the sharing of information is based on user identifications common to the mobile wireless device and the plurality of wireless servers. The shared information may include user-generated data as well as information acquired from sources other than the mobile wireless device 310 and the wireless servers. In an embodiment, mobile wireless device 310 may be a member of a share group of each of the wireless servers.

Mobile wireless device 310 may be arranged as a simple communication device or a communication device with a significant number of features beyond voice communication. With controller 322, memory 328, and management system 320 providing an underlying foundation, mobile wireless device 310 may include a speaker 330, a display 331, a keyboard 333, presentation controls 335, a power interface 337, or combinations thereof. Presentation controls 335 may include controls to direct visual presentations on display, controls to adjust the volume for speaker 330, and controls operable by a user to enhance the audio, visual use, and management of the mobile wireless device 310. Mobile wireless device 310 may include a camera 339, an ear interface 341 for earphones, a USB interface 343, other interfaces 345, or other user accessible options. A graphical user interface for display 331 may provide for the display of icons 337 to provide a shorthand presentation to the user.

Mobile wireless device 310 may include other capabilities not directly visual to a user such as Bluetooth capabilities, access to a Wi-Fi network, and various other capabilities. Mobile wireless device 310 may be structured as a handheld mobile wireless device, as a portable wireless computer, or as a combination of both.

In an embodiment, mobile wireless device 310 is configured as a member of a share group with at least one wireless server. Management system 320 operates to manage and regulate activity of mobile wireless device 310 with the share group. Management system 320 may include an e-mail agent 321, a policy agent 323, a sync agent 325, a browse agent 327, and a positioning system 329. E-mail agent 321 manages the receiving and sending of e-mails for mobile wireless device and is configured to manage its e-mail through at least one of the wireless servers. The transfer of e-mails via one of the wireless servers may be conducted using a secure channel with the wireless server. The secure channel may be correlated to a unique identifier of the mobile wireless device 310 that is also maintained by the wireless server defining a group relationship between the two entities.

Policy agent 323 controls the flow of information and conduct of interaction with wireless servers based on a set or rules or instructions. Such an agent in the mobile wireless device may be referred to as a UE policy agent, UEPA. Though mobile wireless device 310 may be registered in an information and control sharing mode with one or more wireless servers, mobile wireless device 310 and each of these wireless servers have their own individual policy agents. A UEPA is a separate entity from a SPA. In an embodiment, the policy for information flow in mobile wireless device 310 may be based on identification of a wireless server as being part of a share group to which mobile wireless device 310 is a member. If mobile wireless device 310 is a client to multiple wireless servers to which it is in a share group with each wireless server, policy agent 323 determines the controlling instructions for operating among and individually with the multiple wireless servers. Various criteria may be applied by policy agent 323. One set of criteria may depend on the wireless service to which the user of mobile wireless device 310 subscribes. Another set of criteria may depend on the group relationship of each of the wireless servers. A share relationship with a wireless server may involve confidential information that may limit the manner in which mobile wireless device 310 operates on and controls the flow of data among the share groups to which it belongs. Policy agent 323 may include a policy to select one of the wireless servers as a dominant wireless server with respect to the other wireless servers. With a dominant or primary wireless server identified, the set of rules may be prioritized according to the selection of dominant wireless server.

Positioning system 329 may be used in conjunction with policy agent 323 to establish a policy to use based on relative position of mobile wireless device 310, if there no overriding rule to select a primary wireless server. Positioning system 329 can be used to determine a position of the mobile wireless device with respect to each of the wireless servers. Based on this relative position, a wireless server deemed to be closest to mobile wireless device 310 may be selected as the primary wireless server. Positioning system 329 may include use of a global positioning system (GPS) within mobile wireless device 310. In an embodiment, management system 325 may use positioning system 329 to determine that mobile wireless device 310 is within a local area network of only one of the wireless servers. The local area network may be a Wi-Fi network. Determination of the closest wireless server in a local area network such as a Wi-Fi network may use a determination of signal strength associated with each of the wireless servers. In an embodiment, a secure control channel from the mobile wireless device 310 to a wireless server may be used to determine if the mobile wireless device is within a Wi-Fi network associated with the wireless server.

Sync agent 325 may be used to automatically interact with a wireless server identified as being a member of a share group for mobile wireless device 310. Upon receiving a communication from the wireless server that the wireless server has information associated with an identifier correlated to the mobile wireless device 310, sync agent 325 can automatically store the information in memory 328 upon download from the wireless server. Sync agent 325 may also update a table to identify the downloaded information relative to an assigned folder, the source of the information, and/or a privacy status of the information. Sync agent 325 may also upload information to a wireless server based on the relative status of the wireless server with respect to the information. With the assignment of the information to a folder, sync agent 325 agent automatically uploads the information wireless servers identified in mobile wireless device 310 as authorized to automatically receive the information. The transfer from mobile wireless device 310 to one or more wireless servers in response to the sync agent 325 may be conducted over a secure channel established by mobile wireless device 310. The information that may be automatically includes, but is not limited to, personal calendar content, photographic content, music content, video content, text content, or combinations thereof.

Browse agent 327 provides a capability to browse folders within mobile wireless device 310 to select files within mobile wireless device 310 to view content on display 331 or hear content via speaker 330 or other appropriate hearing device. Browse agent 327 may provide a capability to browse folders within wireless servers to which mobile wireless device 310 is in a sharing relationship. Browse agent 327 may control the generation of commands from mobile wireless device 310 to a wireless server to browse folders on the wireless server to which mobile wireless device 310 is authorized access. Such commands include selection of informational content to be downloaded from the wireless server to mobile wireless device 310. In an embodiment, mobile wireless device 310 receives thumbnail content representative of the files being browsed in the wireless server. Downloading information content from the wireless server to mobile wireless device 310 may be conducted in response to selection of the thumbnail via a graphical user interface on mobile wireless device 310. The downloaded informational content may include personal calendar data, photograph data, music data, video data, text data, or combinations thereof. Sync agent 325 may be used in conjunction with to transfer a file from the wireless server to mobile wireless device 310 in response to the selection activity of browse agent 327. The transfer of informational content from a wireless server to mobile wireless device 310 may be conducted over a secure channel established by mobile wireless device 310.

In an embodiment, mobile wireless device 310 may operate in conjunction with a wireless server to act as a backup for the wireless server. Memory 328 may be used to store configuration data for the wireless server. On a schedule basis or on an event driven basis, mobile wireless device 310 receives configuration data from the wireless server. The configuration data can be received as data which overwrites the configuration data in memory 328. The configuration data can be received as a delta or change of configuration in which the changed data which overwrites the corresponding portion of configuration data in memory 328. Upon request by the wireless server, the configuration data may be uploaded to the wireless server.

In an embodiment, a machine-readable medium stores instructions, which, when performed by a mobile wireless device, cause the mobile wireless device to operate as a client of multiple wireless servers. The mobile wireless device may be a hand-held wireless device. The mobile wireless device may be a portable wireless computer. In an embodiment, the instructions cause the mobile wireless device to operate as a multiple-mode wireless client to each of the wireless servers and to share information with the wireless servers. The information can be shared based on a user identification common to the mobile wireless device and the wireless server. The instructions may effectively configure the mobile wireless device in multiple share groups, one for each wireless server in a share relationship with the mobile wireless device. User identification information may be used on to establish secure communication and a secured sharing between the mobile wireless device and a wireless server on a share group arrangement. The shared information may include user-generated data.

In an embodiment, instructions to operate the mobile wireless device as a multiple-mode wireless client may include instructions to regulate functions of the mobile wireless according to a stored policy. The policy may depend on which of the wireless servers is taken to be the primary or dominant wireless server with respect to the other wireless servers. In an embodiment, the primary wireless server may be selected through application of instructions to determine the position of the mobile wireless device with respect to the other wireless servers. The instructions for determining positioning may be employed with a GPS system within the mobile wireless device. The instructions may direct the determination that the mobile wireless device is within a local area network of one of the wireless servers. The local area network may be a Wi-Fi network. One or more instructions may be employed to use a secure control channel to determine if the mobile wireless device is within the Wi-Fi network.

In an embodiment, instructions to operate the mobile wireless device as a multiple-mode wireless client may include instructions to control the flow of information. The instructions for regulating information flow may include, but are not limited to, instructions to manage reception and transmission of e-mails through at least one wireless server in a share group with the mobile wireless device, to share calendar content associated with the user identification, to apply a browser in the mobile wireless device to browse files on a wireless server in a share group with the mobile wireless device, to sync the flow of informational content into the mobile wireless from a wireless server in a share group with the mobile wireless device, to sync the flow of informational content from the mobile wireless to a wireless server in a share group with the mobile wireless device. The informational content may include, but is not limited to, calendar data, photograph data, music data, video data, text data, or combinations thereof.

In an embodiment, instructions to operate the mobile wireless device as a multiple-mode wireless client may include instructions to work in a back-up procedure in conjunction with one of more of the wireless servers. The instructions may direct the mobile wireless to automatically store configuration data from a wireless server and a log a record of the data storage and its associated wireless server. The configuration data may provide information to a system to establish the system as a wireless server. The instructions may direct the mobile wireless device to transmit the configuration data to the appropriate wireless server upon request by the wireless server.

In addition, various functions for a mobile wireless device as described herein with respect to FIGS. 1, 2, and 3 may be implemented as instructions on a machine readable medium in the mobile wireless device. The various instructions may include establishing secure communications and secure sharing with wireless servers using a secure form of identification associated with the mobile wireless device being in different share groups with the wireless servers.

Figure 4:
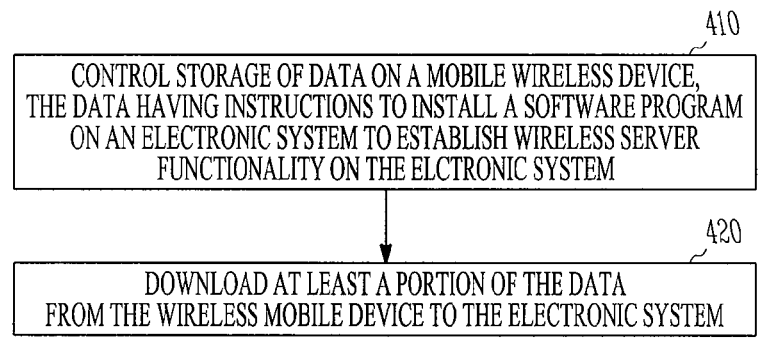
FIG. 4 shows features of an embodiment of a method to establish wireless server capabilities on an electronic system to provide a staging area of wireless communication on the electronic system.

FIG. 4 shows features of an embodiment of a method to establish wireless server capabilities on an electronic system to provide a staging area of wireless communication on the electronic system. At 410, storage of data on a mobile wireless device is controlled. The data may include instructions to install a software program on an electronic system to provide the electronic system with the functionality of a wireless server. The install instructions may include instructions to install the software in stages based on responses received from the electronic system during sequencing of the installation. The install instructions may be organized with instructions to initiate the installation from the mobile wireless device with completion of the installation performed over a network such as the Internet. The install instructions may be organized with instructions to initiate the installation from the mobile wireless device with completion of the installation performed by downloading at least a minimal portion of the program to operate the electronic system as a wireless server. The mobile wireless device may provide a complete version of the wireless service software in a download process. The mobile wireless device may be provisioned with one or more of the installation procedure options at factory manufacture or other process points prior to providing the mobile wireless device commercially. The mobile wireless device provisioned with the wireless server installation capabilities may be a handheld wireless device. The mobile wireless device provisioned with the wireless server installation capabilities may be a portable wireless device.

At 420, at least a portion of the data from the wireless mobile device is downloaded to the electronic system. The download to establish the wireless server functionality may begin with the connection of the mobile wireless device to the electronic system using a physical coupling medium connectable to an interface on the mobile wireless device and connectable to a compatible interface on the electronic system. The interfaces on the mobile wireless device and the electronic system may both be USB interfaces. Other mediums may be used to physically connect the mobile wireless device and the electronic system including, but not limited to, a fiber optic medium and other cable media. The compatibility of interfaces of the electronic system and the mobile wireless device may be realized with a converter that provides coupling of two different types of interfaces. The directing of the installation may be provided using a graphical user interface on a display of the mobile wireless device. The directing of the installation may be provided using a graphical user interface on a display of the electronic system. The directing of the installation may be provided using a graphical user interface on a display of the electronic system after initial install execution is directed from a graphical user interface on a display of the mobile wireless device.

After initial transfer of instructions, a sequence of instructions is provided on a display of the electronic system to direct a user through the installation process. The sequencing may be conducted using a wizard installer. In an embodiment, the installment is provided in an automatic fashion in which there is limited input by the user. The user may be asked to accept or decline a licensing agreement. A response representing a decline may result in termination of the installation of the wireless server software. The termination may result in a termination of a further download of the software. If the software has been downloaded, the termination may result in terminating the installation of the software as an executable entity. Install instructions may include provisions to protect the downloaded software from being executably installed without the transmission of acceptance of the licensing agreement. A response representing an acceptance results in further processing of the installation of the wireless server software. The further processing may include downloading further data from the mobile wireless device and completing the installation. The further processing may include downloading further data from the Internet, or equivalent network, and completing the installation. Additional user supplied information collected in the installation procedure may include name, e-mail address, and country. The user may be queried to supply one's secure remote password (SRP) key. Alternatively, one or more of these personal data items may be automatically downloaded from the wireless mobile device in the installation process.

With the wireless server being installed on the electronic system to serve as a group coordinator for the wireless mobile device that initiated the install process, the SRP key can be automatically downloaded from its associated mobile wireless device. Alternatively, the SRP key can be assessed in a secure process with another system. The downloading of mobile wireless device, user, and security information may be conducted with the physical connection of the mobile wireless device and the electronic system. The downloaded SRP may be controlled by instructions in the mobile wireless device or with instructions downloaded from the mobile wireless device to provide interactive processing of the SRP download and storage on the electronic device. In addition, the name, e-mail address, and country information may also be automatically installed from the associated mobile wireless device. The addition of other mobile wireless devices, to the group of the installed wireless server and initiating mobile wireless, to form a larger trusted share group may be conducted and directed through the installed wireless server. Wi-Fi capability of the installed wireless server may be used to add mobile wireless devices to the share group to the installed wireless server.

Updates to the wireless server may be automatically performed through network connections of the electronic system that incorporates the installed wireless server or through the installing mobile wireless device or other authorized mobile wireless device of a share group of the wireless server. Updates may be provided on the wireless server such that a user may direct when the updates occur including allowing automatic updates. Periodic re-licensing may be implemented in which a decline of the license is followed by automatic shutdown of the wireless server. In addition, refusal of automatic updating of the wireless server may be followed by automatic shutdown of the wireless server. The shutdown event may be based on whether the automatic updates are of a critical nature above some threshold level.

The installed software program includes a set of machine executable executions operable for storage on the electronic system such that a controller of the electronic system can execute the instructions to operate the electronic system as a wireless server in addition to the functions operable by the electronic system. The controller on the electronic system may be realized as one or more processors. The installed wireless server may include the configuration and functionality of the wireless servers discussed with respect to FIGS. 1-3. The installing wireless mobile device may include the configuration and functionality of the mobile wireless device discussed with respect to FIG. 3. The installed wireless service may be arranged as a group coordinator that provides a staging area for the sharing of information with mobile wireless devices whose SRP information stored in the wireless server defines the mobile wireless device as a trusted group member. The operable agents of the wireless server may include all the functionality of the agents and services discussed with respect to FIG. 2, though the agents may be combined or structured in different arrangements of instructions.

Figure 5:
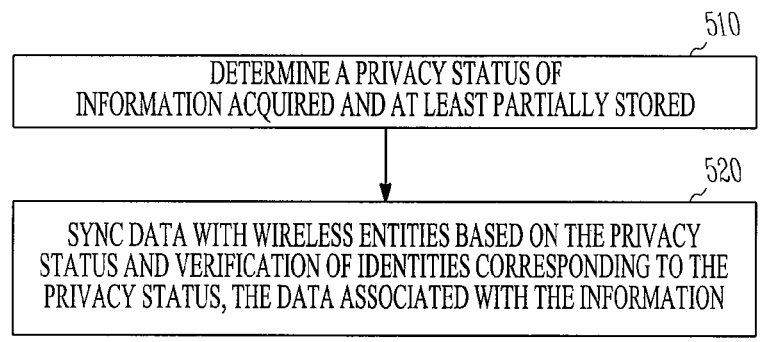
FIG. 5 shows features of an embodiment of a method for synchronizing wireless entities based on a share basis.

FIG. 5 shows features of an embodiment of a method for synchronizing (syncing) wireless entities based on a share basis. Information acquired in wireless entities may be synced among the wireless entities based on a privacy status and verification of identities corresponding to the privacy status. The information undergoing a sync process includes, but is not limited to, personal calendar data, photograph data, music data, video data, messaging data, and combinations thereof. The wireless entities may include a wireless server and a set of mobile wireless clients of the wireless server that together form a share group. In an embodiment, a mobile wireless client of the group is configured to browse files in the wireless server. In an embodiment, the wireless server is configured to provide views of its file content to a mobile wireless client of the group authorized to view the file content of the wireless server.

At 510, a privacy status of information acquired, and at least partially stored, is determined. The privacy status may be determined before and/or during the partial storage of the information. In an embodiment, information is acquired in a wireless server that is a member of a share group including one or more wireless mobile devices that are wireless clients of the wireless server. The wireless server initials and directs a sync process for the acquired information. Using a graphical user interface, a user of the wireless server can assign attributes to the acquired information that generate a privacy status for the information. The information can be flagged to be private to the wireless server. The information can be flagged to be private to a user correlated to one of the wireless mobile devices of the group. The information can be flagged to be shared by several users but not all of the users correlated to the group, which is a form of a limited private status, where each of the several users is correlated to one of the wireless mobile devices of the group. The information can be flagged to be shared by all members of the group, where each of the members is correlated to one of the wireless mobile devices of the group. The information can be flagged to be shared by all members of the group and by entities external to the group. The correlation to a wireless mobile device of the group may be realized as a mapping in the wireless server of a SRP key and user name to a wireless mobile device. The flagging of attributes by the wireless server may be conducted by assigning the information to a folder and associating, in one or more tables, the identity of the information, privacy indicators, and names or other ids of users having the privacy status. Other procedures may be used to provide a privacy status of information with mobile wireless devices. Alternatively, the information may have a predetermined privacy status with identified authorized users such that on reception of the information the wireless server automatically assigns the information to its predetermined folder. The predetermined privacy status may be based on the type of information or a specific identity of the information acquired.

In an embodiment, information is acquired in a mobile wireless device that is a member of a share group including a wireless server. The mobile wireless device may initiate and direct a sync process for the acquired information. The share group may include other mobile wireless devices. Using a graphical user interface on the mobile wireless device, a user of the mobile wireless device can assign attributes to the acquired information that generate a privacy status for the information. The information can be flagged to be private to a user correlated to the wireless mobile device acquiring the information. The information can be flagged to be shared by several users but not all of the users of the group, which is a form of a limited private status, where each of the several users is correlated to one of the wireless mobile devices of the group. The information can be flagged to be shared by all members of the group, each of the members correlated to one of the wireless mobile devices of the group. The information can be flagged to be shared by all members of the group and by entities external to the group. The correlation to a wireless mobile device of the group may be realized by viewing a list of the group members stored on the mobile wireless device that acquires the information or viewing a list of the group members accessible from the wireless server. The flagging of attributes by the mobile wireless device may be conducted by assigning the information to a folder and associating, in one or more tables, the identity of the information, privacy indicators, and names or other ids of users having the privacy status. Other procedures may be used to provide a privacy status of information with other mobile wireless devices of the group. Alternatively, the information may have a predetermined privacy status with identified authorized users such that on reception of the information the mobile wireless device automatically assigns the information to its predetermined folder. The predetermined privacy status may be based on the type of information or a specific identity of the information acquired. In an embodiment, a mobile wireless device may acquire informational content and a wireless server, which shares a group status with the mobile wireless device, may establish the privacy status for the informational content.

At 520 data associated with the information is synced with wireless entities based on the privacy status and verification of identities corresponding to the privacy status. In an embodiment, when information acquired in a wireless server is moved to a sync folder, the wireless server automatically downloads the information to the mobile wireless devices that are identified in tables as being authorized to automatically receive the information. A sync folder is a folder whose contents are designated to undergo a sync process. These sync tables provide the privacy status and verification of the identities for automatic downloading. Sync folders may be created for each group member such that received information associated with the individual folders may be automatically downloaded to the associated group member. The download by the wireless server may be conducted based on the status of storage facilities on the target mobile wireless device. If the mobile wireless device does not have the appropriate storage medium, such as a SD card or other storage medium, or if the capacity of the storage medium of the mobile wireless device is insufficient, the download is not conducted and the mobile wireless device is notified of the lack of capacity.

A capacity limit may be set in the wireless server such that, if the size of the information to be downloaded is larger than the capacity limit, the wireless server will not send the information on a wireless channel. For file content over the capacity limit, the automatic download can be performed when the wireless server determines that a physical connection, such as a USB connection, has been established or that the mobile wireless device has accessed a Wi-Fi network of the wireless server. If such USB or Wi-Fi transport is lost during a transmission transaction, the transaction can be halted and restarted once the transport is reestablished. In addition, syncing of content can be regulated according to other status in the mobile wireless device or in the wireless server. For example, a content sync may be suspended if the battery capacity falls below a specified amount. In an embodiment, content sync may be suspended if the battery life falls below 20% of the full amount and may be resumed if the battery life exceeds 25% of the full amount.

The wireless server can download the information to a mobile wireless device via a Wi-Fi capability, a wired cable, a carrier-based network, or combinations thereof. A mobile wireless device can display the sync process from the wireless server on its screen as the sync process by the wireless server is being conducted. A mobile wireless device receiving the information may assign the information to one of its folder, where the folder may be a sync folder on the mobile wireless device. The mobile wireless device may store informational content received, in a sync process from a wireless server, in a secure digital memory in the mobile wireless device.

In an embodiment, a wireless server in a sync process with a mobile wireless device of its share group downloads a sync indicator to the mobile wireless device. The sync indicator represents that the wireless server has acquired information with the mobile wireless device identified as a share member. The identified information can be downloaded to the mobile wireless server at a later date. The wireless service may automatically download the indicator in response to the information being moved into a folder accessible by the wireless server. The folder may reside on a system external to the system in which the wireless server resides, where the wireless server is authorized to read the information from the external storage medium.

In an embodiment, information acquired in a mobile wireless device can be moved to a wireless server in a share group to which the mobile wireless device is a member. The mobile wireless device can be configured such that when information acquired in mobile wireless device is moved to a sync folder in the mobile wireless device, the mobile wireless device automatically uploads the information to the wireless server. Content in the mobile wireless device can be uploaded to and stored on the wireless server to provide a back-up of the content. The content is not limited to a particular type of content, but may be any content on the mobile wireless device. The mobile wireless device can upload the information to the wireless server via a Wi-Fi capability, a wired cable, a carrier-based network, or combinations thereof. In an embodiment, a mobile wireless device can monitor its operational status and adjust sync processing with a wireless server based on determined the status. For example, content syncing may be suspended if the battery capacity of the mobile wireless device falls below a specified amount. In an embodiment, content syncing may be suspended if the battery life falls below 20% of the full amount and may be resumed if the battery life exceeds 25% of the full amount.

Figure 6:
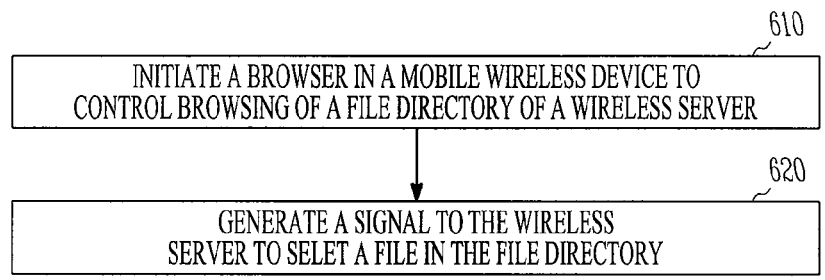
FIG. 6 shows features of an embodiment of a method to browse a wireless server from a mobile wireless device.

FIG. 6 shows features of an embodiment of a method to browse a wireless server from a mobile wireless device. At 610, a browser in a mobile wireless device is initiated to control browsing of a file directory of a wireless server. The mobile wireless and the wireless server belong to a common share group. A user of the mobile wireless device may view the files in the file directory of the wireless server through use of a graphical user interface of the mobile wireless device. At 620, a signal is generated to the wireless server to select a file in the file directory of the wireless server. The mobile wireless device may generate a signal to the wireless server to indicate that the file is to be downloaded to memory in the mobile wireless device, that the file is to be sent as an e-mail attachment, or that the file is to be viewed using an attachment server of the wireless server. The mobile wireless device may browse informational content that includes, but is not limited to, personal calendar content, photograph content, music content, video content, messaging content, and combinations thereof. The browsing activity may include browsing files having a format indicator selected from, but not limited to, doc, xls, pdf, ppt, jpg, png, bmp, gif, mp3, and wav.

Figure 7:
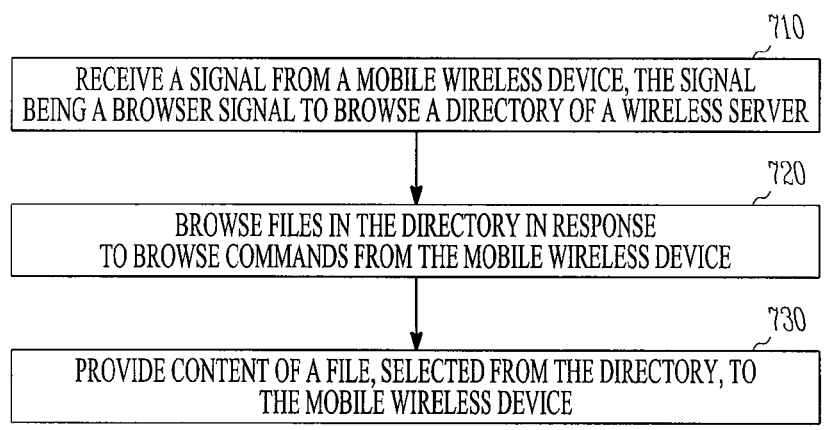
FIG. 7 shows features of an embodiment of a method to select and provide content from a wireless server to a mobile wireless device based on commands from the mobile wireless device.

FIG. 7 shows features of an embodiment of a method to select and provide content from a wireless server to a mobile wireless device based on commands from the mobile wireless device. At 710, a signal is received from a mobile wireless device, where the signal is a browser signal to browse a directory of a wireless server. The mobile wireless and the wireless server belong to a common share group. At 720, files in the directory are browsed in response to browse commands from the mobile wireless device. The browse commands may include a select command to select a file for use by the mobile wireless device.

At 730, content of a file selected from the directory is provided to the mobile wireless device. The selected file may be sent from the wireless server to the mobile wireless device by downloading the file as data to be stored on the mobile wireless device, by sending the file as an e-mail attachment, or by providing viewing of the file using an attachment server of the wireless server. The browsed informational content may include, but is not limited to, personal calendar content, photograph content, music content, video content, messaging content, and combinations thereof. The browsed files may have a format indicator selected from, but not limited to, doc, xls, pdf, ppt, jpg, png, bmp, gif, mp3, and wav.

Figure 8A:
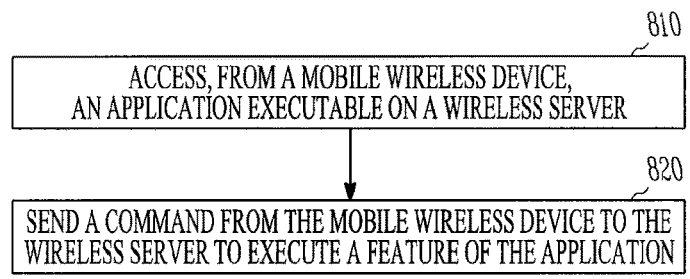
FIG. 8A shows features of an embodiment of method including a mobile wireless device accessing and controlling an application executable on a wireless server.

FIG. 8A shows features of an embodiment of method including a mobile wireless device accessing and controlling an application executable on a wireless server. In various embodiments, the application may be different from an application to maintain and control a wireless communication link between the mobile wireless device and the wireless server. At 810, an application executable on a wireless server is accessed from a mobile wireless device. The mobile wireless device has an authorization to access the application as a member of the share group of the wireless server. The authorization may be correlated to the SRP key of the mobile wireless device that is also stored on the wireless server. Various types of applications in the wireless server may be accessed by the mobile wireless device. For example, a data manipulation application that performs complex computations ("data crunching") that uses a large amount of memory may be accessed to run in a server rather than the mobile wireless device. The application may reside in the wireless server. In an embodiment, the application is virtually resident on the wireless server. The virtual residency occurs with the application stored in another server that is accessible by the wireless server. In an embodiment, an application to control and/or monitor functions of a facility is accessed. The application may control and/or monitor, for a facility, one or more of a heating management, lighting management, water management, physical security, management of a web cam. An application to control and/or monitor functions of facilities different from the primary facility may be accessed.

In an embodiment, the mobile wireless device receives data regarding the application from the wireless service. The received data may be used to display a graphical user interface on the mobile wireless device, where the graphical user interface is operable to initiate commands for the application. Alternatively, data for a graphical user interface to control and/or manage an application may be stored in the mobile wireless device. The graphical user interface of the mobile wireless device may mirror the graphical user interface that the wireless server has to control and/or manage the application through user interaction. The graphical user interface of the mobile wireless device may have a reduced set of features in common with the graphical user interface of the wireless server to control and/or manage the application through user interaction. With the initiation of commands in the mobile wireless device, the underlying processing of the application, directed by the commands, is performed on the wireless server.

At 820, a command is sent from the mobile wireless device to the wireless server to execute a feature of the application. The feature may be different from features to maintain and control a wireless communication link between the mobile wireless device and the wireless server. The mobile wireless device may receive a result of the execution of the feature in the wireless server. A computational result may be provided with a complete analysis including various graphs and flow charts. A result from a monitoring application may be provided with an operational status of a facility including a current value of the status, a history of the status, and a trending analysis of the status. For an application of a video cam, the result received in the mobile wireless device may be a video of activity monitored by the video cam. For example, a video of a storage facility may be provided to monitor the security of the storage facility. A video of a child's living areas may allow a parent to monitor activity of the child and the care provider of the child.

In an embodiment, a privacy status may be generated in the mobile wireless device and operatively attached to the results from executing the application in the wireless server. The privacy status may be transmitted to the wireless server to set accessibility of the results relative to other members of the share group and other entities that may access the wireless server.

Figure 8B:
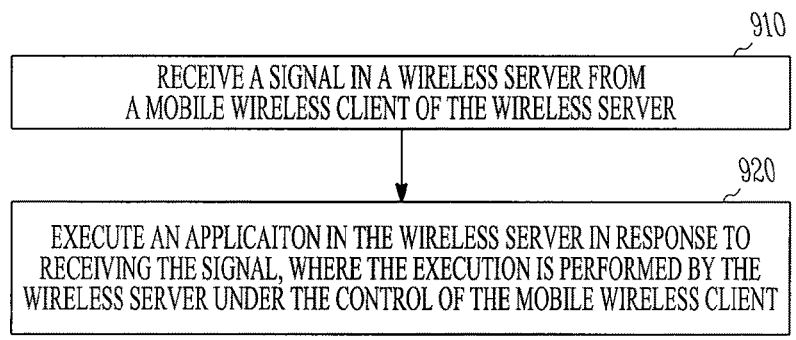
FIG. 8B shows features of an embodiment of method including a wireless server executing an application resident on the wireless server under the control of a set of commands from a mobile wireless client.

FIG. 8B shows features of an embodiment of method including a wireless server executing an application resident on the wireless server under the control of a set of commands from a mobile wireless client. In various embodiments, the application may be different from an application to maintain and control a wireless communication link between the mobile wireless device and the wireless server. The mobile wireless device and the wireless server are members of a common share group. At 910, a signal is received in a wireless server from a mobile wireless client of the wireless server. The mobile wireless client is identified in the wireless server as a member of a share group of the wireless server and an authorized user of an application accessible by the wireless server. On receiving a signal corresponding to an application accessible by the wireless server, the wireless server may send data to the mobile wireless device to display a graphical user interface on the mobile wireless device.

At 920, an application in the wireless server is executed in response to receiving the signal, where the execution is performed by the wireless server under the control of the mobile wireless client. The application may be different from an application to maintain and control a wireless communication link between the mobile wireless client and the wireless server. The application executed by the wireless server may be stored in the wireless server or stored in an external system accessible by the wireless server. The wireless server may execute a data manipulation application. The wireless server may execute an application to control and/or monitor functions of a facility. The operations for the facility that are controlled and/or monitored may include one or more of heating management, lighting management, water management, physical security, and management. Operational parameters of a facility different from the primary facility may be controlled and/or monitored via the execution of the application by the wireless server.

The result of the execution of the application may be transmitted to the mobile wireless device as a simple result or as a result accompanied by various levels of analysis and presentation.

A privacy status may be attached to the results in the wireless server. The privacy status can be provided by mobile wireless device that controls and/or directs the execution and/or processing of the application by the wireless server. The privacy status may be updated in a database of the wireless server relative the controlling mobile wireless client, other mobile wireless clients of the wireless server that are share members with the wireless server, and other entities that access the wireless server.

In various embodiments, the ability to run home control or home monitoring programs may be realized using the secure connection from a home wireless server to a UE. Various devices, such as but not limited to cameras, baby-sound-detection equipment, other baby monitors, personal devices, personal programs, and other personal monitoring devices can be coupled to a home-based wireless server that controls access to the UE through a network such as made available by a network provider. Similarly, this allows for the private monitoring of small businesses, including remote, secure access of inventory control figures, production figures, monitoring of stocking areas and warehouses for shrinkage control, making sure off-hours personnel at public counters are not being threatened, and similar situations amenable to monitoring solutions. The various devices may be configured to provide outputs that may be monitored by the UE through the home-based wireless server both securely as well as without use of a third party and/or without making the output publicly available such as being broadcast over an internet type facility. Such an arrangement allows an individual user of the UE and the wireless server to avoid being forced to use third party monitoring services to obtain such personal monitoring. In addition, such an arrangement allows an individual user to maintain privacy with respect to one's home, business, and personal life by not making the monitored output accessible over public internets. The secure monitoring of the home and/or business may be provided with the output from monitoring devices being providing as encrypted data.

Figure 9:
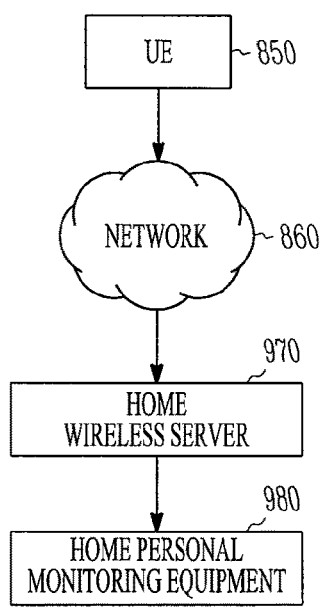
FIG. 9 shows features of an embodiment of an arrangement of a home-based wireless server coupled to home personal monitoring equipment with the home-based wireless server communicatively coupled to a mobile wireless client.

FIG. 9 shows an embodiment of an arrangement of a home-based wireless server 970 coupled to home personal monitoring equipment 980 with the home-based wireless server 970 communicatively coupled with a mobile wireless client 850. The various components of home personal monitoring equipment 980 may be distributed throughout a home. Each component may be configured to perform a different personal monitoring function. The home personal monitoring equipment 980 may include, but is not limited to, cameras, baby-sound-detection equipment, other baby monitors, personal devices, personal programs, and other personal monitoring devices. The components of home personal monitoring equipment 980 may be coupled to home wireless server via a direct connection or on a local area network. The direct connection or the local area network may be a wired connection, a wireless connection, or a combination of wired and wireless connections. The local area network may be a home Wi-Fi network, either secure or unsecure. Home-based wireless server 970 may be operatively coupled to UE 850 over network 860. Network 860 may be any operable connection, including the use of private local networks and/or commercial providers. Home-based wireless server 970 may also be operatively coupled to other UEs associated with members of the home in which home-based wireless server 970 is located, where these other UEs are wireless clients registered with home-based wireless server 970. Home-based wireless server 970, UE 850, and the other wireless clients of home-based wireless server 970 may be configured according to the various embodiments for wireless servers and multiple-mode mobile wireless devices discussed herein.

UE 850 may operate as discussed with respect to FIG. 8A in which the application includes control and management of home-based monitoring equipment 980. By controlling monitoring using UE 850, an individual may monitor and control the home environment while travelling away from the home. Over the secure channel with home-based wireless server 970 locally coupled to monitoring equipment 980 located in the individual's home, the individual may maintain private control of the monitoring signals sent from the home.

Home-based wireless server 970 may operate as discussed with respect to FIG. 8B in which the application includes control and management of home-based monitoring equipment 980. Home-based wireless server 970 may accept control and command from UEs that are registered with home-based wireless server 970 or a subset of registered UEs, where the registration may include a correspondence between a given UE and the home. Under the control of UE 850, home-based wireless server 970 provides signals to monitoring equipment 980 to obtain monitoring information. The monitoring information may include data, audio, video, pictures or combinations thereof. Home-based wireless server 970 locally coupled to monitoring equipment 980 located in the individual's home provides private control of the monitoring of the home and activities in the home. The secure channel provides a mechanism for the information obtained by home-based wireless server 970 to be provided to UE850 under control of UE850 at any anytime without use of a third party, which is not registered with home-based wireless server 970, to manage the monitoring event. Similarly, FIG. 9 is equally applicable to small business applications as well as home-based applications. The differences will be in what is being monitored or what remote programs are being run. For example, a small business owner may want to monitor stock inventory, small production lines, storage areas, current retail sales activity, and counter areas using the same capabilities, types of monitors and devices, and having the same benefits as described above for the home owner.

Figure 10A:
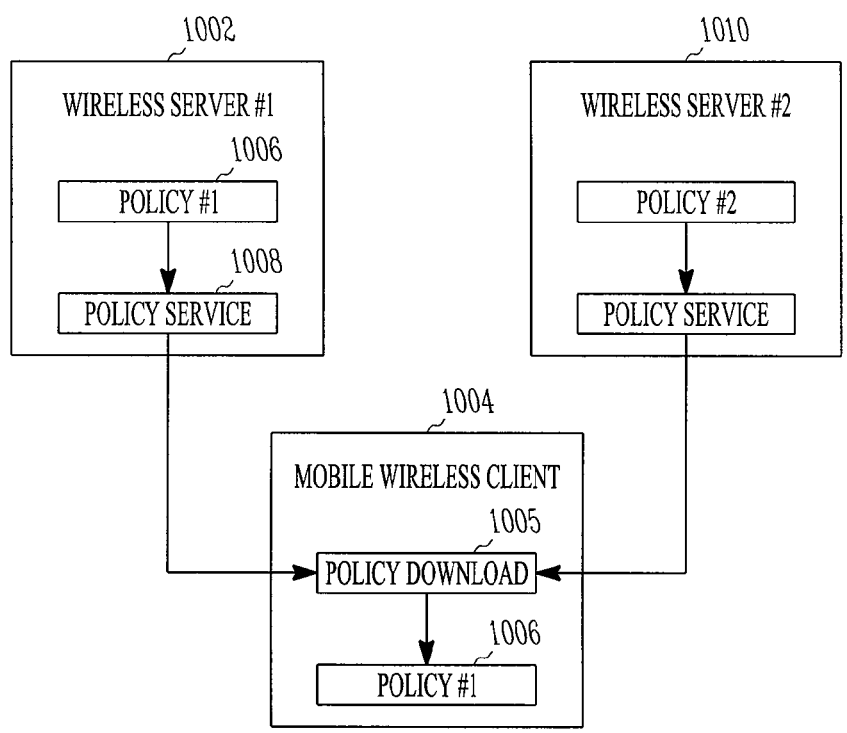
FIGS. 10A, 10B, and 10C show embodiments of systems and methods for using a mobile wireless client with more than one wireless server.

Referring now to FIG. 10A, there is illustrated an example system and method for using a mobile wireless client with more than one wireless server. According to one example embodiment, there is provided a first wireless server 1002 communicatively operable with a plurality of mobile wireless clients such as mobile wireless client 1004. The first wireless server includes for example, as described herein elsewhere, configuration data associated with at least one, such as client 1004, of the plurality of mobile wireless clients supported by the wireless server 1002, and a database operable on the server and configured to store information associated with users of the mobile wireless clients including a user identification for each mobile wireless client. Wireless server 1002 further includes a program configured to control dissemination of information from the first database to one or more of the plurality of mobile wireless clients.

Wireless server 1002 further stores or maintains at least one policy 1006 that is associated with one of the mobile wireless clients, for example client 1004. Policy 1006 may be used to govern permissible modes of operation of the client 1004, and to establish various operating parameters, such as what type of Internet access is permitted with the wireless client or the type or duration of telephone calls that may be placed using the client 1004. Other uses for policy 1006 further include allowing or disallowing users to of the mobile wireless client to enable or disable certain features of the client 1004, such as password protected operation.

Figure 10B:
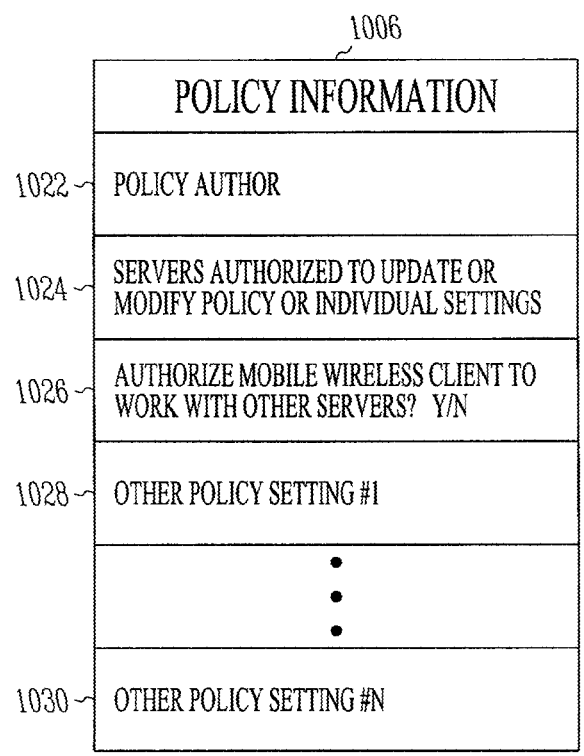

As illustrated in FIG. 10B, policy 1006 may include various policy information including but not limited to the author 1022 of the policy, an identification 1024 of any servers authorized to update or modify the policy 1006 or individual permissions or settings of the policy (such as settings 1026, 1028 and 1030). The policy 1006 may further, for example, authorize 1026 the wireless client 1004 to work with other wireless servers, such as server 1010 of FIG. 10A, to support wireless e-mail or calendaring and other server functions provided by the other server 1010, as described herein. Policy 1006 may further specify one or more other policy settings 1028 to 1030.

Wireless server 1002 further includes a policy service 1008 that allows a user of the wireless server 1002 to prescribe a policy 1006 for one or more mobile wireless clients, and in particular client 1004 in the example of FIG. 10A. Service 1008 further provides that the policy 1006 may be downloaded to wireless client 1004, if permitted. Such downloading may be directed or controlled by a policy download or modification program 1005 on the wireless client 1004.

Figure 10C:
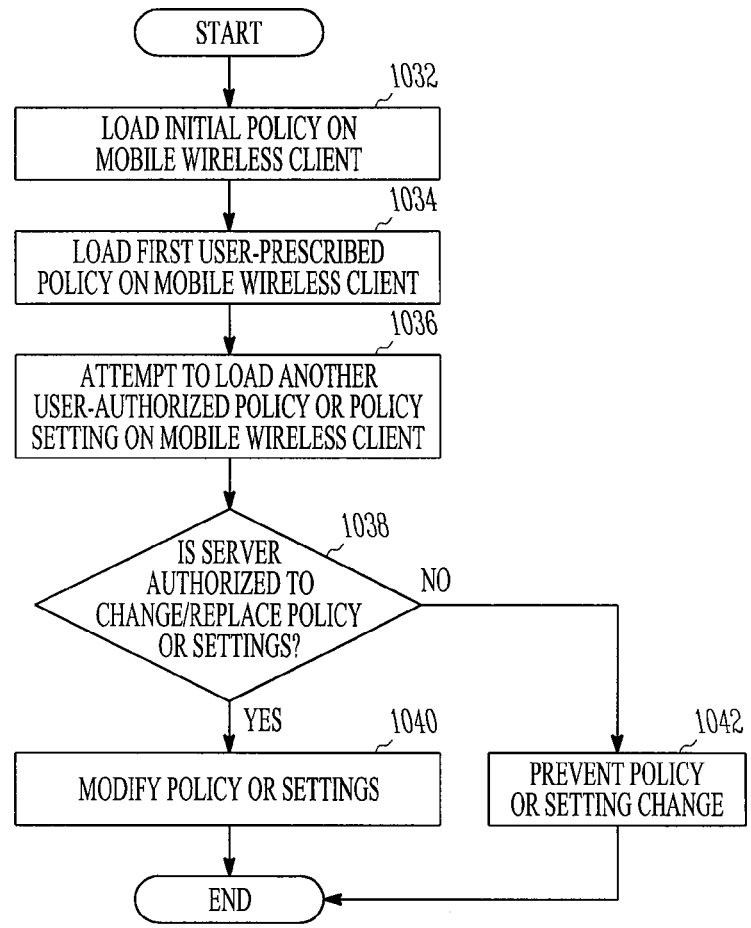

According to one example embodiment as illustrated in FIG. 10C, a mobile wireless client 1004 may be initially loaded 1032, for example at the factory or after being initialized, with an "initial" policy, such as a policy set by the factory. That policy may allow, for example, for it to be replaced with a user-prescribed policy that is loaded 1034 on the mobile wireless client 1004 for example from the first wireless server 1002. This would typically be handled by the UE's UEPA. The policy loaded by the server 1002 may specify, for example, that no other wireless server such as server 1010, may replace or modify, in whole or in part, the policy loaded by the server 1002, thereby precluding the policy from being changed by any server other than server 1002. Thus, any attempt 1036 to load another policy causes the mobile wireless client 1004 (or alternatively the server attempting to modify the policy) to check the policy currently loaded on the wireless client to determine if 1038 the policy may be changed or replaced. If it may be, the new policy or changes to the policy, such as individual settings, may be made 1040. If the policy may not be changed by the server requesting to do so, the policy is prevented 1042 from being replaced or modified. Accordingly, in this respect, the policy establishes that one of the servers such as server 1002 is a primary server that controls all policy permissions and changes, and the other server 1010 is a secondary server that may not override policies set by the primary server 1002 unless permitted to do so by the policy set by server 1002.

In an embodiment, wireless server 1002 includes a flag or field, stored on wireless server 1002, that indicates if the UEPA on a registered UE, such as UE 1004, can modify the policies of wireless server 1002 at UE 1004. This flag or field may be referred to as a policy modify flag, or, if the context is clear, simply as a modify flag. In some embodiments the modify flag can be a single bit, having the values T or F (1 or 0). Alternatively, the modify flag may be more complex and be enabled to indicate under what conditions polices may be modified. One embodiment of a more complex modify flag includes the identity of other servers that are allowed to override the policy of this server, while other servers are not. Any combination of policies is possible, as defined by the servers' SPAs and the UE's UEPA, but some are more probable than others. For example, the SPA of wireless server 1002 may have a policy of logical truth where "T", or yes, defined to mean any UEPA configuration is allowed, which may be used in benign environments. Alternatively the SPA may have a policy of "F", or no, defined to mean that no modification of a policy may be made by the UEPA. In an embodiment, "F", or no, may also indicate that implementation of an arbitrary UEPA configuration is not allowed.

Thus, according to one embodiment, a first wireless server 1002, such as a corporate or enterprise server, may establish a policy to be loaded on a wireless client 1004, wherein that policy may allow the client 1004 to work with other wireless servers such as server 1010 that may be established for the family members or other small group associated with the user of the client 1004. The authorizations may include permission for the server 1004 to synchronize with other e-mail services and domains, such as the user's private or non-business e-mail address, or provide other services such as calendaring between the users of the server 1010.

Each wireless server, such as wireless servers 1002 and 1010 that operate with UE 1004, has its own SPA, where UE 1004 is in a multiple registered mode with wireless servers 1002 and 1010. The SPA of each server may have different policies for different UEs registered with the server even though these different UEs share information. To facilitate different sets of policies for different UEs, the SPA may be realized as a group of SPAs within the server with each SPA assigned to direct subsets of the different UEs. The subsets may consist of one UE.

In one configuration of an SPA, the SPA may have a policy that places no controls on UE 1004 such that any activity on connected UE 1004 is allowable. In some embodiments, there may be one or more servers that have no SPA (typically, already existing servers) which will often mean there will be no modify flag. Servers can provide a modify flag without a SPA, but these are currently expected to be a minority embodiment. In some embodiments, the UEPA may be set to recognize a server's or provider's identity and apply a preprogrammed set of modification rules in the UE, so no flag is needed. The UEPA of a UE connected to a server/provider with no modify flag and no preprogrammed modification rules can be provided with a default. The default action may be set by the UE provider, or may be selectable by the user in some embodiments. In one embodiment, when there is no modify flag and no preprogrammed set of modify rules corresponding to a server or provider, the UEPA is set to interpret the no-modify-flag condition as one of either "T" or "F". "T" means that the UEPA will either allow policy modifications to this server's/provider's policies, and, this server/provider will take lower precedence as compared to other servers/providers. "F" means that no policy modifications may be made to this server's/provider's policies, and, this server/provider takes higher precedence as compared to other servers/providers. In higher security environments, the default is expected to be "T", since a server/provider with no modify flag or preprogrammed modify rules will be interpreted as a higher-risk connection. Any server in a setting where security is more than nominal, which does not have a modify flag (and therefore probably no SPA), may not the primary server for the UE. That is, in high security environments, the primary or dominant server should always be current in software settings, should have an SPA, and should have a modify flag. If the user connects to a server having no modify flag (and typically no SPA), it may be assumed that it is a secondary server of unknown security (not trusted). In such a case, the UEPA, which assigns modify values, should use a default value of "T" for the modify value for the untrusted server, meaning that policies of the untrusted server are presumed modifiable in accordance with other, more trusted servers' policies.

In an embodiment, a UE, such as UE 1004, is registered among multiple wireless servers, such as wireless servers 1002 and 1010, though UE 1004 is not limited to registering with two wireless servers, where the UEPA of UE 1004 receives policy information from each of the SPAs of wireless servers 1002 and 1010. The SPAs of multiple wireless servers, such as wireless servers 1002 and 1010, may have a hierarchical order in terms of which SPA provides policies fully implemented by the UEPA. A hierarchy may be implemented as simple dominance in which one SPA's policies are implemented and policies of other SPAs are not used at all. For example, if the user of the UE is a registered member of a corporate server and a home-based wireless server in which the corporate server is designated as dominant and has a policy of not sharing information outside the registered members of the corporate server, then a policy of assigning different sharing status for the UE with different members of the home-based server may not be implemented in the UE. Alternatively, the non-sharing information may be limited to information acquired through the corporation server such that a portion of the non-dominant servers policy to assign different sharing status may be implemented with respect to information acquired other than through the corporate server. Hierarchies may be implemented as subsets, that is, one SPA may be designated as dominant, and other SPA policies may be implemented or any portion of other SPA's policies may be implemented, where such polices or portions thereof are subsets of, or do not interfere with, the dominant SPA's policies. The implemented policies in a subset arrangement are logically consistent with each other. For example, if a dominant SPA limits international calls to a set of countries and a non-dominant SPA limits international calls to half of the same set of countries, the policy of the non-dominant SPA is a subset of the policy of the dominant SPA. Policies conflict if the policies are logically unresolvable. For example, unlimited minutes of use by the UE may be allowed by the SPA from a corporate server and limited minutes of use by the UE may be set by the SPA from a home-based server in which the policies are logically resolvable by associating two different accounts to the two different policies. For a situation in which members registered with a corporate server as a dominant server are not allowed to share any information through their UE, a policy that allows sharing from a non-dominant server would not be logically consistent with the policy of the dominant server.

In an embodiment, the UEPA may evaluate the policies provided by the SPAs of multiple servers by checking the modify flag controlled by each SPA of the multiple servers. Each SPA may send the status of its associated modify flag in response to a request from the UEPA, in establishing a connection with the UE, or during other policy establishing procedures with the UEPA. If the modify flag from a SPA is set to "no" or "F", then the policy cannot be modified and the UEPA must determine if the policies associated with this SPA can be made consistent with the information the UEPA has from the other SPAs to which the UE is also connected. For example, if the UE is logged into two servers that both have their modify flags set to "F" for the UE with one server designated as the dominant server, then the policies of the non-dominant server that are not consistent with the policies of the dominant server are ignored. If all policies of the non-dominant server conflict with those of the dominant server, the UEPA may direct a process for the UE user that would allow the UE user to re-evaluate the user's choice of servers to which the UE is registered. If no policies are set as dominant and SPA policies are received at a UEPA that conflict (logically unresolvable) with existing SPA policies, the default action of the UEPA may be to not allow the received policies and/or to hangup the connection being made with the UE that contains SPA policies not consistent with existing connections and/or registrations. If one server has its modify flag set to "T" for the UE and the other server has its modify flag set to "F", then the logical requirements of both servers can still be met, since the UEPA following the non-modifiable policies is allowed by both SPAs.

In an embodiment, a wireless server may be configured to have multiple groups of UEs registered as independent groups with the wireless server. In addition, a UE may register as a member of no group, one group, or a plurality of groups on the wireless server. The SPA may send multiple sets of policies to the UE, based on the groups to which the UE is registered with the server. The UEPA of the UE may resolve the different policies as discussed above. Alternatively, the SPA may resolve conflicts between policies of different groups and send a set of resolved policies to the UEPA for each group in which the UE is registered.

In an embodiment, a UEPA of a UE may be configured such that it presents a logical interface to each server to which the UE is connected such that the logical interface functions as if there is only one server connected. For such a configuration, the default status of the UEPA is to keep each connection independent such that there is no sharing of any information between servers and/or connection. However, the UEPA may direct the display of a split screen on the UE in which the multiple independent connections may be shown. Using the split screen, the UE user may manage the different connections. A UE registered and/or connected to a plurality of servers and/or providers may have a UEPA configured such that no sharing occurs between the servers. In an embodiment, the no sharing policy cannot be overridden by any SPA policy. For example, one server may be corporate server and another server may be a personal server, such as one located in a home, having a registered member that is a registered member of the corporate server. Information shared with members of the corporate server may not be allowed to be shared with members of the personal server. If a second member registered with the personal server is also registered with the corporate, information associated with the corporate server that is shared between the two members of both the corporate server and the personal server is provided through the logical interface associated with the corporate server. In an embodiment, a UEPA of a UE may have a policy that certain pre-defined groups or sets of servers and/or providers may provide SPA policies that will be used in operation between the designated groups, but no sharing will occur between that these groups and any other server and/or provider not in the pre-defined groups. Each of the pre-defined groups may be a group of one server.

Figure 11A:
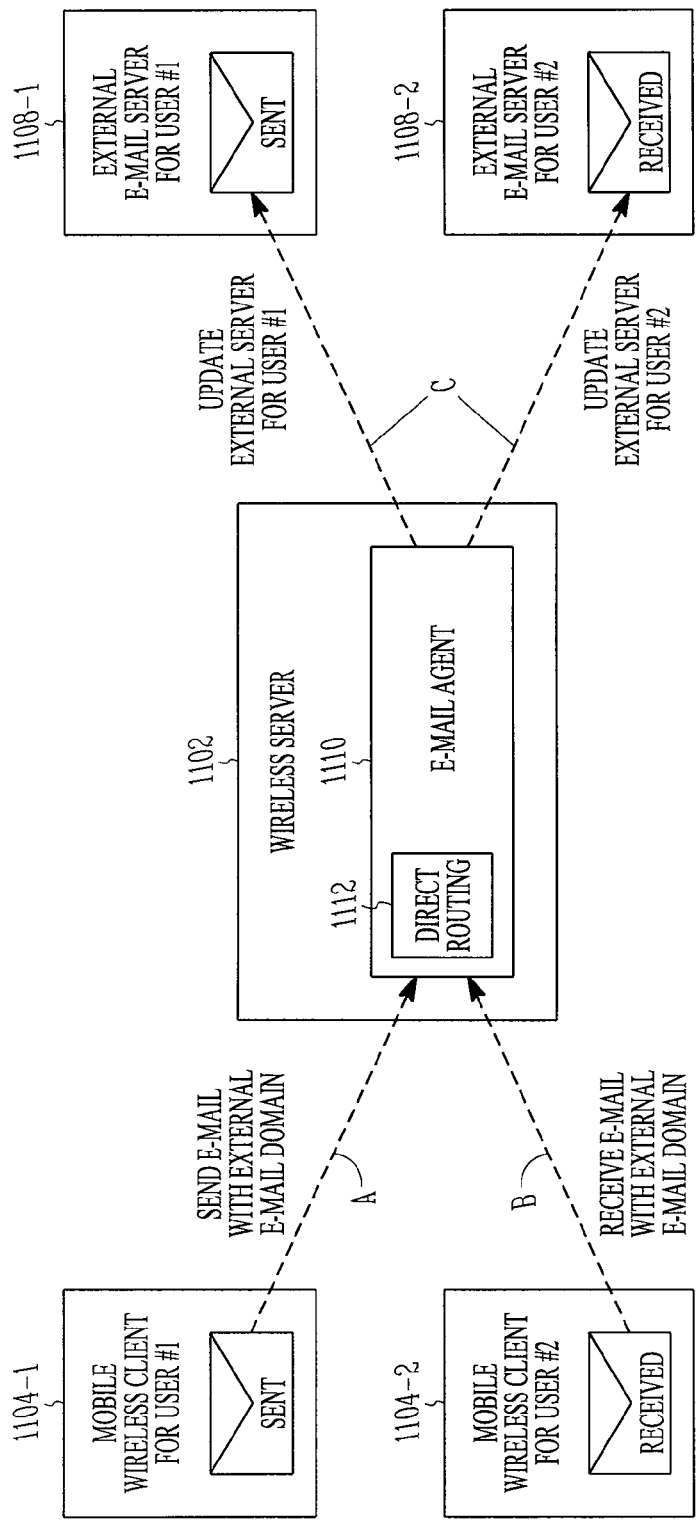
FIGS. 11A and 11B show embodiments of systems and methods for routing e-mail messages with external domains directly between mobile wireless clients.

Referring now to FIG. 11A, there is illustrated a first example embodiment of a system and method for routing e-mail messages with external domains directly between mobile wireless clients. As illustrated in FIG. 11A, a first wireless server 1102 is communicatively operable with a plurality of mobile wireless clients 1104-1 and 1104-2. In one example embodiment, the wireless server 1102 may include a database configured to store information associated with users of the mobile wireless clients including a user identification for each mobile wireless client 1104-1 and 1104-2, and an e-mail agent 1110 including one or more e-mail proxies to collect or send e-mails from and to one or more external e-mail domains, managed by an external e-mail server 1108-1 and 1108-2. According to one embodiment, these external domains may include e-mail domains such as Microsoft Hotmail®, and Google Gmail®. In another embodiment, the external e-mail domains may include corporate or other enterprise mail systems such as Microsoft Exchange®, IBM's Domino® and Novell's GroupWise®.

According to one embodiment, each e-mail corresponds to a user identification. An e-mail agent 1110 supports e-mail services of the mobile wireless clients 1104 correlated to the user identifications. The e-mail services include coordinating the sending and receiving of e-mail from each e-mail domain corresponding to the user identifications. The e-mail agent 1110 is further configured to include a direct routing function 1112 to route an e-mail message between the one or more mobile wireless clients without first processing the e-mail message through the external e-mail domain identified in the e-mail message. Accordingly, according to one example embodiment, the e-mail message is delivered without first being processed by the external e-mail server.

Figure 11B:
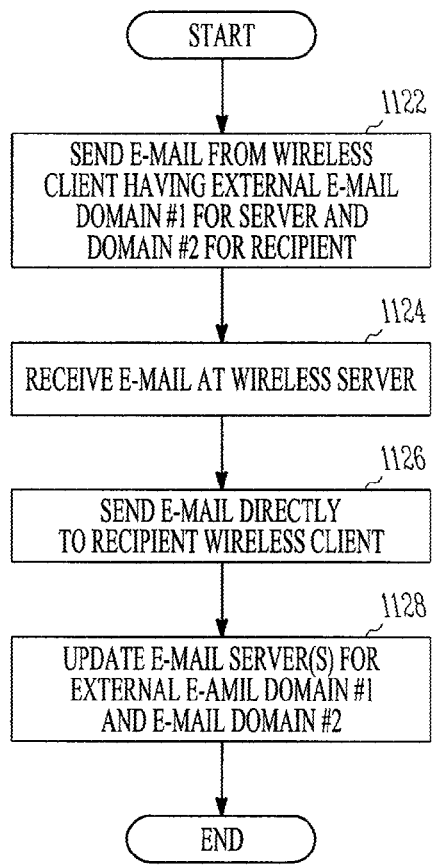

Thus, as illustrated in FIG. 11B, a method according to one example embodiment calls for an e-mail message to be sent 1122 from a first wireless client wherein the e-mail message is from a first user or entity associated with an external e-mail domain. The e-mail is addressed to a second user or entity also having an external e-mail domain the same as or different from the external e-mail domain of the first user or entity. The e-mail is received 1124 at the wireless server 1102, for example into the e-mail agent 1110, and the e-mail message is routed or sent directly 1126 to the second mobile wireless client 1104-2, for example using the direct routing function 1112, without first processing the e-mail message through the one or more external e-mail domains identified for the sender or recipient of the e-mail message. Accordingly, the e-mail message is likely more quickly delivered to the recipient as it is not required first to be sent to and routed through the external e-mail server(s) (for example 1108-1 and 1108-2). In one alternate embodiment, the external e-mail servers are also updated 1128 so that the e-mail records in these servers appear to have sent or received the direct routed e-mail. Accordingly, the external e-mail servers stay synchronized with any e-mail routed directly by the wireless server 1102. In one embodiment, the external e-mail servers are directed, for example by e-mail agent 1110, to synchronize the e-mail after the e-mail is first routed. In another embodiment, the external servers may be instructed to synchronize the e-mail after or simultaneously with the direct routing of the message between mobile wireless clients.

According to one example embodiment, e-mail domains external to the wireless server 1102 may include an e-mail domain based on a post office protocol (POP), an e-mail domain based on an internet message access protocol (IMAP), e-mail domains based on POP and IMAP, or e-mail based on other server architectures such as Microsoft Exchange®, IBM's Domino® or Novell's GroupWise®.

According to still another example embodiment, the direct routing of e-mails may be applied to other electronic communications such as instant messaging wherein instead of the external e-mail servers and domains there are instant messaging servers and the direct routing routes the instant message directly between the mobile wireless clients as opposed to through the external domain.

Figure 12:
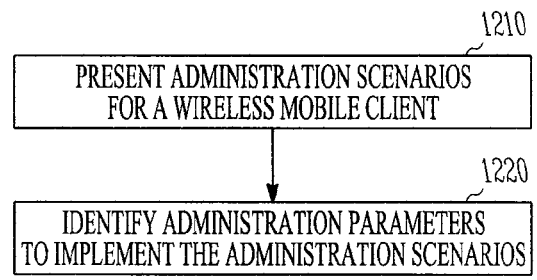
FIG. 12 shows an embodiment of a method of administering mobile wireless clients.

FIG. 12 shows an embodiment of a method of administering mobile wireless clients. The wireless server provides a simplified user interface for administering mobile wireless clients. In one embodiment, the wireless server displays one or more administration scenarios for at least one of a plurality of mobile wireless clients. A user of the wireless server selects the administration scenario. The mobile wireless server automatically determines one or more administration parameters for a mobile wireless client in response to the selection of the one or more administration scenarios.

At 1210, the mobile wireless server may present, to a user, one or more administration scenarios for a mobile device. The wireless server then receives, from the user, a selection of at least one of the administration scenarios. At 1220, without interaction from the user, the wireless server identifies one or more administration parameters to implement the selected administration scenarios. The administration parameters are operable to configure the mobile device for the particular administration scenario.

The administration scenario includes conditions or desired changes to the wireless device that involves a change to the configuration data on the wireless device in order to implement the change. For example, administration scenarios include, but are not limited to setting a password, forgetting a password, misplacing a mobile device, losing a mobile device and managing modes for operation for the wireless device.

Figure 13:
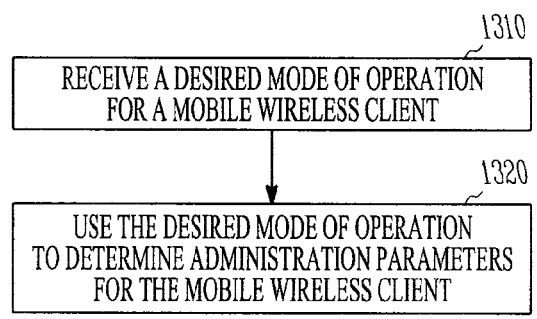
FIG. 13 shows an alternate embodiment of a method of administering mobile wireless clients.

FIG. 13 shows an alternate embodiment of a method of administering mobile wireless clients. At 1310, a wireless server receives a desired mode of operation for a mobile wireless client. At 1320, wireless server may use the desired mode of operation to determine one or more administration parameters to configure the mobile wireless client for the desired mode of operation.

Modes of operation for the wireless device may include, but are not limited to, turning off a phone function, controlling web site access, restricting international phone calls, restricting phone calls to specified area codes, turning off Short Message Service (SMS) messages, turning off Multimedia Messaging Services (MMS), turning off Web browser use, blocking downloading of specified content (e.g. games), and logging or monitoring different types of usage on the mobile device.

In one embodiment, the wireless server may transmit administration parameters from the wireless server to the mobile wireless client and configure the mobile wireless client for the desired mode of operation using the administration parameters. The administration parameters may be determined without human intervention.

In one embodiment, either the wireless server or the mobile wireless client may display administration scenarios or modes of operation on a simplified user interface. The simplified user interface displays less than all of the administration parameters available for configuration of the wireless device. Instead the simplified user interface may display one or more administration scenarios or modes of operation rather than displaying the administration parameters. For example, if the administration scenario for authentication of users on the system involves requiring a password, the administration parameters used to implement the administration scenario may include the following:

Password required parameter (true/false)
Maximum Password Age parameter (number of days)
Maximum Password Length parameter (number of characters)
Password Pattern Checks
Prohibited Passwords.

Although in this example, five parameters are involved to implement an administration scenario of requiring a password, the simplified user interface may not display any of the administration parameters, or the user interface may display less than all of the administration parameters. Instead of displaying some or all of the administration parameters, the user interface may display high-level or abstract descriptions of the administration parameters used to implement a password policy. For example, the user interface may offer as a choice for a user the question "Do you need to change your password?" The question is an example of an administration scenario.

Figure 14:
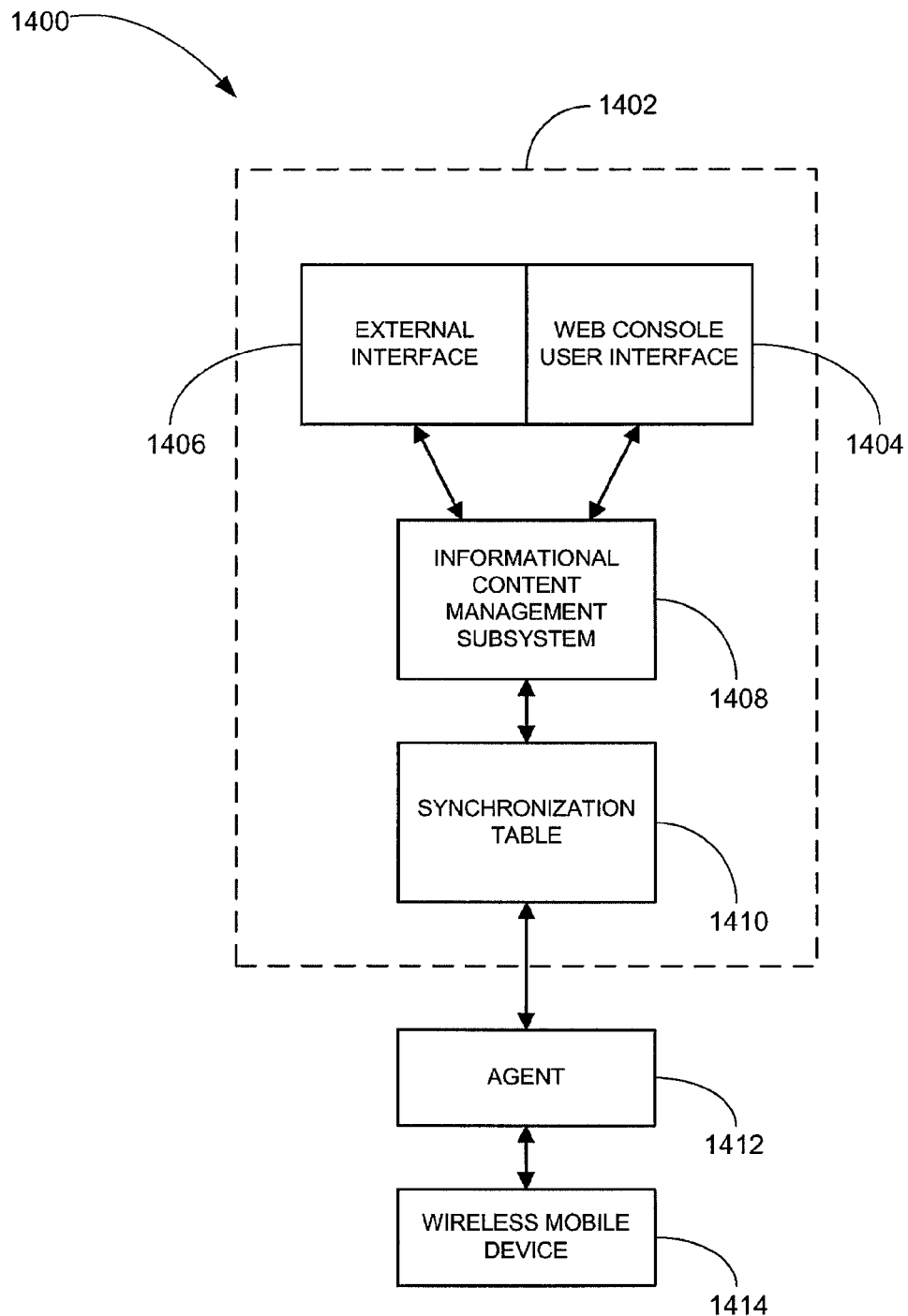
FIG. 14 illustrates features of an embodiment of a wireless system that may be deployed in the architecture of FIG. 1 or FIG. 2.

FIG. 14 illustrates a system 1400 that may be deployed within the architecture 100 and/or the architecture 200 (see FIGS. 1 and 2). For example, a collaboration tool 1402 and an agent 1412 may be deployed within the wireless server 205 (see FIG. 2). The informational content may be stored within an informational content management subsystem 1408 of a collaboration too 1402.

The informational content management subsystem 1408 may receive and/or provide information relating to informational content from a user through a web console user interface 1404 and/or from an external application through the external interface 1406. The external interface 1406 may use an API of an external application and/or a scrapping program to obtain the information.

The informational content management subsystem 1408 may utilize a synchronization table 1410 and the agent 1412 to provide informational content to and/or receive informational content from a wireless mobile device 1414. The agent 1412 may enable communication between the wireless mobile device 1414 and the collaboration tool 1402. The wireless device 1414 may be a member of the group 110 of wireless devices (see FIG. 1).

The synchronization table 1410 may be capable of synchronizing the mobile wireless device 1414 with the wireless server 205. The synchronization table 1410 may be retained on the wireless server 205.

Figure 15:
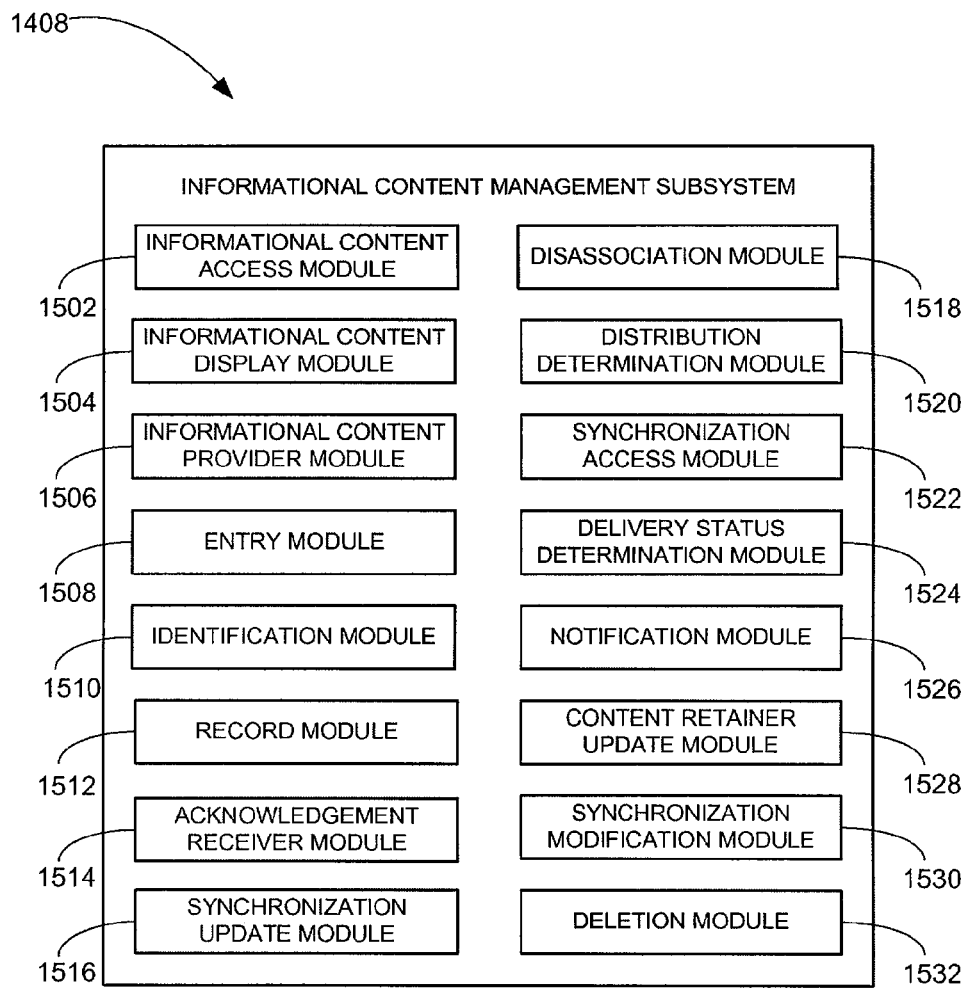
FIG. 15 illustrates features of an embodiment of an informational content management subsystem.

FIG. 15 illustrates an example informational content management subsystem 1408 that may be deployed in the system 1400 or in another system.

The informational content management subsystem 1408 may include an informational content access module 1502, an informational content display module 1504, an informational content provider module 1506, an entry module 1508, an identification module 1510, a record module 1512, an acknowledgement receiver module 1514, a synchronization update module 1516, a disassociation module 1518, a distribution determination module 1520, a synchronization access module 1522, a delivery status determination module 1524, a notification module 1526, a content retainer update module 1528, a synchronization modification module 1530, a deletion module 1532, and/or a content data modification module 1534. Other modules may also be used.

The informational content access module 1502 accesses (e.g., receives) private informational content associated with a single user and/or shared informational content associated with the single user and at least one other user. The informational content may be received from the one or more information sources 115 (see FIG. 1).

The informational content display module 1504 displays the private informational content and the shared informational content on a same user interface for the single user. The same user interface may include, by way of example, the web console user interface 1404 and/or a user interface on the wireless mobile device 1414.

The informational content provider module 1506 delivers or transfers the shared informational content (e.g., received from of the one or more information sources 115) and/or private informational content to the mobile wireless device 1414 associated with the user. The provided informational content may be capable of resynchronizing the mobile wireless device 1414.

The entry module 1508 adds and/or removes an entry in a user configuration table for a user.

The identification module 1510 identifies private informational content and/or shared informational content associated with the user.

The record module 1512 adds a synchronization record for the shared informational content and/or the private informational content to a synchronization table and/or removes a synchronization record for the shared informational content and/or the private informational content from a synchronization table.

The acknowledgement receiver module 1514 receives an update acknowledgement from the mobile wireless device 1414.

The synchronization update module 1516 updates the synchronization table based on the received update acknowledgement and/or provided informational content based on the privacy state.

The disassociation module 1518 disassociates a private content retainer (e.g. a folder or a content table) associated with a user.

The distribution determination module 1520 determines a distribution of the informational content to one or more mobile wireless devices 114 based on the privacy state of the informational content.

The synchronization access module 1522 accesses one or more synchronization records associated with informational content based on a distribution determination.

The delivery status determination module 1524 determines a delivery status of the informational content associated with the one or more synchronization records.

The notification module 1526 sends a notification regarding the informational content to a user and/or receives a notification to delete informational content (e.g., shared informational content).

The content retainer update module 1528 updates a content retainer (e.g., a folder or a content table) of the content type to include the informational content. The content retainer may be capable of tracking the privacy state of the informational content.

The synchronization modification module 1530 modifies a synchronization table for one or more users to reflect deletion of the shared informational content.

The deletion module 1532 provides a deletion request for the shared informational content to the mobile wireless device 1414 of a user and/or receives a deletion acknowledgement from the mobile wireless device 1414 of the user.

The content data modification module 1534 modifies a content data structure of the content type to remove the informational content.

Figure 16:
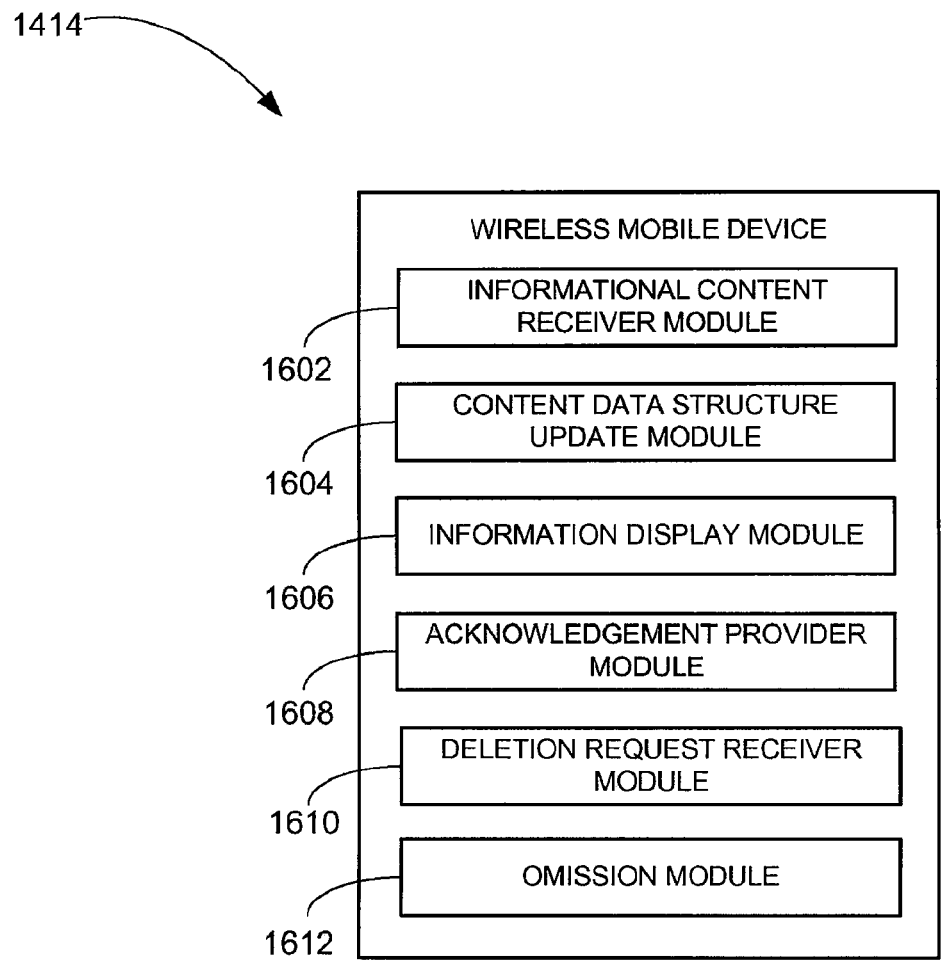
FIG. 16 illustrates features of an embodiment of a wireless mobile device.

FIG. 16 illustrates an example wireless mobile device 1414 that may be deployed in the system 1400 or in another system.

The wireless mobile device 1414 may include an informational content receiver module 1602, a content data structure update module 1604, an information display module 1606, an acknowledgement provider module 1608, a deletion request receiver module 1610, and/or an omission module 1612. Other modules may also be used.

The informational content receiver module 1602 receives informational content of a content type from the wireless server 205 (see FIG. 2).

The content data structure update module 1604 updates a content data structure of the content type to include and/or remove the informational content.

The information display module 1606 displays information associated with the informational content on a user interface of the mobile wireless client 114.

The acknowledgement provider module 1608 provides an update acknowledgement and/or a deletion acknowledgement to the wireless server 205.

The deletion request receiver module 1610 receives a deletion request for shared informational content of a content type from the wireless server 205.

The omission module 1612 omits the shared informational content from display of the information associated with the content data structure on a user interface.

FIG. 17 illustrates a user map 1700 according to an example embodiment. The user map 1700 may be deployed in the informational content management system 1408, or otherwise deployed in the system 1400 or in another system.

The user map 1700 may maintain a mapping between a number of users and content retainers (e.g., folders or content tables) associated with the users. The content retainers may retain informational content received from a user or otherwise received.

A user may be associated with more than one content retainer. For example, the user may be associated with one or more private content retainers and/or one or more public content retainers. The content retainer may be identified with more than one user. For example, the content retainer may be associated with multiple users for a shared content retainer.

The user map 1700 may include a user identifier header 1702, a content retainer identifier header 1704, and/or a permission header 1706 and a number of mapping records 1708-1722. Each of the mapping records 1708-1722 may include a field corresponding to a header. Other headers and/or records may also be used.

The user identifier header 1702 references a user identifier with which a particular user is associated to distinguish the user from other users. A particular user identifier may be included multiple times in the mapping records 1708-1722 to reflect that the particular user identifier is associated with multiple content retainers.

The content retainer identifier header 1704 references a content retainer identifier of a content retainer with which a particular user is associated. A particular content retainer identifier may be included multiple times in the mapping records 1708-1722 to reflect that a particular content retainer is associated with multiple users.

The permission header 1706 references the permission that users have with respect to content retainers. The permissions available may include, for example, read access, write access, modify access, and/or all access. The permission may enable an associated user to have certain access to informational content retained by the content retainer.

Figure 18:
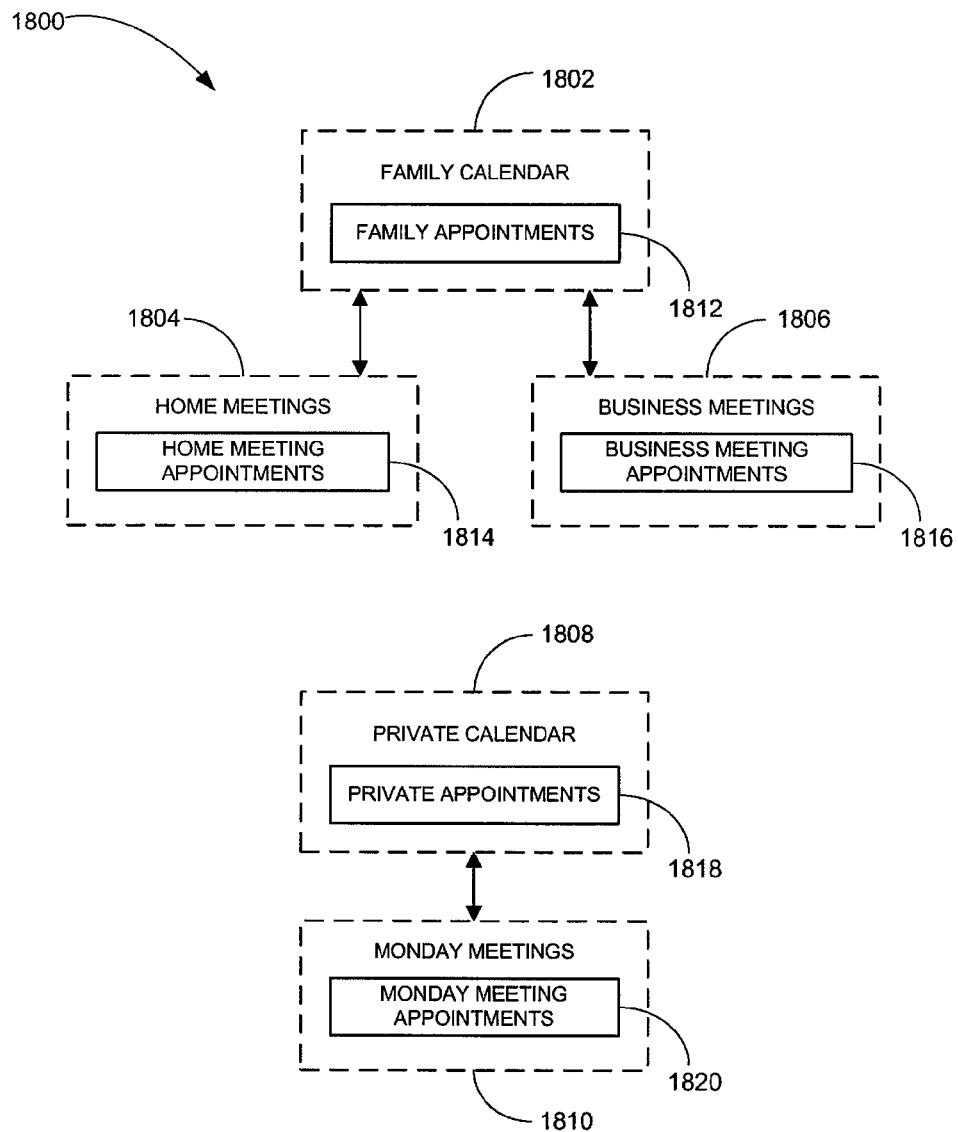
FIG. 18 illustrates features of an embodiment of content retainers.

FIG. 18 illustrates content retainers 1800 according to an example embodiment. The content retainers 1800 may be deployed in the informational content management system 1408 or otherwise deployed in the system 1400 or in another system.

The content retainers 1800 may be in the form of a number of folders 1802-1810 that may each retain one or more appointments 1812-1820 or other informational content. The number of folders 1802-1810 is shown merely as an example, and a greater or lesser number of folders of the same and/or different content types may also be used. In an example embodiment, a folder of the folders 1802-1810 may only include a single content type of the informational content, and multiple folders may be used to represent more than one content type.

A shared informational content folder 1802 may include two shared informational content subfolders 1804, 1806. The two shared informational content subfolders 1804, 1806 may inherit some of the properties (e.g., association of users with a particular folder) of the shared informational content folder 1802 on which it is based. The two shared informational content subfolders 1804, 1806 may enable a user to be associated with only a subset of the appointments or other informational content of the parent shared informational content folder 1802. A private folder 1814 may be subdivided into one or more subfolders 1810 for organizational or other purposes.

Figure 19:
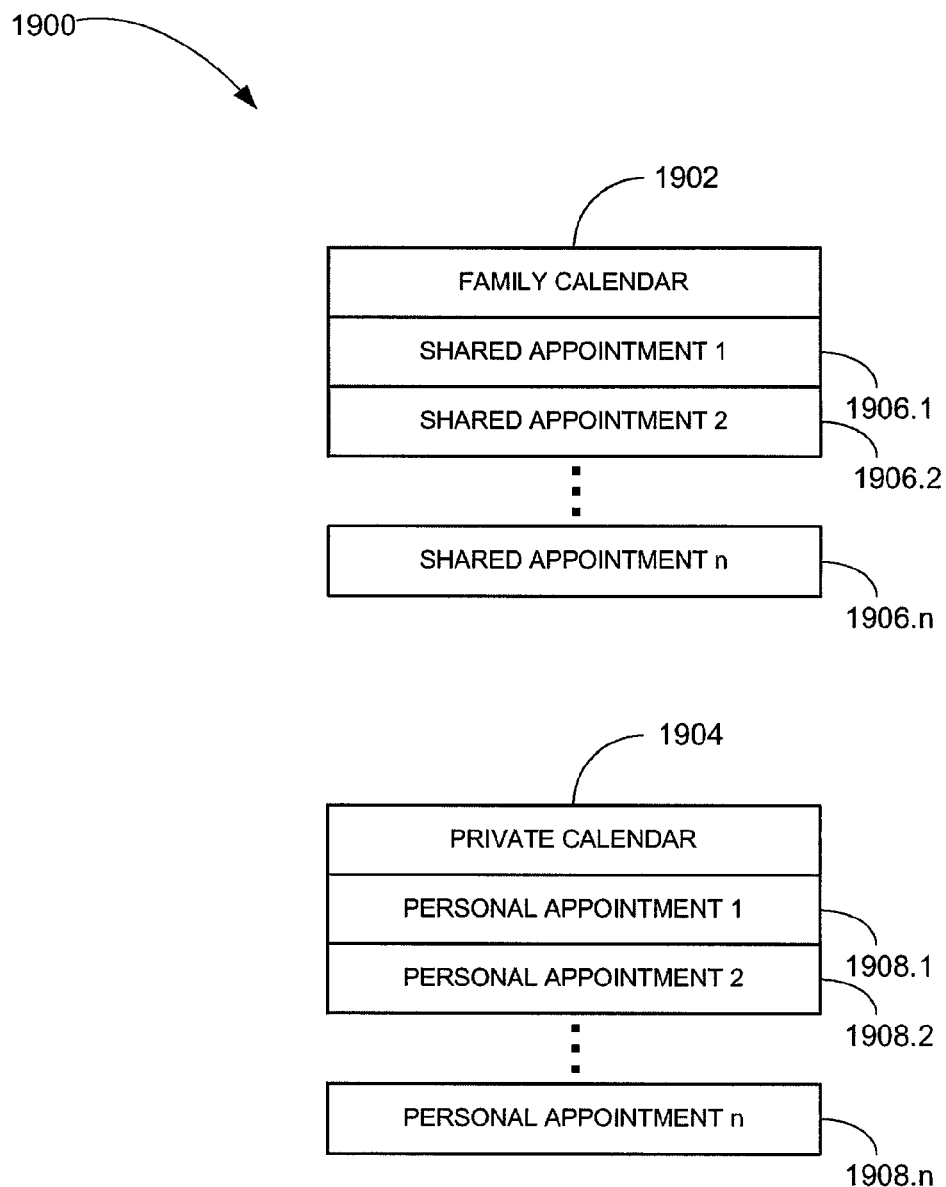
FIG. 19 illustrates features of an embodiment of content retainers.

FIG. 19 illustrates content retainers 1900 according to an example embodiment. The content retainers 1900 may be deployed in the informational content management system 1408 or otherwise deployed in the system 1400 or in another system.

The content retainers 1900 may be in the form of a number of content tables 1902, 1904 that may each retain one or more appointments 1906.1-1906.n, 1908.1-1908.n or other informational content. The number of content tables 1902, 1904 is shown merely as an example, and a greater or lesser number of folders of the same or different content types may also be used. In an example embodiment, a content table of the content tables 1902, 1904 may only include a single content type of the informational content, and multiple content tables may be used to represent more than one content type.

Figure 20:
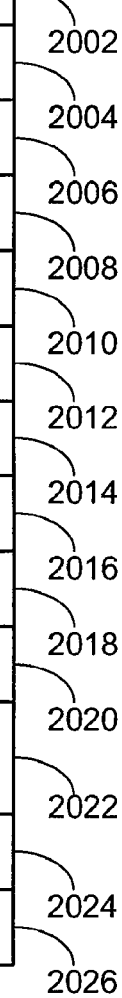
FIG. 20 illustrates features of an embodiment of appointment data.

FIG. 20 illustrates appointment data 2000 according to an example embodiment. The appointment data 2000 may be deployed as informational content in the informational content management system 1408 or otherwise deployed in the system 1400 or in another system. The appointment data 2000 may be used for a calendar or otherwise used.

The appointment data 2000 may include an entry identifier field 2002, a date field 2004, a subject field 2006, a start time field 2008, a duration field 2010, a time zone field 2012, a reminder time field 2014, an event title field 2016, an event body field 2018, an event location field 202, a content retainer identifier field 2022, an owner identifier field 2024, and/or a shared field 2026. Other fields may also be used.

The entry identifier field 2002 stores a value (e.g., an index value) for the appointment data 2000 to distinguish particular appointment data 2000 (e.g., an appointment) from other informational content in the content retainer. For example, the content retainer may include a number of appointment data 2000 where each is identified by an entry identifier.

The date field 2004 stores a date on which an appointment occurs. The subject field 2006 stores a subject of the appointment. The start time field 2008 stores a start time of the appointment. The duration field 2010 stores duration of the appointment. The time zone field 2012 stores a time zone of the appointment. The reminder time field 2014 stores an optional time at which a reminder may be sent to one or more users associated with the appointment.

The event title field 2016 stores a title of the appointment. The event body field 2018 stores a body of the appointment. The event location field 202 stores an event location of the appointment. The content retainer identifier field 2022 identifies the content retainer associated with the informational content.

The owner identifier field 2024 identifiers a user identifier or a creator of the appointment. The shared field 2026 indicates whether the appointment is a shared appointment or a private appointment.

FIG. 21 illustrates memo data 2100 according to an example embodiment. The memo data 2100 may be deployed as informational content in the informational content management system 1408 or otherwise deployed in the system 1400 or in another system. The memo data 2100 may be used in a collection of memos or otherwise used.

The memo data 2100 may include an entry identifier field 2102, an entry date field 2104, a subject field 2106, a memo title field 2108, a memo body field 2120, a content retainer identifier field 2112, an owner identifier field 2114, a shared field 2116, and/or a completion field 2118. Other fields may also be used.

The entry identifier field 2102 stores a value (e.g., an index value) for the informational content to distinguish particular memo data 2100 (e.g., a memo) from other informational content in the content retainer.

The entry date field 2104 stores a value of a date on which the memo was created. The subject field 2106 stores a subject of the memo. The memo title field 2108 stores a title of the memo. The memo body field 2120 stores a body of the memo.

The content retainer identifier field 2112 identifies the content retainer associated with the memo data 2100. The owner identifier field 2114 identifiers a user identifier or a creator of the memo. The shared field 2116 indicates whether the memo is a shared memo or a private memo. The completion field 2118 indicates whether a task or other information described in the memo has been completed.

FIG. 22 illustrates address book data 2200 according to an example embodiment. The address book data 2200 may be deployed as informational content in the informational content management system 1408 or otherwise deployed in the system 1400 or in another system. The address book data 2200 may be used in an address book or otherwise used.

The address boon data 2200 may include an entry identifier field 2202, a last modified data field 2204, a full name field 2206, a mailing address field 2208, an e-mail address field 2210, a phone number field 2212, a fax number field 2214, a notes field 2216, a content retainer identifier field 2218, an owner identifier field 2220, and/or a shared field 2222. Other fields may also be used.

The entry identifier field 2202 stores a value (e.g., an index value) for the address book data 2200 to distinguish particular address book data 2200 (e.g., an address book entry) from other informational content in the content retainer.

The last modified date field 2204 stores a value of a date on which the address book entry was last modified. The full name field 2206 stores a full name of a user for the address book entry. The mailing address field 2208 stores a mailing address for the address book entry. The e-mail address field 2210 stores an e-mail address for the address book entry. The phone number field 2212 stores a phone number for the address book entry. The fax number field 2214 stores a fax number for the address book entry. The notes field 2216 stores notes for the address book entry.

The content retainer identifier field 2218 identifies the content retainer associated with the address book entry. The owner identifier field 2220 identifiers a user identifier and/or a creator of the address book entry. The shared field 2222 indicates whether the address book entry is a shared address book entry or a private address book entry.

FIG. 23 illustrates an example recurrence table 2300 according to an example embodiment. The recurrence table 2300 may be deployed in the informational content management system 1408 or otherwise deployed in the system 1400 or in another system. The reoccurrence table 2300 may be associated with informational content (e.g., an appointment) to indicate multiple occurrences of the informational content (e.g., within a content retainer).

The recurrence table 2300 may include a number of headers 2304-2318 with associated fields 2320-2334 for each entry in the recurrence table 2300. While the recurrence table 2300 is shown to include a single recurrence with the field 2320-2334, a greater number of recurrences may be included in the recurrence table 2300.

The fields 2320-2334 may include a recurrence identifier field 2320, a recurrence interval field 2322, a recurrence frequency field 2324, a recurrence until field 2326, a recurrence month field 2328, a recurrence week start field 2330, a recurrence day of week field 2332, and/or a recurrence day of month field 2334. Other fields may also be used.

The recurrence identifier field 2320 receives a value (e.g., an index value) for recurrence to distinguish a particular recurrence from other recurrences in the recurrence table 2300.

The recurrence interval field 2322 receives a value indicating an interval between occurrences (e.g., of the appointment). The recurrence frequency field 2324 receives a value indicating frequency of the occurrence. The recurrence until field 2326 receives a value indicating a through date for the occurrences.

The recurrence month field 2328 receives a value indicating a month of the year for the occurrences. The recurrence week start field 2330 receives a value indicating a week of the year for the occurrences to start. The recurrence day of week field 2332 receives a value indicating a day of the week for the occurrences. The recurrence day of month field 2334 receives a value indicating a month of the year for the occurrences.

FIG. 24 illustrates an example synchronization table 1410 according to an example embodiment. The synchronization table 1410 may be deployed in the system 1400 or in another system.

The synchronization table 1410 may include a number of headers 2402-2418 with associated fields 2420-2336 for each entry in the synchronization table 1410. The fields 2420-2336 may include a table identifier field 2420, a synchronization identifier field 2422, a user identifier field 2424, a reference identifier field 2426, a delivery status field 2428, a content type field 2430, a revision field 2432, a sequence field 2434, and/or a status field 2436. Other headers and/or fields may also be used.

The table identifier field 2420 receives a value (e.g., an index value) to distinguish a particular synchronization record from another synchronization record in the synchronization table 1410.

The synchronization identifier field 2422 receives a value indicating an entry identifier for informational content of a content type. The user identifier field 2424 receives a value indicating a user on the user map 1700 with whom the synchronization record is associated. The reference identifier field 2426 receives a reference value.

The delivery status field 2428 receives a value indicating a delivery status of the informational content to the mobile wireless device 1414. For example, the value may be a "4" indicating that the associated informational content is new and is to be delivered to the wireless mobile device 1414, a "8" indicating that that the associated informational content is updated and is to be delivered to the wireless mobile device 1414, or a "16" indicating that the associated informational content is to be deleted from the mobile wireless device 1414.

The content type field 2430 receives a value indicating the content type of the informational content. The revision field 2432 receives a value that may be used to resolve conflicting and/or concurrent updates on the mobile wireless device 1414. The sequence field 2434 receives a value that may be used to resolve conflicting and/or concurrent updates on the mobile wireless device 1414. The status field 2436 receives a value indicating the processing status of the informational content management subsystem 1402.

Figure 25:
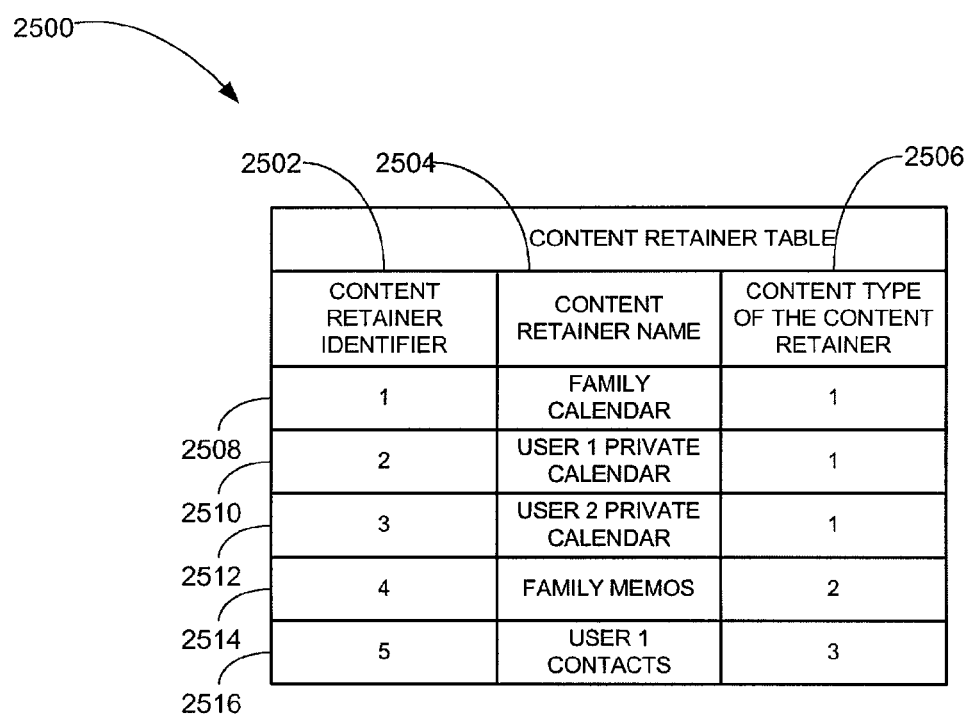
FIG. 25 illustrates features of an embodiment of a content retainer table.

FIG. 25 illustrates a content retainer table 2500 according to an example embodiment. The content retainer table 2500 may be deployed in the informational content management system 1408 or otherwise deployed in the system 1400 or in another system. The content retainer table 2500 may be associated with a content retainer (e.g., a folder or a content table) to identify a name and a content type for the associated content retainer.

The content retainer table 2500 may include a number of headers 2502-2506 and a number of records 2508-2516 with fields corresponding to the headers 2502-2506. The headers 2502-2506 may include a content retainer identifier header 2502, a content retainer name field 2504, and/or a content type field 2506. Other headers and/or fields may also be used.

A field associated with the content retainer identifier header 2502 receives a value (e.g., an index value) to distinguish a particular content retainer from another content retainer. A field associated with the content retainer name header 2504 receives a name of the content retainer. A field associated with the content type header 2506 receives a value indicating the content type of the content retainer.

Figure 26:
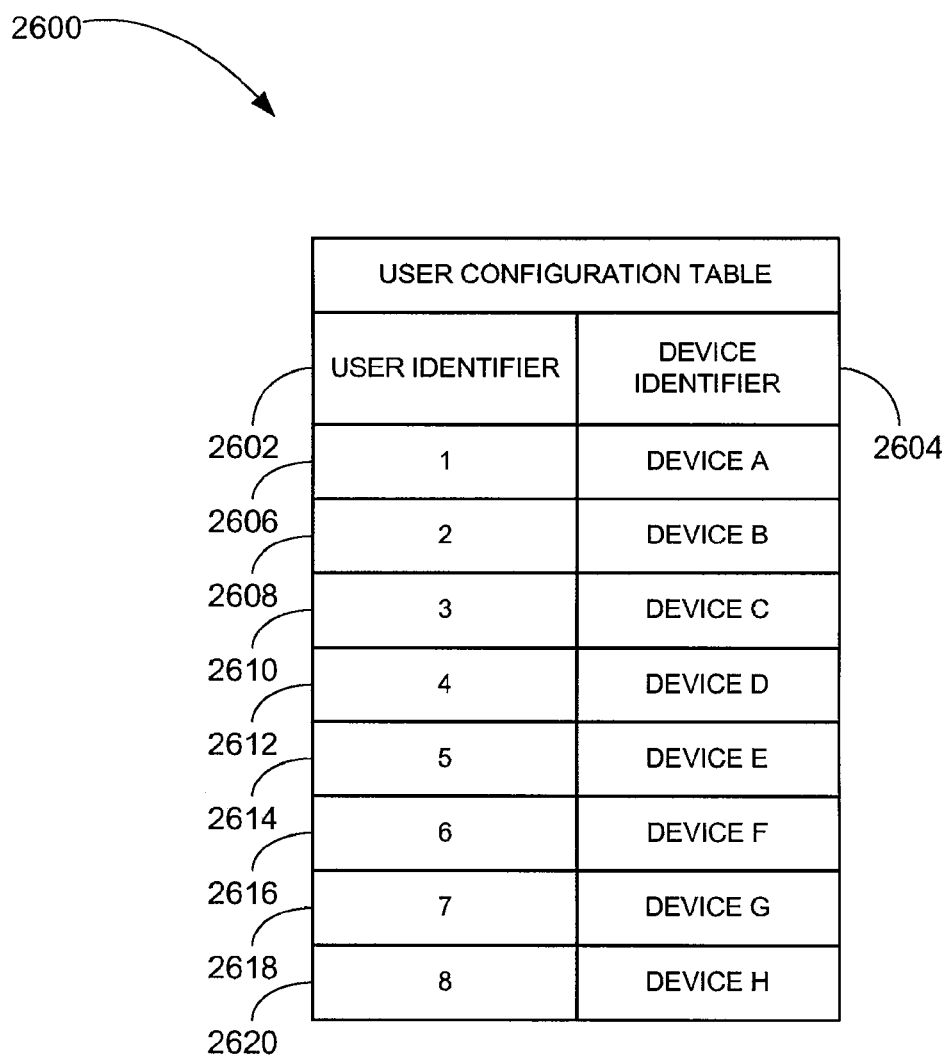
FIG. 26 illustrates features of an embodiment of a user configuration table.

FIG. 26 illustrates a user configuration table 2600 according to an example embodiment. The content retainer table 2600 may be deployed in the agent 1412 or otherwise deployed in the system 1400 or in another system. The user configuration table 2600 may associate a user with a particular mobile wireless device 1414.

The user configuration table 2600 may include a number of headers 2602, 2604 and a number of entries 2606-2620 with fields corresponding to the headers 2602, 2604. The headers 2602, 2604 may include a user identifier header 2602 and/or a device identifier header 2604. Other fields and/or headers may also be used.

A field associated with the user identifier header 2602 receives a value (e.g., an index value) to distinguish a particular user from another user. A field associated with the device identifier header 2604 receives a value (e.g., a unique value) indicating the wireless mobile device 1414 that is associated with a particular user.

Figure 27:
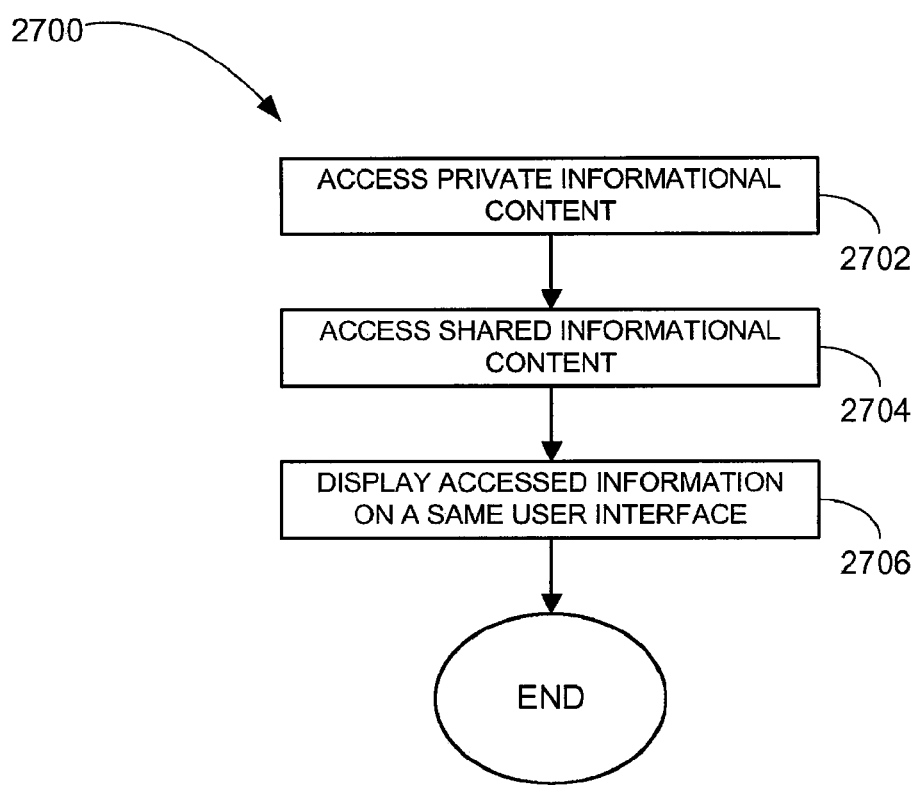
FIG. 27 shows features of an embodiment of a method to present informational content.

FIG. 27 illustrates a method 2700 for presenting informational content according to an example embodiment. The method 2700 may be performed by the wireless mobile device 1414, by the informational content management subsystem 1408, or otherwise performed.

Private informational content associated with a single user is accessed at block 2702. The private information content may be unavailable to other users beyond the single user. Shared informational content associated with the single user and at least one other user is accessed at block 2704. The shared and/or private informational content may include, by way of example, calendar data, an address book, a message board, a task monitor, photograph data, music data, video data, text data, or a combination there. Other types of shared informational content may also be used.

The private informational content and the shared informational content are displayed on a same user interface for the single user at block 2706. For example, the same user interface may be on the mobile wireless device 1414.

Figure 28:
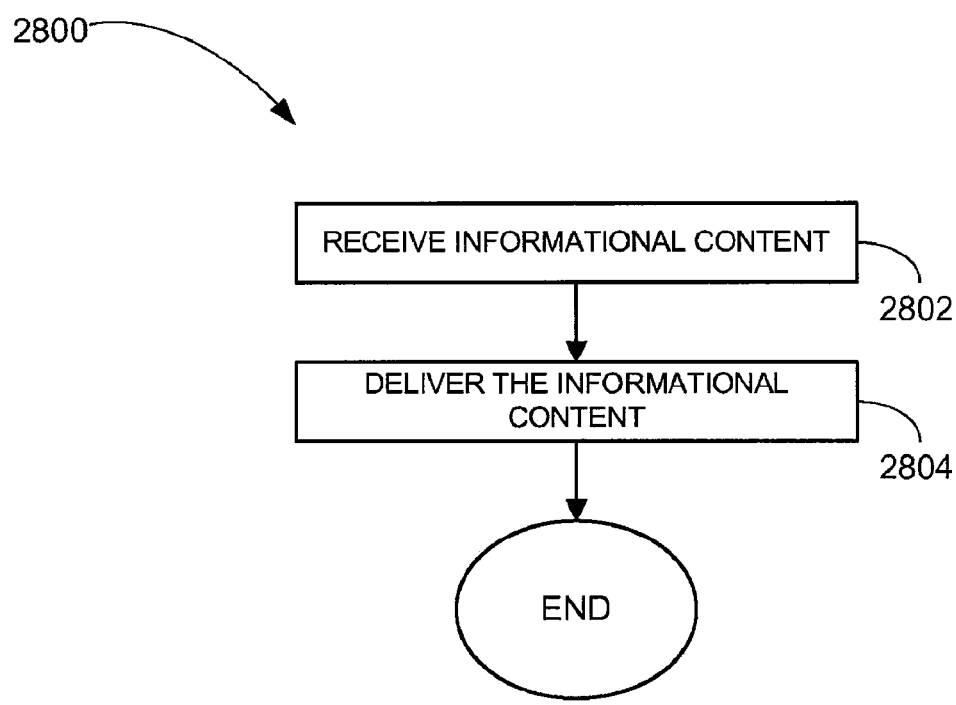
FIG. 28 shows features of an embodiment of a method to synchronize informational content.

FIG. 28 illustrates a method 2800 for synchronizing informational content according to an example embodiment. The method 2800 may be performed by the agent 1412, the informational content management subsystem 1408, or otherwise performed.

Shared informational content for a user is received from one or more information sources 115 at block 2802. The information sources 115 may include, by way of an example the web console interface 1404, a user interface of the mobile wireless device 1414, and/or an external interface 1406. Other information sources 115 may also be used. The shared informational content may include calendar data, an address book, a message board, a task monitor, photograph data, music data, video data, text data, or a combination thereof. The shared informational content may include new informational content or modified informational content.

At block 2084, the shared informational content received from of the one or more information sources 115 is delivered to the mobile wireless device 1414 associated with the user. The shared informational content may be delivered to a second mobile wireless device 1414 associated with a second user.

Figure 29:
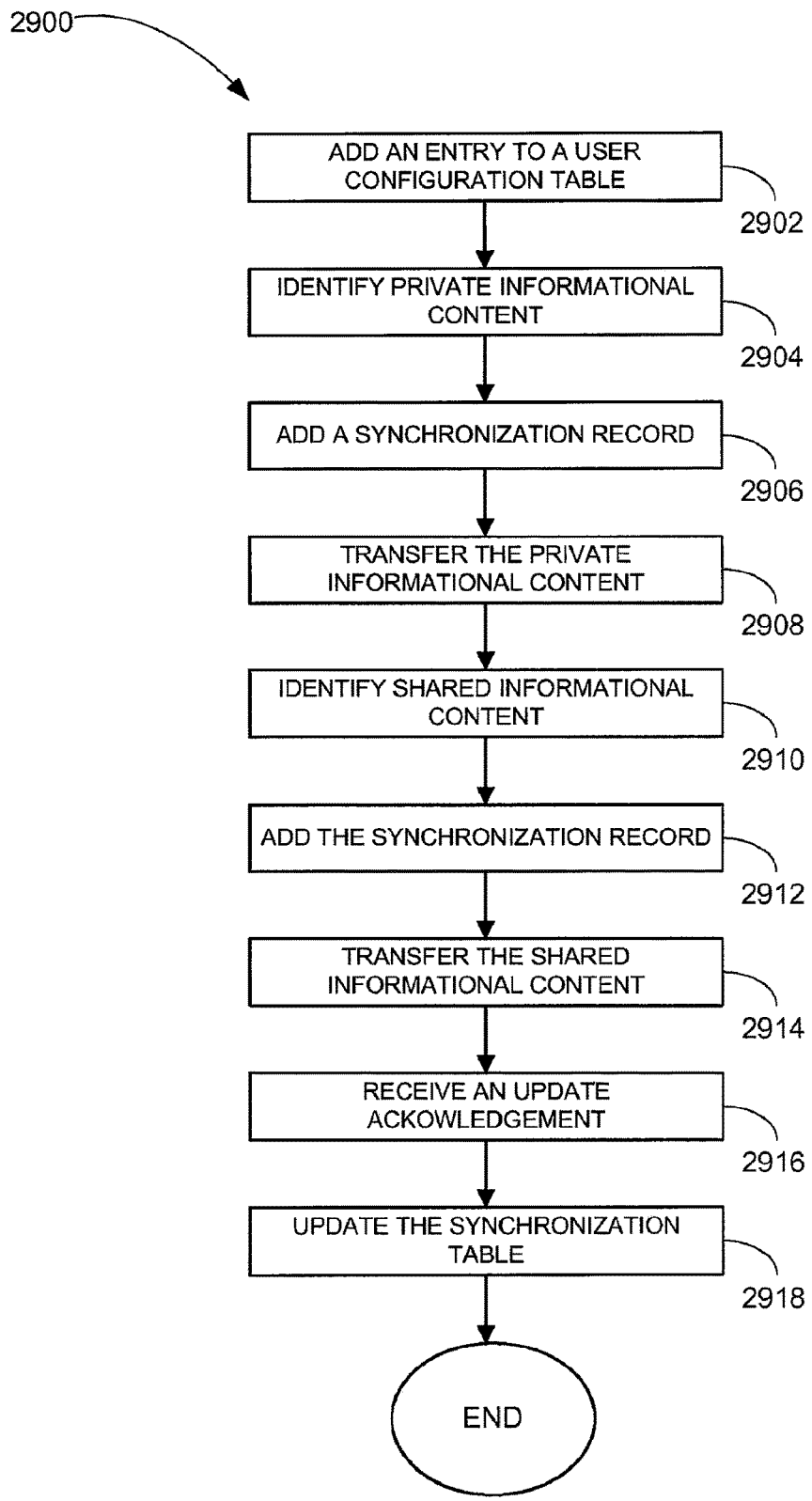
FIG. 29 shows features of an embodiment of a method to add a user to a wireless server.

FIG. 29 illustrates a method 2900 for adding a user to the wireless server 205 according to an example embodiment. The method 2900 may be performed by the informational content management subsystem 1408 or otherwise performed.

An entry is added in the user configuration table 2006 for a user at block 2902.

Private informational content associated with the user may be identified at block 2904.

The synchronization record for the private informational content may be added to the synchronization table 1410 for the user at block 2906.

The private informational content may be transferred to the mobile wireless device 1414 of the user at block 2908.

Shared informational content associated with the user is identified at block 2910.

A synchronization record for the shared informational content is added to the synchronization table 1410 for the user at block 2912.

The shared informational content is transferred to the mobile wireless device 1414 of the user at block 2914.

An update acknowledgement may be received from the mobile wireless device 1414 at block 2916.

The synchronization table 1410 for the user may be updated based on the received update acknowledgement at block 2918.

In an example embodiment, the operations performed at the blocks 2910, 2912, 2914 may occur before the operations performed at the blocks 2904, 2906, 2908.

Figure 30:
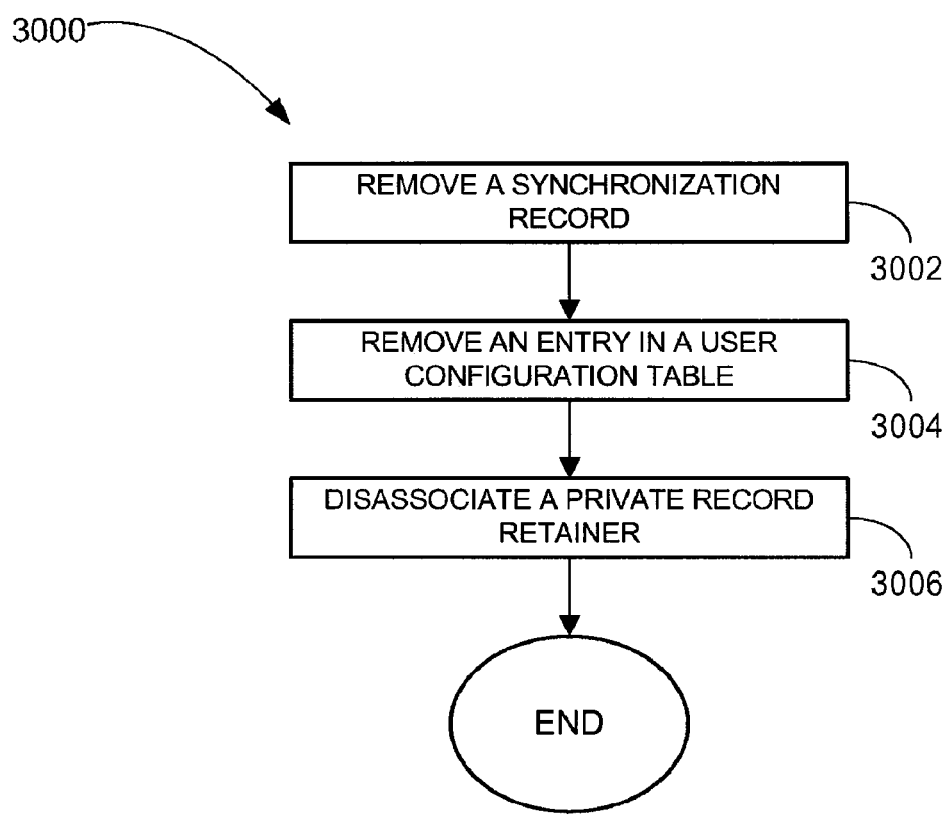
FIG. 30 shows features of an embodiment of a method to delete a user from a wireless server.

FIG. 30 illustrates a method 3000 for deleting a user from the wireless server 205 according to an example embodiment. The method 3000 may be performed by the informational content management subsystem 1408 or otherwise performed.

One or more synchronization records are removed from the synchronization table 1410 for a user at block 3002.

An entry in the user configuration table 2600 is removed for the user at block 3004. The user configuration table 2600 may include one or more entries. Each of the one or more entries may define an association between another user and the mobile wireless device 1414.

A private content retainer associated with the user may be dissociated at block 3006. The private content retainer may include a private folder or a private table. Other private content retainers may also be used.

Figure 31:
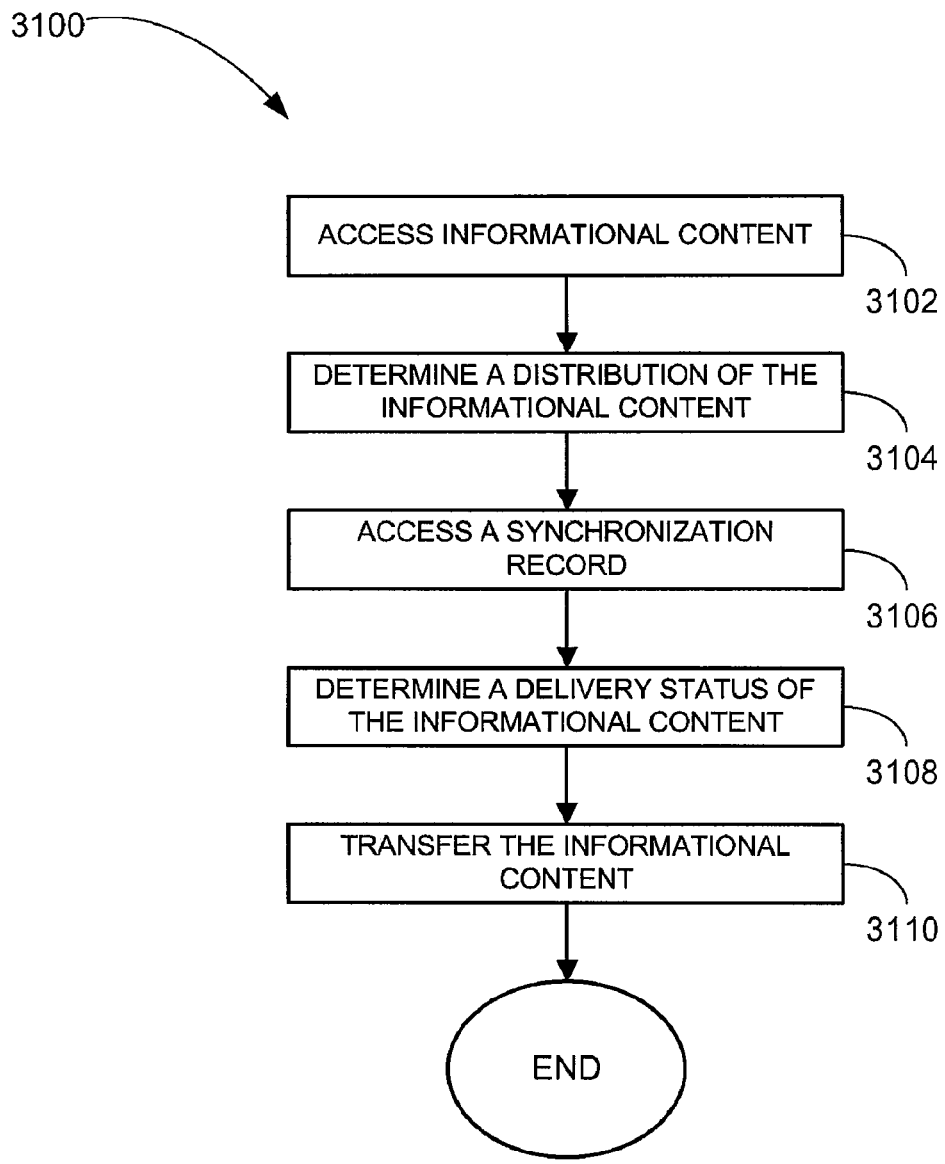
FIG. 31 shows features of an embodiment of a method to distribute informational content.

FIG. 31 illustrates a method 3100 for informational content distribution according to an example embodiment. The method 3100 may be performed by the informational content management subsystem 1408, the agent 1412, or otherwise performed.

Informational content is accessed at block 3102. The informational content may have a privacy state.

In an example embodiment, during the operations at block 3102 a modification request for the informational content may be received through a user interface (e.g., the web console user interface 1404), the informational content may be modified in accordance with the modification request; and the one or more synchronization records associated with the informational content may be modified.

At block 3104, a distribution of the informational content to one or more mobile wireless devices 1414 is determined based on the privacy state.

One or more synchronization records associated with informational content is accessed based on the distribution determination at block 3106

A delivery status of the informational content associated with the one or more synchronization records is determined at block 3106.

The informational content is transferred to the one or more mobile wireless devices 1414 based on the delivery status determination at block 3108.

Figure 32:
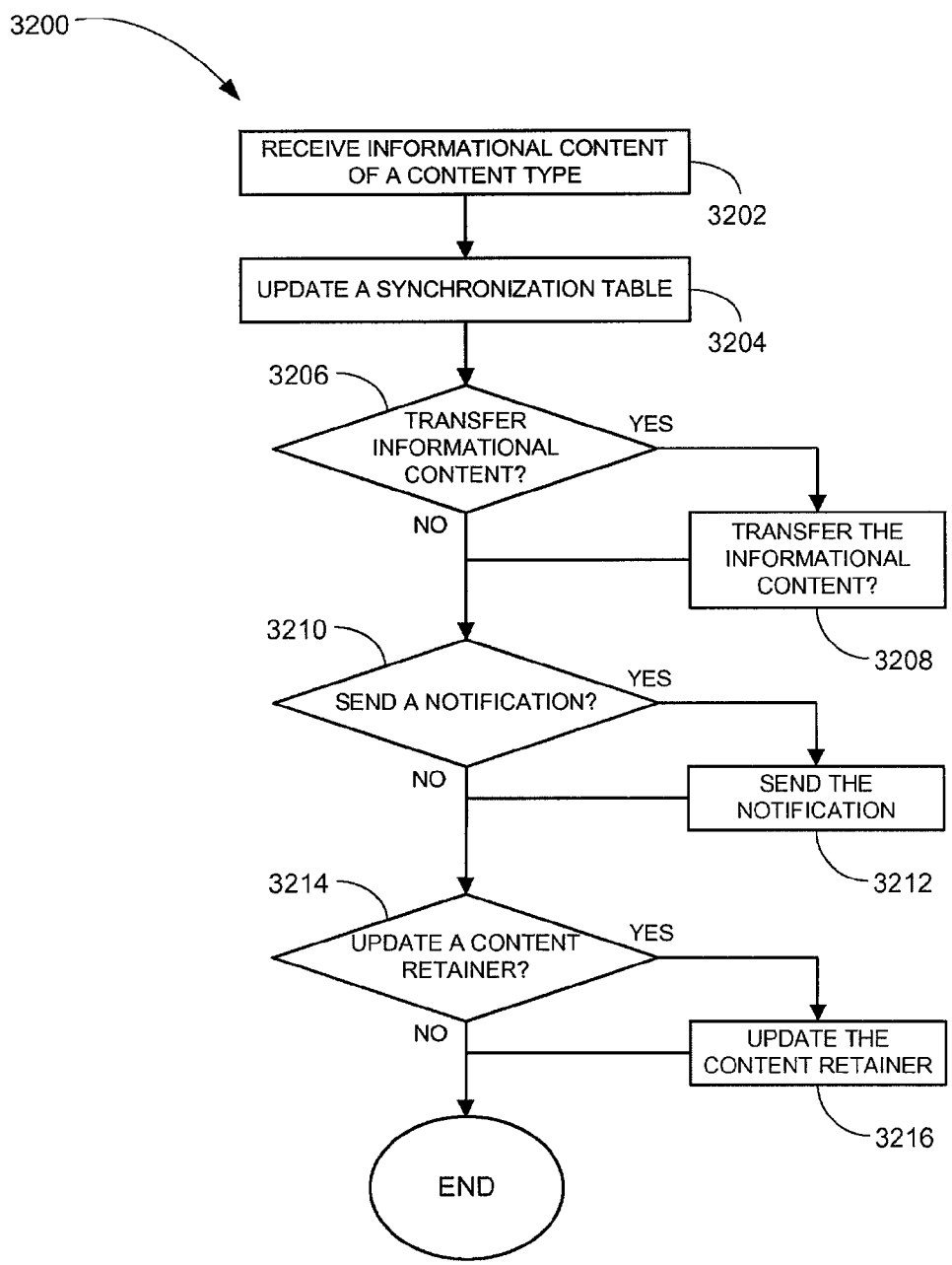
FIG. 32 shows features of an embodiment of a method to process informational content.

FIG. 32 illustrates a method 3200 for processing informational content according to an example embodiment. The method 3200 may be performed by the informational content management subsystem 1408, the agent 1412, or otherwise performed.

Informational content of a content type is received at block 3202. The informational content may have a privacy state. The informational content may be received the mobile wireless device 1414, a user interface on a different computing system, or otherwise received.

At block 3204, the synchronization table 1410 identifying one or more users of mobile wireless clients 210 (see FIG. 2) to be provided with the informational content is updated based on the privacy state of the informational content. The updating may include, by way of an example, adding an entry to the synchronization table 1410 for a user to be provided with the informational content and/or modifying an entry to the synchronization table 1410 for a user to be provided with the informational content.

In an example embodiment, a user of the mobile device 1414 may not receive the informational content when the informational content originated from the wireless mobile device 1414 of the user. Excluding a retransmission of the informational content from the originating wireless mobile device 1414 may reduce bandwidth and/or prevent unnecessary processing of data by the originating wireless mobile device 1414.

A determination may be made at decision block 3206 whether to transfer the informational content. If a determination is made to transfer the informational content, the informational content may be transferred to the mobile wireless device 1414 of one or more users at block 3208. The provided information may be capable of resynchronizing the mobile wireless device 1414. If a determination is made at decision block 3206 not to transfer the informational content, the method 3200 may proceed to decision block 3210.

At decision block 3210, a determination may be made whether to send a notification. If a determination is made to send a notification, a notification regarding the informational content may be sent to one or more users. If a determination is made not to send a notification at decision block 3210, the method 3200 may proceed to decision block 3214.

A determination may be made at decision block 3214 whether to update a content retainer (e.g., a folder or a content table). If a determination is made to update the content retainer, a content retainer of the content type may be updated to include the informational content. The content retainer may be capable of tracking the privacy state of the informational content. If a determination is made not to update the content retainer at decision block 3214 or upon completion of the operations at block 3216, the method 3200 may terminate.

In an example embodiment, updating the content table may include adding the informational content to a content table (e.g., the content table 1902, 1904) or modifying existing informational content of the content table. For example, modifying the existing informational content may include determining whether a user associated with received informational content is an owner of the existing informational content and modifying the existing informational content based on the determination.

In an example embodiment, the operations at decision blocks 3206, 3210, 3214, may occur in any order and/or simultaneously.

Figure 33:
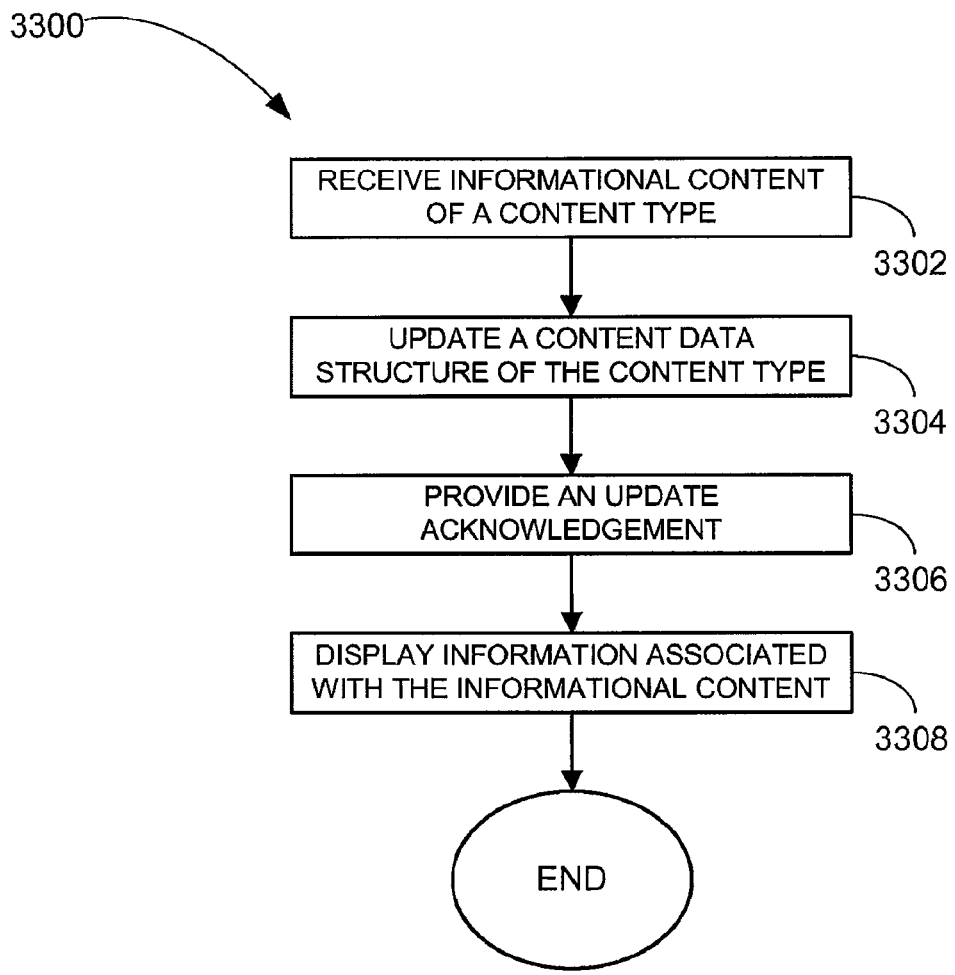
FIG. 33 shows features of an embodiment of a method to process informational content.

FIG. 33 illustrates a method 3300 for processing informational content according to an example embodiment. The method 3300 may be performed by the wireless device 1414 or otherwise performed.

Informational content of a content type is received from the wireless server 205 at block 3302. The informational content may include, by way of an example, a calendar item, a memo item, a contact item, a task item, a message board item, and/or an address book item. Other informational content may also be used.

A content data structure of the content type is updated to include the informational content at block 3304. The content data structure may have the privacy state of the informational content. The content data structure may be a folder, a content table, or a different structure.

An update acknowledgement may be provided to the wireless server 205 at block 3306.

Information associated with the informational content is displayed on a user interface of the mobile wireless client 1414 at block 3308.

Figure 34:
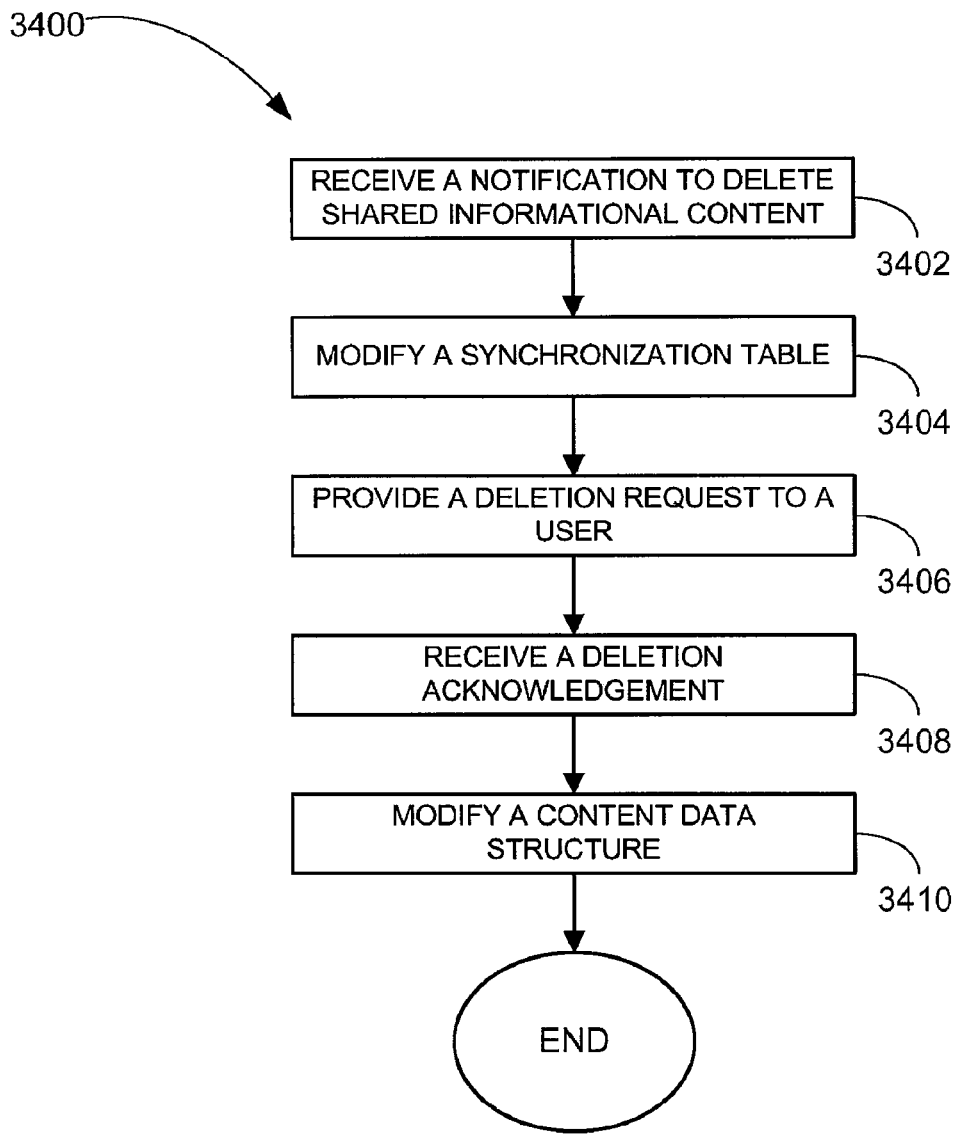
FIG. 34 shows features of an embodiment of a method to delete shared informational content.

FIG. 34 illustrates a method 3400 for deleting shared informational content according to an example embodiment. The method 3100 may be performed by the informational content management subsystem 1408 or otherwise performed.

A notification to delete shared informational content of a content type is received at block 3402. The shared informational content may be associated with a number of users.

At block 3404, the synchronization table 1410 is modified for the users to reflect deletion of the shared informational content.

In an example embodiment, delivery status of a synchronization record of the synchronization table 1410 may be modified for the users to reflect deletion of the shared informational content.

A deletion request for the shared informational content is provided to the mobile wireless device 1414 of one or more users at block 3406.

A deletion acknowledgement may be received from the mobile wireless device 1414 of the user at block 3408.

A content data structure of the content type may be modified to remove the informational content at block 3410.

Figure 35:
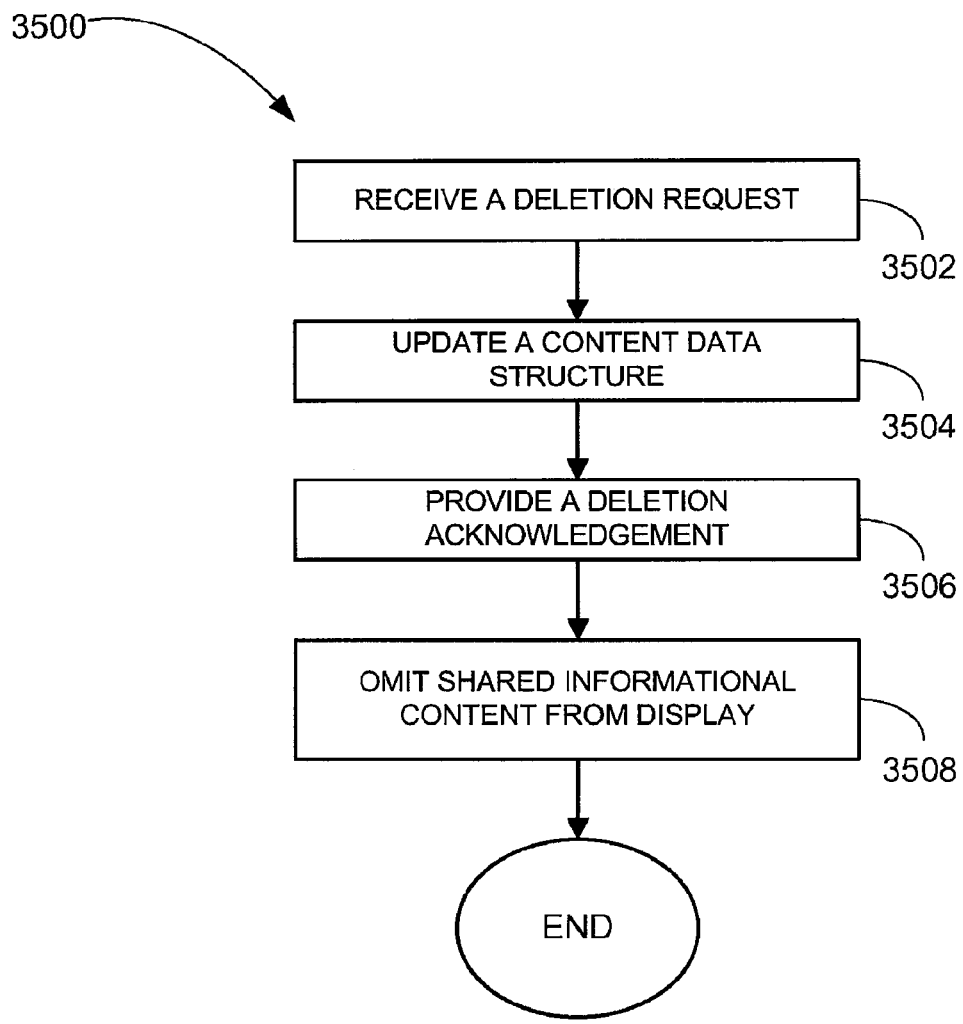
FIG. 35 shows features of an embodiment of a method to delete shared informational content.

FIG. 35 illustrates a method 3500 for deleting shared informational content according to an example embodiment. The method 3500 may be performed by the wireless device 1414 or otherwise performed.

At block 3502, a deletion request for shared informational content of a content type from the wireless server 205 is received.

A content data structure of the content type is updated to remove the informational content at block 3504.

A deletion acknowledgement may be provided to the wireless server 205 at block 3506.

At block 3508, the shared informational content may be omitted from display of the information associated with the content data structure on a user interface.

Various embodiments or combination of embodiments for apparatus and methods for a wireless server, as described herein, can be realized in hardware implementations, software implementations, and combinations of hardware and software implementations. These implementations may include a machine-readable medium having machine-executable instructions, such as a computer-readable medium having computer-executable instructions, for operating the wireless server in a group relationship with one or more mobile wireless clients such that information is disseminated among the group based on a privacy status associated with the information. The communications of the wireless server with the group and sharing of information can be conducted on a secured basis. The machine-readable medium is not limited to any one type of medium.

Various embodiments or combination of embodiments for apparatus and methods for a mobile wireless device, as described herein, can be realized in hardware implementations, software implementations, and combinations of hardware and software implementations. These implementations may include a machine-readable medium having machine-executable instructions, such as a computer-readable medium having computer-executable instructions, for operating the mobile wireless device in a multiple-mode arrangement as a wireless client of multiple wireless servers. The mobile wireless device may be configured in a group relationship with the wireless servers such that the mobile wireless device information interact with the wireless servers to receive and send information based on a privacy status associated with the information. The communications of the mobile wireless device with each wireless server of an associated group can be conducted on a secured basis. The machine-readable medium is not limited to any one type of medium.

Although specific embodiments have been illustrated and described herein, it will be appreciated by those of ordinary skill in the art that any arrangement that is calculated to achieve the same purpose may be substituted for the specific embodiments shown. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description.

What is claimed is:

1. A non-transitory machine-readable medium that stores first instructions, which, when executed by at least one or more processors of a wireless system, cause the at least one or more processors to perform operations comprising:
    storing data on a wireless mobile device, the data including second instructions that install a wireless server that serves as a group coordinator for a group of mobile wireless clients including the wireless mobile device on an electronic device;
    transmitting, by the wireless mobile device, the second instructions to the electronic device;
    configuring, by the second instructions, the electronic device as the group coordinator for the group of the mobile wireless clients that includes the wireless mobile device by installing the wireless server on the electronic device and downloading a secure remote password (SRP) key from the wireless mobile device, wherein the wireless server and the mobile wireless clients operate as a share group based on the SRP key;
    receiving, by the wireless server, unique identifiers of the mobile wireless clients and establishing the share group by correlating the unique identifiers to the SRP key;
    receiving, at the wireless mobile device, a new policy from the wireless server, the new policy establishing one server as a primary server having override control over policies associated with other servers from a plurality of servers;
    determining that a current policy loaded on the wireless mobile device is allowed to be changed;
    loading the new policy on the wireless mobile device in response to the determination;
    registering the wireless mobile device with each server of the plurality of servers; and
    operating the wireless mobile device according to a plurality of policies, wherein each policy of the plurality of policies is associated with at least one server of the plurality of servers with which the wireless mobile device is registered.

2. The non-transitory machine-readable medium of claim 1, wherein the transmitting, from the wireless mobile device, the second instructions includes providing data to install the wireless server configured to conduct all communications between the wireless mobile device and the wireless server over a secure communication channel.

3. The non-transitory machine-readable medium of claim 1, wherein the second instructions includes information to install the wireless server application from a communication network.

4. The non-transitory machine-readable medium of claim 3, wherein the second information includes information used to install the wireless server from an internet.

5. The non-transitory machine-readable medium of claim 1, wherein the second instructions includes a licensing agreement having an inquiry for accepting or to declining the licensing agreement to determine further installation of the wireless server.

6. The non-transitory machine-readable medium of claim 1, wherein the second instructions includes information to identify the secure remote password key.

7. The non-transitory machine-readable medium of claim 1, wherein the second instructions includes instructions storable on a machine-readable medium of the electronic device.

8. A wireless system comprising:
a wireless mobile device comprising:
a memory storing instructions for installing a wireless server on an electronic device which serves as a group coordinator for a group of mobile wireless clients including the wireless mobile device; and
a controller device; and
the electronic device comprising:
a memory; and
at least one processor;
wherein the controller device is programmed to perform operations of:
transmitting, by the mobile device, the instructions to the electronic device:
transmitting, by the mobile device, a secure remote password (SRP) key to the electronic device;
receiving, at the wireless mobile device, a new policy from the wireless server, the new policy establishing one server as a primary server having override control over policies associated with other servers from a plurality of servers;
determining that a current policy loaded on the wireless mobile device is allowed to be changed;
loading the new policy on the wireless mobile device in response to the determination;
registering the wireless mobile device with each server of the plurality of servers; and
operating the wireless mobile device according to a plurality of policies, wherein each server of the plurality of servers with which the wireless mobile device is registered is associated with at least one of the plurality of policies,
wherein the at least one processor is programmed to receive the instructions from the wireless mobile device, the instructions when executed by the at least one processor causes the at least one processor to perform the operations of:
configuring the electronic device as the group coordinator for the group of the mobile wireless clients that includes the wireless mobile device by installing the wireless server on the electronic device and downloading a secure remote password (SRP) key from the wireless mobile device, wherein the wireless server and the mobile wireless clients operate as a share group based on the SRP key; and
receiving unique identifiers of the mobile wireless clients and establishing the share group by correlating the unique identifiers to the SRP key.

9. The wireless system of claim 8, wherein the controller device performs operations comprising operating over a secure channel for all communications with the electronic device having the wireless server installed.

10. The wireless system of claim 8, wherein the electronic device comprises a personal computer.

11. The wireless system of claim 8, wherein the wireless mobile device includes an interface to connect to the electronic device to download, from the wireless mobile device, the instructions on the electronic device.

12. The wireless system of claim 11, wherein the interface is a universal serial bus interface.

13. The wireless system of claim 8, wherein the instructions includes information to install the wireless server application from a communication network.

14. The wireless system of claim 13, wherein the information to install the wireless server from the communication network includes information used to install the wireless server from an internet.

15. The mobile wireless device of claim 8, wherein the instructions includes a set of instructions storable on a machine-readable medium of the electronic device.

16. A method comprising:
storing data on a wireless mobile device, the data including instructions that install a wireless server that serves as a group coordinator for a group of mobile wireless clients including the wireless mobile device on an electronic system;
transmitting, by the wireless mobile device, the instructions to the electronic device:
configuring, by the instructions, the electronic device as the group coordinator for the group of the mobile wireless clients that includes the wireless mobile device by installing the wireless server on the electronic device and downloading a secure remote password (SRP) key from the wireless mobile device, wherein the wireless server and the mobile wireless clients operate as a share group based on the SRP key;
receiving, by the wireless server, unique identifiers of the mobile wireless clients and establishing the share group by correlating the unique identifiers to the SRP key;
receiving, at the wireless mobile device, a new policy from the wireless server, the new policy establishing one server as a primary server having override control over policies associated with other servers from a plurality of servers;
determining that a current policy loaded on the wireless mobile device is allowed to be changed;
loading the new policy on the wireless mobile device in response to the determination;
registering the wireless mobile device with each server of the plurality of servers; and
operating the wireless mobile device according to a plurality of policies, wherein each policy of the plurality of policies is associated with at least one server of the plurality of servers with which the wireless mobile device is registered.

17. The method of claim 16, wherein the transmitting, from the wireless mobile device, the instructions includes providing data to install the wireless server configured to conduct all communications between the wireless mobile device and the wireless server over a secure communication channel.

18. The method of claim 16, wherein the transmitting the instructions includes downloading information used to install the wireless server from a communication network.

19. The method of claim 18, wherein the downloading information used to install the wireless server from the communication network includes downloading information used to install the wireless server from an internet.

20. The method of claim 16, wherein the transmitting the instructions includes downloading a licensing agreement with instructions on accepting or declining the licensing agreement to determine further installation of the wireless server.

21. The method of claim 16, wherein the transmitting the instructions includes downloading instructions to identify the secure remote password key.

22. The method of claim 16, wherein the instructions includes installation instructions operable by the electronic device and instructions storable on a machine-readable medium of the electronic device.

23. The method of claim 16, wherein the transmitting the instructions includes downloading the wireless server from the wireless mobile device to the electronic device via a wired connection between the wireless mobile device and the electronic device.

24. The method of claim 23, wherein the downloading from the wireless mobile device to the electronic device via the wired connection includes downloading the wireless server from the wireless mobile device to the electronic device via a universal serial bus connection between the wireless mobile device and the electronic device.

\* \* \* \* \*